(12) United States Patent
Matsuda et al.

(10) Patent No.: US 8,404,007 B2
(45) Date of Patent: Mar. 26, 2013

(54) REFORMING APPARATUS AND METHOD OF OPERATING THE SAME

(75) Inventors: Naohiko Matsuda, Hiroshima (JP); Katsuki Yagi, Hiroshima (JP); Keiji Tanizaki, Hiroshima (JP); Akira Goto, Kanagawa (JP)

(73) Assignee: JX Nippon Oil & Energy Corporation, Tokyo (JP)

( * ) Notice: Subject to any disclaimer, the term of this patent is extended or adjusted under 35 U.S.C. 154(b) by 790 days.

(21) Appl. No.: 12/514,494

(22) PCT Filed: Nov. 26, 2007

(86) PCT No.: PCT/JP2007/072732
§ 371 (c)(1),
(2), (4) Date: Jul. 20, 2009

(87) PCT Pub. No.: WO2008/069033
PCT Pub. Date: Jun. 12, 2008

(65) Prior Publication Data
US 2010/0055030 A1 Mar. 4, 2010

(30) Foreign Application Priority Data
Nov. 27, 2006 (JP) ................... 2006-318424

(51) Int. Cl.
*B01J 7/00* (2006.01)
*B01J 8/00* (2006.01)

(52) U.S. Cl. .................. 48/61; 48/127.9; 48/76; 48/75; 48/63; 48/128; 48/180.1; 48/189.2; 48/197 R; 48/198.7; 48/203; 48/212; 48/214 A; 422/620; 422/625

(58) Field of Classification Search ........... 48/61, 127.9, 48/76; 422/620, 625
See application file for complete search history.

(56) References Cited

U.S. PATENT DOCUMENTS
6,413,479 B1 * 7/2002 Kudo et al. ................... 422/198
7,560,081 B2 7/2009 Takai et al.

FOREIGN PATENT DOCUMENTS
JP 2671068 7/1997
JP 11-106204 4/1999
(Continued)

OTHER PUBLICATIONS
International Search Report mailed Mar. 4, 2008 for International Application No. PCT/JP2007/072732.

*Primary Examiner* — Kaity V. Handal
(74) *Attorney, Agent, or Firm* — Wenderoth, Lind & Ponack, L.L.P.

(57) ABSTRACT

An object of the present invention is to provide a reforming apparatus and the like capable of uniformly mixing water (steam) and a raw material together, of preventing the precipitation of carbon without using a temperature controller, and of efficiently heating the water and the mixture by heating gas. Accordingly, the reforming apparatus has the following configuration. The reforming apparatus includes: a first vaporizer (05) that is cylindrically shaped and includes a first flow passage; a second vaporizer (06) that is cylindrically shaped and includes a second flow passage; a duct (027) that connects an outlet of the first flow passage to an inlet of the second flow passage; a raw-material mixing portion (028) formed at a certain point of the duct. The first vaporizer and the second vaporizer are concentrically disposed. An interstice between the first vaporizer and the second vaporizer serves as a heating-gas flow passage (024). In the first vaporizer, water (021) flowing through the first flow passage is heated by heating gas, and thereby is turned into steam. In the raw-material mixing portion, a mixture is obtained by mixing a raw material with the steam. In the second vaporizer, the mixture flowing through the second flow passage is heated by the heating gas and thereby is turned into superheated steam. The superheated steam flows through a reforming-catalyst layer (03).

23 Claims, 12 Drawing Sheets

FOREIGN PATENT DOCUMENTS

| | | |
|---|---|---|
| JP | 2003-327405 | 11/2003 |
| JP | 2004-075435 | 3/2004 |
| JP | 2004-115320 | 4/2004 |
| JP | 2005-231968 | 9/2005 |
| JP | 3719931 | 9/2005 |
| JP | 2005-272167 | 10/2005 |
| JP | 2006-76850 | 3/2006 |
| JP | 2007-308318 | 11/2007 |
| TW | 328560 | 3/1998 |
| TW | I255578 | 5/2006 |
| TW | 200728197 | 8/2007 |

* cited by examiner

REFORMING APPARATUS AND METHOD OF OPERATING THE SAME

TECHNICAL FIELD

The present invention relates to a reforming apparatus and a method of operating the reforming apparatus.

BACKGROUND ART

A reforming apparatus is an apparatus which includes a burner and a reforming-catalyst layer, and which produces a reformed gas (hydrogen-rich gas) containing hydrogen gas from a raw material through a steam reforming process. In the steam reforming process, the raw material, such as kerosene or methane gas, is mixed with water to make a mixture. The mixture is made to flow through the reforming-catalyst layer while the reforming-catalyst layer is heated by the heating gas of the burner. The reformed gas thus produced is used, for example, as a fuel for fuel cells. A conventional example of such reforming apparatus is disclosed in Patent Document 1.

The reforming apparatus disclosed in Patent Document 1 has the following characteristic features.

(1) A raw-fuel vaporizer built in the reforming apparatus vaporizes the raw fuel (raw material).
(2) Multiple reforming pipes, the inside of which is filled with a reforming catalyst, are disposed around the burner, that is, the reforming apparatus is provided with a multi-tubular reforming duct.
(3) A vacuum-insulation container is used for the purpose of thermally insulating the reforming pipes.
(4) The maintenance work for the inside of the apparatus can be carried out only by removing the vacuum-insulation container.
(5) Before the reformed gas that has flowed out from the reforming pipes is made to flow into a low-temperature shift converter, the temperature of the reformed gas is lowered.
(6) There is no device to remove the heat produced by a low-temperature CO-shift catalyst in the low-temperature shift converter and by a CO-removing catalyst in a selective-oxidation CO-remover. The heat is cooled only by the heating gas of the burner.
(7) At the time of heating operation for temperature rising for starting the reforming apparatus, the heating gas of the burner is made to flow inside the vacuum-insulation container without supplying the mixture to the reforming pipes. The low-temperature shift converter and the selective-oxidation CO remover in the vacuum-insulation container are thus heated from their respective outer-circumference sides so as to increase their respective temperatures.
(8) The heating gas that has passed by the outer-circumferential side of the selective-oxidation CO remover is directly discharged.

Another conventional example of the reforming apparatus is disclosed in Patent Document 2. The reforming apparatus disclosed in Patent Document 2 is configured to produce a reformed gas by: vaporizing a mixture of a raw material and water (liquid) by a vaporizer provided with a spiral flow passage and the like; and then subjecting the vaporized mixture to a steam reforming process in a reforming portion.

Patent Document 1: JP A-2003-327405
Patent Document 2 JP B-3719931

DISCLOSURE OF THE INVENTION

Problems to be Solved by the Invention

The reforming apparatus of Patent Document 1 has the following problems.

(1) When a raw material that is likely to precipitate carbon, such as kerosene, is used, a device to control the temperature rise of the raw material is needed, in order to prevent the precipitation of carbon when the raw material is vaporized by raising its temperature by means of the raw-fuel vaporizer.
(2) In the multi-tubular type reforming apparatus, the multiple reforming pipes per se cause an increase in the manufacturing cost. In addition, the need for a duct to put the multiple reforming pipes together, the need for a header tank, and other reasons also bring about an increase in the manufacturing cost.
(3) The manufacturing cost of the vacuum-insulation container is high. In addition, when the vacuum-insulation container is employed to thermally insulate the reforming pipe being approximately 800° C., the high temperature increases the amount of degassing from the metal that the vacuum-insulation container is made of. Such a large amount of degassing permits the vacuum-insulation container to maintain its vacuum for significantly reduced period of time. Moreover, it is necessary to dispose a shielding plate or the like in the vacuum-insulation container for the purpose of blocking the heat transfer by radiation. For this reason, the structure of the apparatus becomes complex, resulting in a high cost of the apparatus.
(4) Within the reforming apparatus, the burner is most likely to cause troubles. Some of the troubles that may take place in the burner are: the clogging by the fuel; the backfiring; and the operation failure of the ignition device. In the conventional reforming apparatus, the fuel-gas supply pipe is inserted from below, and the burner that is provided at the upper end of the fuel-gas supply pipe is located in the central portion of the apparatus. For this reason, to access the burner for the maintenance work, a large scale work is needed. The work includes: turning the reforming apparatus upside down; and pulling the lengthy burner with the fuel-gas supply pipe upwards out of the apparatus. In addition, even when the structure of the apparatus allows an easy maintenance work for the catalyst system, the maintenance work for the catalyst system cannot be carried out on site, because the catalyst needs some treatment such as a reduction treatment after the catalyst system is exposed to air. Moreover, when the vacuum-insulation container is removed out of the apparatus for the maintenance work, the shape and the weight of the vacuum-insulation container requires the hoisting of the vacuum-insulation container upwards to a level that is twice as high as the height of the reforming apparatus. For this purpose, heavy equipment, such as a crane, is necessary. Accordingly, the maintenance work is not easy.
(5) When a raw material that has a high C content, such as kerosene, is used, the reforming temperature in the reforming pipes (reforming-catalyst layer) becomes high, and the concentration of CO contained in the reformed gas becomes high consequently (for example, when the temperature of the reforming catalyst is 650° C., the CO-concentration is 11%, dry basis; and when the temperature of the reforming catalyst is 750° C., the CO-concentration is 15%, dry basis). As a consequence, if the reformed gas that has flowed out of the reforming-catalyst layer flows into the low-temperature shift converter, the heat produced by the CO-shift reaction (CO+ $H_2O \rightarrow H_2 + CO_2$) raises the temperature of the low-temperature CO-shift catalyst, and thus shortens the service life of the low-temperature CO-shift catalyst. This is because the operation temperature of the low-temperature CO-shift catalyst ranges from 200° C. to 250° C. and the upper temperature limit of the low-temperature CO-shift catalyst is 300° C., that is, there is only a small difference between the operation temperature and the upper temperature limit.

(6) The heat produced by the low-temperature CO-shift catalyst and the heat produced by the CO-removing catalyst are cooled only by the heating gas, and thus the cooling is not sufficient. For this reason, the temperature of the low-temperature CO-shift catalyst rises, and the CO-concentration in the reformed gas that flows out of the low-temperature shift converter rises as well. Accordingly, the amount of air for CO selective oxidation that is to be supplied to the selective-oxidation CO remover (CO-removing catalyst layer) needs to be increased. As a consequence, the hydrogen in the reformed gas is wasted, and such wasting results in lower reforming efficiency. Incidentally, Patent Document 1 describes that a methanation-type CO-removing catalyst is used. The methanation process has a narrow range of reaction temperature, so that the cooling by the heating gas may lead to difficulties of controlling the temperature and removing CO.

(7) At the time of heating operation for temperature rising for starting the reforming apparatus, the heating gas is made to flow inside the vacuum-insulation container. Thus, the temperature of the low-temperature shift converter and the temperature of the selective-oxidation CO remover are raised by heating from their respective outer-circumferential sides. Accordingly, high thermal insulation is required even for the positions where the low-temperature shift converter and the selective-oxidation CO remover are installed, for the purpose of reducing the heat radiated from the heating gas. To this end, an expensive thermal-insulation treatment, such as vacuum thermal insulation, is needed.

(8) After the heating gas passes by the outer-circumferential side of the selective-oxidation CO remover, the heating gas is directly discharged. At this time, the final temperature of the heating gas is higher than 200° C. since the operation temperature of the CO-removing catalyst is approximately 200° C. according to the description of Patent Document 1. As a consequence, the discharged heating gas has a larger amount of heat, resulting in lower efficiency.

In addition, in the reforming apparatus of Patent Document 2, the raw material and water (liquid) are mixed together before they are supplied to the vaporizer. Accordingly, especially when the used raw material is liquid fuel, the mixing of the raw material with water may produce an ununiform mixture and precipitate carbon, resulting in the degradation of the reforming catalyst.

The present invention has been made in light of the above-described circumstances, and objects of the present invention are to provide: a reforming apparatus that is capable of solving the above-mentioned problem of the conventional art; and a method of operating the reforming apparatus. The reforming apparatus is capable of, for example: mixing a raw material with water (steam) to produce a uniform mixture even when the raw material that is liquid fuel and tends to precipitate carbon, such as kerosene, is used; and preventing carbon from being precipitated without employing a temperature controller; and efficiently heating water and the mixture by use of heating gas.

Means for Solving the Problems

A first aspect of the present invention for solving the above-described problems provides a reforming apparatus that includes a reforming-catalyst layer and produces reformed gas containing hydrogen, characterized by comprising:
a first vaporizer that is cylindrically shaped and includes a first flow passage through which water flows;
a second vaporizer that is cylindrically shaped and includes a second flow passage through which a mixture of steam and a raw material flows;
a duct that connects an outlet of the first flow passage to an inlet of the second flow passage; and
a raw-material mixing portion formed at a certain point of the duct, the reforming apparatus characterized in that
the first vaporizer and the second vaporizer are concentrically disposed so that the first vaporizer is located on the outer side and the second vaporizer is located on the inner side,
a cylindrical gap left between the first vaporizer and the second vaporizer serves as a heating-gas flow passage,
in the first vaporizer, the water flowing through the first flow passage is heated by heating gas flowing through the heating-gas flow passage, and thereby the water is turned into steam,
in the raw-material mixing portion, the mixture is obtained by mixing the raw material with the steam flowing through the duct after flowing out of the first flow passage,
in the second vaporizer, while flowing through the second flow passage, the mixture is heated further by the heating gas flowing through the heating-gas flow passage, and
the mixture is supplied to the reforming-catalyst layer.

In addition, a second aspect of the present invention for solving the above-described problems provides a reforming apparatus that includes a reforming-catalyst layer and produces reformed gas containing hydrogen, characterized by comprising:
a first vaporizer that is cylindrically shaped and includes a first flow passage through which a mixture of steam and a raw material flows;
a second vaporizer that is cylindrically shaped and includes a second flow passage through which water flows;
a duct that connects an outlet of the second flow passage to an inlet of the first flow passage; and
a raw-material mixing portion formed at a certain point of the duct, the reforming apparatus characterized in that
the first vaporizer and the second vaporizer are concentrically disposed so that the first vaporizer is located on the outer side and the second vaporizer is located on the inner side,
a cylindrical gap left between the first vaporizer and the second vaporizer serves as a heating-gas flow passage,
in the second vaporizer, the water flowing through the second flow passage is heated by heating gas flowing through the heating-gas flow passage, and thereby the water is turned into steam,
in the raw-material mixing portion, the mixture is obtained by mixing the raw material with the steam flowing through the duct after flowing out of the second flow passage,
in the first vaporizer, while flowing through the first flow passage, the mixture is heated further by the heating gas flowing through the heating-gas flow passage, and
the mixture is supplied to the reforming-catalyst layer.

In addition, a third aspect of the present invention provides the reforming apparatus according to any one of the first and second aspects of the present invention, characterized in that a low-temperature CO-shift catalyst layer is disposed at an inner side of the second vaporizer.

In addition, a fourth aspect of the present invention provides the reforming apparatus according to the third aspect of the present invention, characterized in that a reforming pipe in which the reforming-catalyst layer is installed is disposed above the first vaporizer and the second vaporizer; while any one of the mixture that has flowed out of the second flow passage of the second vaporizer and the mixture that has flowed out of the first flow passage of the first vaporizer flows into the reforming-catalyst layer from a lower end thereof and then flows upwards through the reforming-catalyst layer, the mixture is turned into the reformed gas through a steam-reforming process; the reformed gas flows out of an upper end of the reforming-catalyst layer, flows downwards, flows into the low-temperature CO-shift catalyst layer from an upper end thereof, and then flows downwards through the low-temperature CO-shift catalyst layer.

In addition, a fifth aspect of the present invention provides the reforming apparatus according to the fourth aspect of the present invention, characterized in that a burner to produce the heating gas is disposed at an upper-end side of the reforming pipe so as to face downwards.

In addition, a sixth aspect of the present invention provides the reforming apparatus according to the third aspect of the present invention, characterized in that a CO-removing catalyst layer is cylindrically disposed so as to surround the first vaporizer, and the reformed gas that has flowed out of the low-temperature CO-shift catalyst layer flows through the CO-removing catalyst layer.

In addition, a seventh aspect of the present invention provides the reforming apparatus according to any one of the third and fourth aspects of the present invention, characterized in that a high-temperature CO-shift catalyst layer is provided at a position which allows the reformed gas to pass the high-temperature CO-shift catalyst layer before passing through the low-temperature CO-shift catalyst layer, and the reformed gas that has flowed out of the reforming-catalyst layer flows through the high-temperature CO-shift catalyst layer, and then flows through the low-temperature CO-shift catalyst layer.

In addition, an eighth aspect of the present invention provides the reforming apparatus according to the fifth aspect of the present invention, characterized by comprising a reforming-portion cylindrical pipe that is disposed so as to surround the reforming pipe, the reforming apparatus characterized in that the reforming pipe has a triple-pipe structure including an inner cylindrical pipe located at the inner side, an outer cylindrical pipe located at the outer side, and an intermediate cylindrical pipe located between the inner cylindrical pipe and the outer cylindrical pipe, all of these pipes disposed concentrically so as to surround the burner, a lower-end side of the inner cylindrical pipe is closed by a lower-end plate, an upper-end side of an interstice between the inner cylindrical pipe and the outer cylindrical pipe is closed by a first upper-end plate; a gap left between the first upper-end plate and an upper end of the intermediate cylindrical pipe serves as a reformed-gas turning portion, a cylindrical gap left between the intermediate cylindrical pipe and the inner cylindrical pipe serves as a reformed-gas flow passage, the reforming-catalyst layer is cylindrically formed between the intermediate cylindrical pipe and the outer cylindrical pipe, an upper-end side of the reforming-portion cylindrical pipe is closed by a second upper-end plate; a gap left between the second upper-end plate and the first upper-end plate serves as a heating-gas turning portion, a cylindrical gap left between the reforming-portion cylindrical pipe and the outer cylindrical pipe serves as a heating-gas flow passage, heating gas discharged downwards from the burner flows upwards along an inner-circumferential surface of the inner cylindrical pipe; while the heating gas turns around at the heating-gas turning portion and flows downwards through the heating-gas flow passage, the heating gas heats the reforming-catalyst layer, and then flows into the heating-gas flow passage formed between the first vaporizer and the second vaporizer, and the reformed gas that has flowed out from the upper end of the reforming-catalyst layer turns around at the reformed-gas turning portion, flows downwards through the reformed-gas flow passage, and then flows into the low-temperature CO-shift catalyst layer from the upper end thereof.

In addition, a ninth aspect of the present invention provides the reforming apparatus according to any one of the first and second aspects of the present invention, characterized in that each of the first flow passage and the second flow passage is formed into a spiral shape.

In addition, a tenth aspect of the present invention provides the reforming apparatus according to any one of the first and second aspects, characterized in that the first vaporizer has a double-pipe structure formed by fitting a cylindrical pipe onto the outer-circumferential surface side of a wavy pipe having spirally protruding and recessed portions formed in the outer-circumferential surface of the wavy pipe; a spiral gap formed between the wavy pipe and the cylindrical pipe serves as the first flow passage, and the second vaporizer has a double-pipe structure formed by fitting a different cylindrical pipe onto the outer-circumferential surface side of a different wavy pipe having spirally protruding and recessed portions formed in the outer-circumferential surface of the different wavy pipe; a spiral gap formed between the different wavy pipe and the different cylindrical pipe serves as the second flow passage.

In addition, an eleventh aspect of the present invention provides the reforming apparatus according to any one of the third and sixth aspects, characterized in that the low-temperature CO-shift catalyst layer is provided inside a cylindrical pipe, a cylindrical gap left between the cylindrical pipe and the second vaporizer serves as a reformed-gas flow passage, and while the reformed gas that has flowed out of the reforming-catalyst layer flows through the reformed-gas flow passage, the temperature of the reformed gas is lowered by heat exchange with any one of the mixture and the water that flows through the second flow passage of the second vaporizer; after that, the reformed gas flows into the inside of the cylindrical pipe by way of a circulation hole formed in the cylindrical pipe, and then flows through the low-temperature CO-shift catalyst layer.

In addition, a twelfth aspect of the present invention provides the reforming apparatus according to any one of the third and sixth aspects, characterized in that the low-temperature CO-shift catalyst layer is cylindrically disposed between a first cylindrical pipe disposed at an inner side of the second vaporizer and a second cylindrical pipe disposed inside the first cylindrical pipe, a cylindrical gap left between the first cylindrical pipe and the second vaporizer serves as a first reformed-gas flow passage, the inside of the second cylindrical pipe serves as a second reformed-gas flow passage, and while the reformed gas that has flowed out of the reforming-catalyst layer flows through the first reformed-gas flow passage from a first-end side to a second-end side of the low-temperature CO-shift catalyst layer, the temperature of the reformed gas is lowered by heat exchange with any one of the mixture and the water that flows through the second flow passage of the second vaporizer; the reformed gas then turns around at a reformed-gas turning portion located at the second-end side of the low-temperature CO-shift catalyst layer; while the reformed gas flows through the second reformed-gas flow passage from the second-end side to the first-end side of the low-temperature CO-shift catalyst layer, the temperature of the reformed gas is raised by heat exchange with the low-temperature CO-shift catalyst layer; after that, the reformed gas flows into an interstice between the first cylindrical pipe and the second cylindrical pipe via a circulation hole formed in the second cylindrical pipe, and then flows through the low-temperature CO-shift catalyst layer.

In addition, a thirteenth aspect of the present invention provides the reforming apparatus according to eighth aspect of the present invention, characterized in that the low-temperature CO-shift catalyst layer is cylindrically disposed between a first cylindrical pipe disposed at an inner side of the second vaporizer and a second cylindrical pipe disposed inside the first cylindrical pipe, a cylindrical gap left between the first cylindrical pipe and the second vaporizer serves as a first reformed-gas flow passage, the inside of the second cylindrical pipe serves as a second reformed-gas flow passage, and while the reformed gas that has flowed out of the reforming-catalyst layer flows through the first reformed-gas flow passage from a first-end side to a second-end side of the low-temperature CO-shift catalyst layer, the temperature of the reformed gas is lowered by heat exchange with any one of the mixture and the water that flows through the second flow passage of the second vaporizer; the reformed gas then turns around at a reformed-gas turning portion located at the second-end side of the low-temperature CO-shift catalyst layer; while the reformed gas flows through the second reformed-gas flow passage from the second-end side to the first-end side of the low-temperature CO-shift catalyst layer, the temperature of the reformed gas is raised by heat exchange with the low-temperature CO-shift catalyst layer; after that, the reformed gas flows into an interstice between the first cylindrical pipe and the second cylindrical pipe via a circulation hole formed in the second cylindrical pipe, and then flows through the low-temperature CO-shift catalyst layer.

In addition, a fourteenth aspect of the present invention provides the reforming apparatus according to any one of the fourth and eighth aspects of the present invention, characterized in that a high-temperature CO-shift catalyst is disposed in an area that is located at an inner side of a reforming pipe in which the reforming-catalyst layer is installed and that is located above the low-temperature CO-shift catalyst layer, the area being where the reformed gas flows in.

In addition, a fifteenth aspect of the present invention provides the reforming apparatus according to any one of the third and sixth aspects of the present invention, characterized in that the low-temperature CO-shift catalyst layer is cylindrically disposed between a first cylindrical pipe disposed at an inner side of the second vaporizer and a second cylindrical pipe disposed inside the first cylindrical pipe, a high-temperature CO-shift catalyst layer is cylindrically disposed between the first cylindrical pipe and the second cylindrical pipe, and above the low-temperature CO-shift catalyst layer, a cylindrical gap left between the first cylindrical pipe and the second vaporizer serves as a first reformed-gas flow passage, the inside of the second cylindrical pipe serves as a second reformed-gas flow passage, and while the reformed gas that has flowed out of the reforming-catalyst layer flows downwards through the first reformed-gas flow passage from an upper-end side of the high-temperature CO-shift catalyst layer to an lower-end side of the low-temperature CO-shift catalyst layer, the temperature of the reformed gas is lowered by heat exchange with any one of the mixture and the water that flows through the second flow passage of the second vaporizer; the reformed gas then turns around at a reformed-gas turning portion located at the lower-end side of the low-temperature CO-shift catalyst layer; while the reformed gas flows upwards through the second reformed-gas flow passage from the lower-end side of the low-temperature CO-shift catalyst layer to the upper-end side of the high-temperature CO-shift catalyst layer, the temperature of the reformed gas is raised by heat exchange with the low-temperature CO-shift catalyst layer and the high-temperature CO-shift layer; after that, the reformed gas turns around at a reformed-gas turning portion located at an upper end of the second reformed-gas flow passage; the reformed gas flows into an interstice between the first cylindrical pipe and the second cylindrical pipe, and flows downwards through the high-temperature CO-shift catalyst layer and then through the low-temperature CO-shift catalyst layer.

In addition, a sixteenth aspect of the present invention provides the reforming apparatus according to the eleventh aspect of the present invention, characterized by comprising:

an $O_2$-adsorption catalyst layer disposed inside the cylindrical pipe;

a heating-gas induction pipe that penetrates the low-temperature CO-shift catalyst layer and the $O_2$-adsorption catalyst layer;

a condenser that removes moisture from the heating gas; and a pump that sucks the heating gas, the reforming apparatus characterized in that, when the reforming apparatus is stopped, the heating gas is sucked by the pump; the condenser removes the moisture; the heating gas is introduced to an upper-end side of the $O_2$-adsorption catalyst layer by way of the heating-gas induction pipe; after that, the heating gas turns around and flows through the $O_2$-adsorption catalyst layer, so that $O_2$ is removed from the heating gas and thereby $O_2$-less gas is produced, part of the $O_2$-less gas flows through the low-temperature CO-shift catalyst layer and thereby discharges steam that remains in the low-temperature CO-shift catalyst layer, or the part of the $O_2$-less gas flows through the low-temperature CO-shift catalyst layer and then through the CO-removing catalyst layer, and thereby discharges the steam that remains in the low-temperature CO-shift catalyst layer and in the CO-removing catalyst layer, and the rest of the $O_2$-less gas flows out via the circulation hole formed in the cylindrical pipe, and then flows through the reforming-catalyst layer and thereby discharges steam that remains in the reforming-catalyst layer.

In addition, a seventeenth aspect of the present invention provides the reforming apparatus according to the fifteenth aspect of the present invention, characterized by comprising:

a first $O_2$-adsorption catalyst layer and a second $O_2$-adsorption catalyst layer both of which are cylindrically disposed between the first cylindrical pipe and the second cylindrical pipe, and both of which are disposed between the low-temperature CO-shift catalyst layer and the high-temperature CO-shift catalyst layer with the first $O_2$-adsorption catalyst layer being positioned on a side closer to the low-temperature CO-shift catalyst layer and with the second $O_2$-adsorption catalyst layer being positioned on a side closer to the high-temperature CO-shift catalyst layer;

a heating-gas induction pipe that penetrates the low-temperature CO-shift catalyst layer and the first $O_2$-adsorption catalyst layer;

a condenser that removes moisture from the heating gas; and a pump that sucks the heating gas, the reforming apparatus characterized in that, when the reforming apparatus is stopped, the heating gas is sucked by the pump; the condenser removes the moisture; the heating gas is introduced to a portion located between the first $O_2$-adsorption catalyst layer and the second $O_2$-adsorption catalyst layer by way of the heating-gas induction pipe, after that, part of the heating gas introduced into this portion located between the first $O_2$-adsorption catalyst layer and the second $O_2$-adsorption catalyst layer turns around and flows through the first $O_2$-adsorption catalyst layer, so that $O_2$ is removed from the heating gas and thereby $O_2$-less gas is produced; the $O_2$-less gas flows through the low-temperature CO-shift catalyst layer and thereby discharges steam that remains in the low-temperature CO-shift catalyst layer, or the $O_2$-less gas flows through the low-temperature CO-shift catalyst layer and then through the CO-removing catalyst layer, and thereby discharges steam that remains in the low-temperature CO-shift catalyst layer and in the CO-removing catalyst layer, and the rest of the heating gas introduced into the portion located between the first $O_2$-adsorption catalyst layer and the second $O_2$-adsorption catalyst layer flows through the second $O_2$-adsorption catalyst layer, so that $O_2$ is removed from the heating gas and thereby $O_2$-less gas is produced; the $O_2$-less gas flows through the high-temperature CO-shift catalyst layer and then flows out via the reformed-gas turning portion located at the end of the second reformed-gas flow passage; after that, the heating gas flows through the reforming-catalyst layer and thereby discharges steam that remains in the high-temperature CO-shift catalyst layer and in the reforming-catalyst layer.

In addition, an eighteenth aspect of the present invention provides the reforming apparatus according to any one of the fourth and eighth aspects of the present invention, characterized in that a cylindrically-shaped header tank is disposed at a portion located between an outlet of the second flow passage of the second vaporizer and an inlet of the reforming-catalyst layer, or at a position located between an outlet of the first flow passage of the first vaporizer and the inlet of the reforming-catalyst layer; a plurality of ejection holes are formed in a side surface or a top surface of the header tank in a circumferential direction of the header tank, and the mixture that has flowed out via the outlet of the second flow passage of the second vaporizer or via the outlet of the first flow passage of the first vaporizer flows into the header tank; after that, the mixture jets out through the ejection holes, and flows into the reforming-catalyst layer via the inlet thereof.

In addition, a nineteenth aspect of the present invention provides the reforming apparatus according to any one of the first and fourth aspects of the present invention, characterized by comprising:

a duct for cleaning that connects the outlet of the second flow passage of the second vaporizer to the inlet of the reforming-catalyst layer, or connects the outlet of the first flow passage of the first vaporizer to the inlet of the reforming-catalyst layer; and a removable portion for cleaning that is detachably attached to a certain point of the duct for cleaning, the reforming apparatus characterized in that, when the removable portion for cleaning is removed and a chemical liquid is poured in through a fill port of the duct for cleaning, the chemical liquid flows through the second flow passage of the second vaporizer and then through the first flow passage of the first vaporizer, or the chemical liquid flows through the first flow passage of the first vaporizer and then the second flow passage of the second vaporizer.

In addition, a twentieth aspect of the present invention provides the reforming apparatus according to any one of the first and second aspects of the present invention, characterized in that the raw-material mixing portion has a double-nozzle structure including an external nozzle and an internal nozzle disposed inside the external nozzle, and any one of the steam that has flowed out of the first flow passage of the first vaporizer and the steam that has flowed out of the second flow passage of the second vaporizer flows through an interstice between the external nozzle and the internal nozzle, and the raw material flows through the internal nozzle, or the raw material flows through the interstice between the external nozzle and the internal nozzle, and any one of the steam that has flowed out of the first flow passage of the first vaporizer and the steam that has flowed out of the second flow passage of the second vaporizer flows through the internal nozzle.

In addition, a twenty-first aspect of the present invention provides the reforming apparatus according to the eighth aspect of the present invention, characterized in that a cylindrically-shaped thermally-insulating material is disposed so as to surround the reforming-portion cylindrical pipe.

In addition, a twenty-second aspect of the present invention provides a method of operating the reforming apparatus according to the eighth aspect of the present invention, characterized in that, during heating operation for temperature rising for starting the reforming apparatus, without supplying the water or the raw material, the heating gas of the burner flows upwards along the inner-circumferential surface of the inner cylindrical pipe of the reforming pipe, then turns around at the heating-gas turning portion, and then flows downwards through the heating-gas flow passage located outside the reforming pipe; after that, the heating gas flows downwards through the heating-gas flow passage formed between the first vaporizer and the second vaporizer; as a consequence, the heating gas sequentially raises, by heating, the temperatures of the reforming pipe and the reforming-catalyst layer, the temperatures of the first vaporizer and the second vaporizer, and then the temperature of the low-temperature CO-shift catalyst layer.

In addition, a twenty-third aspect of the present invention provides a method of operating the reforming apparatus according to the thirteenth aspect of the present invention, characterized in that, during heating operation for temperature rising for starting the reforming apparatus, without supplying the water or the raw material, the heating gas of the burner flows upwards along the inner-circumferential surface of the inner cylindrical pipe of the reforming pipe, then turns around at the heating-gas turning portion, and then flows downwards through the heating-gas flow passage located outside the reforming pipe; after that, the heating gas flows downwards through the heating-gas flow passage formed between the first vaporizer and the second vaporizer; as a consequence, the heating gas sequentially raises, by heating, the temperatures of the reforming pipe and the reforming-catalyst layer, the temperatures of the first vaporizer and the second vaporizer, and then the temperature of the low-temperature CO-shift catalyst layer, and subsequently, the water is supplied without supplying the raw material, then flows through the first flow passage of the first vaporizer and then through the second flow passage of the second vaporizer, or flows through the second flow passage of the second vaporizer and then through the first flow passage of the first vaporizer; thereby the water is heated by the heating gas flowing through the heating-gas flow passage formed between the first vaporizer and the second vaporizer so that steam is produced; after the steam flows through the reforming-catalyst layer and while the steam flows through the first reformed-gas flow passage and then through the second reformed-gas flow passage, the steam is condensed on the outer surface of the first cylindrical pipe and on the inner surface of the second cylindrical pipe, and then the condensation thus occurred heats the low-temperature CO-shift catalyst layer and raises the temperature thereof.

In addition, a twenty-fourth aspect of the present invention provides a method of operating the reforming apparatus according to any one of the fifth and eighth aspects of the present invention, characterized in that while the reforming apparatus is in steady operation, the temperature of the reformed gas at an outlet of the reforming-catalyst layer is measured; an amount of fuel to be supplied to the burner is controlled so that the measured value of the temperature of the reformed gas is kept at a predetermined temperature, and in addition, the temperature of the reformed gas at an inlet of the low-temperature CO-shift catalyst layer is measured; an amount of air to be supplied to the burner is controlled so that the measured value of the temperature of the reformed gas is kept at a predetermined temperature.

In addition, a twenty-fifth aspect of the present invention provides a method of operating the reforming apparatus according to any one of the fifth and eighth aspects of the present invention, characterized in that while the reforming apparatus is in steady operation, the temperature of the reformed gas at an outlet of the reforming-catalyst layer is measured; an amount of fuel to be supplied to the burner is controlled so that the measured value of the temperature of the reformed gas is kept at a predetermined temperature, and in addition, any one of the temperature of the mixture at an outlet of the second flow passage of the second vaporizer and the temperature of the mixture at an outlet of the first flow passage of the first vaporizer is measured; an amount of air to be supplied to the burner is controlled so that the measured value of the temperature of the mixture is kept at a predetermined temperature.

Effects of the Invention

A reforming apparatus according to the first aspect of the present invention has the following characteristic features. The reforming apparatus comprises: a first vaporizer that is cylindrically shaped and includes a first flow passage through which water flows; a second vaporizer that is cylindrically shaped and includes a second flow passage through which a mixture of steam and a raw material flows; a duct that connects an outlet of the first flow passage to an inlet of the second flow passage; and a raw-material mixing portion formed at a certain point of the duct. The first vaporizer and the second vaporizer are concentrically disposed so that the first vaporizer is located on the outer side and the second vaporizer is located on the inner side. A cylindrical gap left between the first vaporizer and the second vaporizer serves as a heating-gas flow passage. In the first vaporizer, the water flowing through the first flow passage is heated by heating gas flowing through the heating-gas flow passage, and thereby the water is turned into steam. In the raw-material mixing portion, the mixture is obtained by mixing the raw material with the steam flowing through the duct after flowing out of the first flow passage. In the second vaporizer, while flowing through the second flow passage, the mixture is heated further by the heating gas flowing through the heating-gas flow passage. The mixture is supplied to the reforming-catalyst layer. Accordingly, the water flowing through the first flow passage of the first vaporizer and the mixture flowing through the second flow passage of the second vaporizer can be heated efficiently by the heating gas flowing through the heating-gas flow passage formed between the first vaporizer and the second vaporizer.

In addition, while the steam that has flowed out of the first flow passage of the first vaporizer flows through the duct, the steam flows at a larger velocity (for example, approximately at 50 m/s) than the water (liquid). Accordingly, the raw material that is mixed with the steam in the raw-material mixing portion formed at a certain point of the duct can be agitated well by this high-velocity steam, and can be uniformly dispersed in the steam. As a consequence, the steam and the raw material can be uniformly mixed together. In this case, even when the raw material is liquid fuel, such as kerosene, or even when only a small amount of the raw material is supplied, the steam and the raw material can be uniformly mixed together. Moreover, in the second vaporizer, together with the steam, the raw material is vaporized and the temperature thereof is raised. Accordingly, even when the raw material that is likely to precipitate carbon, such as kerosene, is used, the precipitation of carbon from the raw material can be prevented, and thereby the degradation of the reforming catalyst can be prevented. When the raw material is vaporized in the raw fuel vaporizer as in the conventional cases, the complicated controlling of the temperature rise is necessary, but such complicated controlling of the temperature rise is no longer necessary.

A reforming apparatus according to the second aspect of the present invention has the following characteristic features. The reforming apparatus comprises: a first vaporizer that is cylindrically shaped and includes a first flow passage through which a mixture of steam and a raw material flows; a second vaporizer that is cylindrically shaped and includes a second flow passage through which water flows; a duct that connects an outlet of the second flow passage to an inlet of the first flow passage; and a raw-material mixing portion formed at a certain point of the duct. The first vaporizer and the second vaporizer are concentrically disposed so that the first vaporizer is located on the outer side and the second vaporizer is located on the inner side. A cylindrical gap left between the first vaporizer and the second vaporizer serves as a heating-gas flow passage. In the second vaporizer, the water flowing through the second flow passage is heated by heating gas flowing through the heating-gas flow passage, and thereby the water is turned into steam. In the raw-material mixing portion, the mixture is obtained by mixing the raw material with the steam flowing through the duct after flowing out of the second flow passage. In the first vaporizer, while flowing through the first flow passage, the mixture is heated further by the heating gas flowing through the heating-gas flow passage. The mixture is supplied to the reforming-catalyst layer. Accordingly, the water flowing through the second flow passage of the second vaporizer and the mixture flowing through the first flow passage of the first vaporizer can be heated efficiently by the heating gas flowing through the heating-gas flow passage formed between the first vaporizer and the second vaporizer.

In addition, while the steam that has flowed out of the second flow passage of the second vaporizer flows through the duct, the steam flows at a larger velocity (for example, approximately at 50 m/s) than the water (liquid). Accordingly, the raw material that is mixed with the steam in the raw-material mixing portion formed at a certain point of the duct can be agitated well by this high-velocity steam, and can be uniformly dispersed in the steam. As a consequence, the steam and the raw material can be uniformly mixed together. In this case, even when the raw material is liquid fuel, such as kerosene, or even when only a small amount of the raw material is supplied, the steam and the raw material can be uniformly mixed together. Moreover, in the first vaporizer, together with the steam, the raw material is vaporized and the temperature thereof is raised. Accordingly, even when the raw material that is likely to precipitate carbon, such as kerosene, is used, the precipitation of carbon from the raw material can be prevented, and thereby the degradation of the reforming catalyst can be prevented. When the raw material is vaporized in the raw fuel vaporizer as in the conventional cases, the complicated controlling of the temperature rise is necessary, but such complicated controlling of the temperature rise is no longer necessary.

The reforming apparatus according to the third aspect of the present invention has a characteristic feature in that a low-temperature CO-shift catalyst layer is disposed at an inner side of the second vaporizer. Accordingly, the reformed gas that has flowed out of the reforming-catalyst layer flows through the low-temperature CO-shift catalyst layer. The mixture or the water flowing through the second flow passage of the second vaporizer at this time absorbs the heat produced by the CO-shift reaction of the reformed gas that takes place in the low-temperature CO-shift catalyst layer, and thereby the mixture or the water cools the reformed gas down.

In addition, the second vaporizer surrounds the low-temperature CO-shift catalyst layer. Also, while the reforming apparatus is in steady operation, the mixture or the water flows through the second flow passage of the second vaporizer. Accordingly, the low-temperature CO-shift catalyst layer is not raised by the contact with the heating gas flowing through the heating-gas flow passage located at the outer side of the second vaporizer. Moreover, the mixture or the water flowing through the second flow passage of the second vaporizer can certainly absorb the heat produced by the CO-shift reaction that takes place in the low-temperature CO-shift catalyst layer, and thereby can certainly cool the reformed gas. Accordingly, unlike the conventional cases, it is possible to prevent an increase in the CO-concentration in the reformed gas flowing out of the low-temperature CO-shift catalyst layer that is caused by the insufficient cooling of the reformed gas. For this reason, even when the reformed gas that has flowed out of the low-temperature CO-shift catalyst layer further flows through the CO-removing catalyst layer, the amount of air for CO selective oxidation to be supplied to the CO-removing catalyst layer can be reduced, so that the reforming efficiency can be improved. In addition, the use of the methanation-type CO-removing catalyst whose temperature is difficult to control is no longer necessary.

The reforming apparatus according to the fourth aspect of the present invention has the following characteristic features. A reforming pipe in which the reforming-catalyst layer is installed is disposed above the first vaporizer and the second vaporizer; while any one of the mixture that has flowed out of the second flow passage of the second vaporizer and the mixture that has flowed out of the first flow passage of the first vaporizer flows into the reforming-catalyst layer from a lower end thereof and then flows upwards through the reforming-catalyst layer, the mixture is turned into the reformed gas through a steam-reforming process; the reformed gas flows out of an upper end of the reforming-catalyst layer, flows downwards, flows into the low-temperature CO-shift catalyst layer from an upper end thereof, and then flows downwards through the low-temperature CO-shift catalyst layer. This structure allows the reforming pipe, the first vaporizer, the second vaporizer, and the low-temperature CO-shift catalyst layer to be provided in a compact and reasonable arrangement that considers the flows of the mixture and the reformed gas (i.e., the heat exchange between the mixture and the reformed gas) and the like.

The reforming apparatus according to the fifth aspect of the present invention has a characteristic feature in that a burner to produce the heating gas is disposed at an upper-end side of the reforming pipe so as to face downwards. Accordingly, when some troubles occurs in the burner, the maintenance work can be carried out simply by removing the burner from the apparatus, without turning the reforming apparatus upside downs, unlike the conventional cases. In addition, in comparison to the lengthy burners employed in the conventional cases, the burner can be used easily since it can be very short. Thus, the adjustment work, the exchanging work and the like for the burner can be done on site with only human power.

The reforming apparatus according to the sixth aspect of the present invention has characteristic features in that a CO-removing catalyst layer is cylindrically disposed so as to surround the first vaporizer, and the reformed gas that has flowed out of the low-temperature CO-shift catalyst layer flows through the CO-removing catalyst layer. Accordingly, while the reformed gas that has flowed out of the low-temperature CO-shift catalyst layer flows through the CO-removing catalyst layer, the water or the mixture flowing through the first flow passage of the first vaporizer at this time absorbs the heat produced by the CO-selective-oxidation reaction of the reformed gas that takes place in the CO-removing catalyst layer and thus cools the reformed gas.

In addition, the first vaporizer exists between the heating-gas flow passage and the CO-removing catalyst layer. While the reforming apparatus is in steady operation, the water or the mixture flows through the first flow passage of the first vaporizer. Accordingly, the CO-removing catalyst layer is not contact with the heating gas flowing through the heating-gas flow passage located at the inner side of the first vaporizer, so that no temperature rise of the CO-removing catalyst layer is provoked by such a contact. Moreover, the water or the mixture flowing through the first flow passage of the first vaporizer can certainly absorb the heat produced by the CO-selective-oxidation reaction that takes place in the CO-removing catalyst layer, and thus can certainly cool the reformed gas down. As a consequence, the CO-removing catalyst of the CO-removing catalyst layer that has been cooled down approximately to the vaporizing temperature of water has a high CO-removing capability. Accordingly, the employment of a methanation-type CO-removing catalyst whose temperature is difficult to control is not necessary.

The reforming apparatus according to the seventh aspect of the present invention has the following characteristic features. A high-temperature CO-shift catalyst layer is provided at a position which allows the reformed gas to pass the high-temperature CO-shift catalyst layer before passing through the low-temperature CO-shift catalyst layer. The reformed gas that has flowed out of the reforming-catalyst layer flows through the high-temperature CO-shift catalyst layer, and then flows through the low-temperature CO-shift catalyst layer. Accordingly, in addition to the low-temperature CO-shift catalyst layer, the high-temperature CO-shift catalyst layer is provided as another CO-shift catalyst layer. The high-temperature CO-shift catalyst has a high operation temperature and is heat resistant. In addition, because of the high operation temperature, the high-temperature CO-shift catalyst has a high reaction rate. Accordingly, the amount of the high-temperature CO-shift catalyst needed to remove CO is smaller than the low-temperature CO-shift catalyst. As a consequence, the CO-concentration in the reformed gas having passed through the high-temperature CO-shift catalyst layer is lower than the CO-concentration in the conventional reformed gas of, for example, 650° C. level. Accordingly, even if the reformed gas flows into the low-temperature CO-shift catalyst layer, the temperature of the low-temperature CO-shift catalyst is raised to a lesser extent by the heat produced by the CO-shift reaction, so that the low-temperature CO-shift catalyst can have a longer service life. In addition, when the temperature of the low-temperature CO-shift catalyst is not raised, the temperature at the outlet of the low-temperature CO-shift catalyst layer is also lowered down. For a reason related to the equilibrium reaction, the CO-concentration in the reformed gas that flows out of the low-temperature CO-shift catalyst layer is also lowered down. As a consequence, when the reformed gas that has flowed out of the low-temperature CO-shift catalyst layer flows further through the CO-removing catalyst layer, the load on the CO-removing catalyst can be reduced.

The reforming apparatus according to the eighth aspect of the present invention has the following characteristic features. The reforming apparatus comprises a reforming-portion cylindrical pipe that is disposed so as to surround the reforming pipe. The reforming pipe has a triple-pipe structure including an inner cylindrical pipe located at the inner side, an outer cylindrical pipe located at the outer side, and an intermediate cylindrical pipe located between the inner cylindrical pipe and the outer cylindrical pipe, all of these pipes disposed concentrically so as to surround the burner. A lower-end side of the inner cylindrical pipe is closed by a lower-end plate. An upper-end side of an interstice between the inner cylindrical pipe and the outer cylindrical pipe is closed by a first upper-end plate; a gap left between the first upper-end plate and an upper end of the intermediate cylindrical pipe serves as a reformed-gas turning portion. A cylindrical gap left between the intermediate cylindrical pipe and the inner cylindrical pipe serves as a reformed-gas flow passage. The reforming-catalyst layer is cylindrically formed between the intermediate cylindrical pipe and the outer cylindrical pipe. An upper-end side of the reforming-portion cylindrical pipe is closed by a second upper-end plate; a gap left between the second upper-end plate and the first upper-end plate serves as a heating-gas turning portion. A cylindrical gap left between the reforming-portion cylindrical pipe and the outer cylindrical pipe serves as a heating-gas flow passage. Heating gas discharged downwards from the burner flows upwards along an inner-circumferential surface of the inner cylindrical pipe; while the heating gas turns around at the heating-gas turning portion and flows downwards through the heating-gas flow passage, the heating gas heats the reforming-catalyst layer, and then flows into the heating-gas flow passage formed between the first vaporizer and the second vaporizer. The reformed gas that has flowed out from the upper end of the reforming-catalyst layer turns around at the reformed-gas turning portion, flows downwards through the reformed-gas flow passage, and then flows into the low-temperature CO-shift catalyst layer from the upper end thereof. Accordingly, the heating gas can efficiently heat the reforming-catalyst layer both from the inner side and from the outer side of the cylindrical reforming pipe (reforming-catalyst layer). In addition, the reforming pipe is of a single-pipe type, which is different from the conventionally-employed multi-tubular type. Accordingly, the duct to put multiple reforming pipes together, a header tank, and the like are not necessary. As a consequence, the manufacturing cost can be reduced.

The reforming apparatus according to the ninth aspect of the present invention has a characteristic feature in that each of the first flow passage and the second flow passage is formed into a spiral shape. Accordingly, the water or the mixture flows spirally in the first flow passage, and the mixture or the water flows spirally in the second flow passage. As a consequence, the heat exchange between the heating gas and the water or the mixture in the first vaporizer as well as the heat exchange between the heating gas and the water or the mixture in the second vaporizer can be carried out with certainty. If each of the second flow passage and the first flow passage is, for example, a simple cylindrically-shaped flow passage, the velocity of the mixture becomes slower. Accordingly, the water (steam) and the raw material in the mixture are separated from each other, so that the proportion between the water (steam) and the raw material (S/C=Steam/Carbon) may possibly deviate from a planned value, and carbon may possibly precipitate from the raw material, which results in a shorter service life of the reforming catalyst. In contrast, the use of the spiral second flow passage or the spiral first flow passage makes the velocity of the mixture higher than the case of the above-described simple cylindrically-shaped flow passage and the like. Accordingly, the separation of the water (steam) and the raw material in the mixture can be prevented.

The reforming apparatus according to the tenth aspect of the present invention has the following characteristic features. The first vaporizer has a double-pipe structure formed by fitting a cylindrical pipe onto the outer-circumferential surface side of a wavy pipe having spirally protruding and recessed portions formed in the outer-circumferential surface of the wavy pipe; a spiral gap formed between the wavy pipe and the cylindrical pipe serves as the first flow passage. The second vaporizer has a double-pipe structure formed by fitting a different cylindrical pipe onto the outer-circumferential surface side of a different wavy pipe having spirally protruding and recessed portions formed in the outer-circumferential surface of the different wavy pipe; a spiral gap formed between the different wavy pipe and the different cylindrical pipe serves as the second flow passage. Accordingly, similar advantageous effects to those obtained according to the ninth invention can be obtained according to the tenth invention. In addition, the water or the mixture and the heating gas are in surface-to-surface contact with each other with the wavy pipe of the first vaporizer located in between. The mixture or the water and the heating gas are in surface-to-surface contact with each other with the cylindrical pipe of the second vaporizer located in between. Moreover, the protruding and recessed portions of the wavy pipe of the first vaporizer makes the flow of the heating gas 88 turbulent. Accordingly, the heat exchange between the water and the heating gas as well as between the mixture and the heating gas can be carried out efficiently.

The reforming apparatus according to the eleventh aspect of the present invention has the following characteristic features. The low-temperature CO-shift catalyst layer is provided inside a cylindrical pipe. A cylindrical gap left between the cylindrical pipe and the second vaporizer serves as a reformed-gas flow passage. While the reformed gas that has flowed out of the reforming-catalyst layer flows through the reformed-gas flow passage, the temperature of the reformed gas is lowered by heat exchange with any one of the mixture and the water that flows through the second flow passage of the second vaporizer; after that, the reformed gas flows into the inside of the cylindrical pipe by way of a circulation hole formed in the cylindrical pipe, and then flows through the low-temperature CO-shift catalyst layer. With this configuration, the second vaporizer surrounds the low-temperature CO-shift catalyst layer, and the mixture or the water flows through the second flow passage of the second vaporizer while the reforming apparatus is in the steady operation. For this reason, the low-temperature CO-shift catalyst layer (cylindrical pipe) is not brought into contact with the heating gas that flows through the heating-gas flow passage formed at the outer side of the second vaporizer, so that the temperature of the low-temperature CO-shift catalyst layer is not raised by such a contact. In addition, the mixture or the water that flows through the second flow passage of the second vaporizer can certainly absorb the heat produced by the CO-shift reaction that takes place in the low-temperature CO-shift catalyst layer, and can certainly cool the reformed gas down. Accordingly, unlike the conventional cases, it is possible to prevent an increase in the CO-concentration in the reformed gas that flows out of the low-temperature CO-shift catalyst layer that is caused by insufficient cooling of the reformed gas. For this reason, even when the reformed gas that has flowed out of the low-temperature CO-shift catalyst layer further flows through the CO-removing catalyst layer, the amount of air for CO selective oxidation supplied to the CO-removing catalyst layer can be reduced, so that the reforming efficiency can be improved. In addition, the use of the methanation-type CO-removing catalyst whose temperature is difficult to control is no longer necessary.

The reforming apparatus according to any one of the twelfth and the thirteenth aspects of the present invention has the following characteristic features. The low-temperature CO-shift catalyst layer is cylindrically disposed between a first cylindrical pipe disposed at an inner side of the second vaporizer and a second cylindrical pipe disposed inside the first cylindrical pipe. A cylindrical gap left between the first cylindrical pipe and the second vaporizer serves as a first reformed-gas flow passage. The inside of the second cylindrical pipe serves as a second reformed-gas flow passage. While the reformed gas that has flowed out of the reforming-catalyst layer flows through the first reformed-gas flow passage from a first-end side to a second-end side of the low-temperature CO-shift catalyst layer, the temperature of the reformed gas is lowered by heat exchange with any one of the mixture and the water that flows through the second flow passage of the second vaporizer; the reformed gas then turns around at a reformed-gas turning portion located at the second-end side of the low-temperature CO-shift catalyst layer; while the reformed gas flows through the second reformed-gas flow passage from the second-end side to the first-end side of the low-temperature CO-shift catalyst layer, the temperature of the reformed gas is raised by heat exchange with the low-temperature CO-shift catalyst layer; after that, the reformed gas flows into an interstice between the first cylindrical pipe and the second cylindrical pipe via a circulation hole formed in the second cylindrical pipe, and then flows through the low-temperature CO-shift catalyst layer. Accordingly, similar advantageous effects to those obtained by the eleventh invention can be obtained according to any one of the twelfth and thirteenth invention. In addition, the heat transfer from the low-temperature CO-shift catalyst layer to the second vaporizer (the mixture or the water) can be achieved not only by radiant heat transfer but by convective heat transfer caused by the flow of the reformed gas flowing through the reformed-gas flow passage formed between the low-temperature CO-shift catalyst layer and the second vaporizer. Accordingly, the second vaporizer (the mixture or the water) exhibits higher performance of cooling the low-temperature CO-shift catalyst layer than the case where the heat transfer is carried out only by the radiant heat transfer.

Moreover, the reformed gas flows both through the first reformed-gas flow passage located at the outer side of the low-temperature CO-shift catalyst layer and through the second reformed-gas flow passage located at the inner side thereof. Accordingly, even when the supply of the process water 85 is started after the heating operation for temperature rising and the steam of this water then flows in, no condensation of the steam takes place in the low-temperature CO-shift catalyst layer because the steam is condensed firstly in the first reformed-gas flow passage and the second reformed-gas flow passage, that is, on the outer surface of the first cylindrical pipe and on the inner surface of the second cylindrical pipe. In addition, when the steam is condensed on the outer surface of the first cylindrical pipe and on the inner surface of the second cylindrical pipe, the latent heat of condensation is transferred to the low-temperature CO-shift catalyst layer, so that the temperature of the low-temperature CO-shift catalyst layer rises. Accordingly, when the steam flows into the low-temperature CO-shift catalyst layer, the steam should not be condensed in the low-temperature CO-shift catalyst layer. As a consequence, degradation of the low-temperature CO-shift catalyst can be prevented from being provoked by the condensation of the steam.

In addition, the reformed gas that is flowing through the second reformed-gas flow passage also cools the inner-side portion of the low-temperature CO-shift catalyst layer. Accordingly, the temperature rise of this inner-side portion can be prevented, and thus the CO-concentration in the reformed gas that passes through this inner-side portion can be lowered down.

The reforming apparatus according to the fourteenth aspect of the present invention has a characteristic feature in that a high-temperature CO-shift catalyst is disposed in an area that is located at an inner side of a reforming pipe in which the reforming-catalyst layer is installed and that is located above the low-temperature CO-shift catalyst layer, the area being where the reformed gas flows in. Accordingly, the reformed gas that has flowed out of the upper end of the reforming-catalyst layer flows downwards, flows into the high-temperature CO-shift catalyst layer from the upper end thereof, and then flows downwards through the high-temperature CO-shift catalyst layer. After that the reformed gas flows into the low-temperature CO-shift catalyst layer from the upper end thereof.

For this reason, similar advantageous effects to those obtained according to the seventh invention can be obtained according to any one of the fourteenth invention. In addition, while the reforming apparatus is in heating operation for temperature rising to raise, by heating, the temperature of the reforming pipe (reforming-catalyst layer) by the heating gas, the temperature of the high-temperature CO-shift catalyst layer located inside the reforming pipe (intermediate cylindrical pipe) can be raised by being heated by way of the reforming pipe (reforming-catalyst layer).

The reforming apparatus according to the fifteenth aspect of the present invention has the following characteristic features. The low-temperature CO-shift catalyst layer is cylindrically disposed between a first cylindrical pipe disposed at an inner side of the second vaporizer and a second cylindrical pipe disposed inside the first cylindrical pipe. A high-temperature CO-shift catalyst layer is cylindrically disposed between the first cylindrical pipe and the second cylindrical pipe, and above the low-temperature CO-shift catalyst layer. A cylindrical gap left between the first cylindrical pipe and the second vaporizer serves as a first reformed-gas flow passage. The inside of the second cylindrical pipe serves as a second reformed-gas flow passage. While the reformed gas that has flowed out of the reforming-catalyst layer flows downwards through the first reformed-gas flow passage from an upper-end side of the high-temperature CO-shift catalyst layer to an lower-end side of the low-temperature CO-shift catalyst layer, the temperature of the reformed gas is lowered by heat exchange with any one of the mixture and the water that flows through the second flow passage of the second vaporizer; the reformed gas then turns around at a reformed-gas turning portion located at the lower-end side of the low-temperature CO-shift catalyst layer; while the reformed gas flows upwards through the second reformed-gas flow passage from the lower-end side of the low-temperature CO-shift catalyst layer to the upper-end side of the high-temperature CO-shift catalyst layer, the temperature of the reformed gas is raised by heat exchange with the low-temperature CO-shift catalyst layer and the high-temperature CO-shift layer; after that, the reformed gas turns around at a reformed-gas turning portion located at an upper end of the second reformed-gas flow passage; the reformed gas flows into an interstice between the first cylindrical pipe and the second cylindrical pipe, and flows downwards through the high-temperature CO-shift catalyst layer and then through the low-temperature CO-shift catalyst layer. Accordingly, similar advantageous effects to those obtained according to the eleventh and the twelfth inventions can be obtained according to any one of the fifteenth invention.

In addition, as described above, the latent heat of condensation produced when the steam is condensed on the outer surface of the first cylindrical pipe and on the inner surface of the second cylindrical pipe at the start of the supply of the water, is transferred also to the high-temperature CO-shift catalyst layer. Accordingly, the temperature of the high-temperature CO-shift catalyst layer rises. For this reason, when the steam flows into the high-temperature CO-shift catalyst layer, the steam should not be condensed in the high-temperature CO-shift catalyst layer. As a consequence, degradation of the high-temperature CO-shift catalyst can be prevented from being provoked by the condensation of the steam.

In addition, the reformed gas that is flows through the second reformed-gas flow passage also cools the inner-side portions of the low-temperature CO-shift catalyst layer and of the high-temperature CO-shift catalyst layer. Accordingly, the temperature rise of these inner-side portions can be prevented, and thus the CO-concentration in the reformed gas that passes through these inner-side portions can be lowered down.

In addition to the low-temperature CO-shift catalyst layer, the high-temperature CO-shift catalyst layer is provided as another CO-shift catalyst layer. The high-temperature CO-shift catalyst has a high operation temperature and is heat resistant. In addition, because of the high operation temperature, the high-temperature CO-shift catalyst has a high reaction rate. Accordingly, the amount of the high-temperature CO-shift catalyst needed to remove CO is smaller than the low-temperature CO-shift catalyst. As a consequence, the CO-concentration in the reformed gas that has passed through the high-temperature CO-shift catalyst layer is lower than the CO-concentration in the conventional reformed gas of, for example, 650° C. level. Accordingly, even if the reformed gas flows into the low-temperature CO-shift catalyst layer, the temperature of the low-temperature CO-shift catalyst is raised to a lesser extent by the heat produced by the CO-shift reaction, so that the low-temperature CO-shift catalyst can have a longer service life. In addition, when the temperature of the low-temperature CO-shift catalyst is not raised, the temperature at the outlet of the low-temperature CO-shift catalyst layer is also lowered down. For a reason related to the equilibrium reaction, the CO-concentration in the reformed gas that has flowed out of the low-temperature CO-shift catalyst layer is also lowered down. As a consequence, when the reformed gas that has flowed out of the low-temperature CO-shift catalyst layer flows further through the CO-removing catalyst layer, the load on the CO-removing catalyst can be reduced.

In addition, in the fabrication processes of the reforming apparatus, it is not necessary to form, in advance, the high-temperature CO-shift catalyst layer in the reforming apparatus. Instead, as a separate process, the high-temperature CO-shift catalyst layer can be fabricated simultaneously with the low-temperature CO-shift catalyst layer by using the first cylindrical pipe and of the second cylindrical pipe. Then, the high-temperature CO-shift catalyst layer and the low-temperature CO-shift catalyst layer can be assembled later to the reforming apparatus. Accordingly, the handling of these members in the fabrication processes can be improved, resulting in a reduction in the manufacturing cost.

In addition, while the reforming apparatus is in heating operation for temperature rising, the temperature of the reforming pipe (reforming-catalyst layer) is raised by being heated by the heating gas. At this time, since the first reformed-gas flow passage exists between the reforming-catalyst layer (intermediate cylindrical pipe) and the high-temperature CO-shift catalyst layer (first cylindrical pipe), the portion of the reforming-catalyst layer where the high-temperature CO-shift catalyst layer is disposed is also less influenced by the heat capacity of the high-temperature CO-shift catalyst layer. Accordingly, the temperature of the above-mentioned portion can be raised smoothly by the heating gas. Even when the temperature-rise of the high-temperature CO-shift catalyst layer at this time is insufficient, the temperature of the high-temperature CO-shift catalyst layer can be raised by the latent heat of condensation of the steam, as described above. Accordingly, no condensation of steam takes place in the high-temperature CO-shift catalyst layer.

The reforming apparatus according to the sixteenth aspect of the present invention has the following characteristic features. The reforming apparatus comprises: an $O_2$-adsorption catalyst layer disposed inside the cylindrical pipe; a heating-gas induction pipe that penetrates the low-temperature CO-shift catalyst layer and the $O_2$-adsorption catalyst layer; a condenser that removes moisture from the heating gas; and a pump that sucks the heating gas. When the reforming apparatus is stopped, the heating gas is sucked by the pump; the condenser removes the moisture; the heating gas is introduced to an upper-end side of the $O_2$-adsorption catalyst layer by way of the heating-gas induction pipe; after that, the heating gas turns around and flows through the $O_2$-adsorption catalyst layer, so that $O_2$ is removed from the heating gas and thereby $O_2$-less gas is produced. Part of the $O_2$-less gas flows through the low-temperature CO-shift catalyst layer and thereby discharges steam that remains in the low-temperature CO-shift catalyst layer, or the part of the $O_2$-less gas flows through the low-temperature CO-shift catalyst layer and then through the CO-removing catalyst layer, and thereby discharges the steam that remains in the low-temperature CO-shift catalyst layer and in the CO-removing catalyst layer. The rest of the $O_2$-less gas flows out via the circulation hole formed in the cylindrical pipe, and then flows through the reforming-catalyst layer and thereby discharges steam that remains in the reforming-catalyst layer. Accordingly, when the reforming apparatus is stopped, the steam that remains in the reforming-catalyst layer and in the low-temperature CO-shift catalyst layer, or the steam that remains in the reforming-catalyst layer, in the low-temperature CO-shift catalyst layer, and in the CO-removing catalyst layer can be discharged by the $O_2$-less gas. As a consequence, degradation of the catalysts in these catalyst layers can be prevented from being provoked by the condensation of the steam.

The reforming apparatus according to the seventeenth aspect of the present invention has the following characteristic features. The reforming apparatus comprises: a first $O_2$-adsorption catalyst layer and a second $O_2$-adsorption catalyst layer both of which are cylindrically disposed between the first cylindrical pipe and the second cylindrical pipe, and both of which are disposed between the low-temperature CO-shift catalyst layer and the high-temperature CO-shift catalyst layer with the first $O_2$-adsorption catalyst layer being positioned on a side closer to the low-temperature CO-shift catalyst layer and with the second $O_2$-adsorption catalyst layer being positioned on a side closer to the high-temperature CO-shift catalyst layer; a heating-gas induction pipe that penetrates the low-temperature CO-shift catalyst layer and the first $O_2$-adsorption catalyst layer; a condenser that removes moisture from the heating gas; and a pump that sucks the heating gas. When the reforming apparatus is stopped, the heating gas is sucked by the pump; the condenser removes the moisture; the heating gas is introduced to a portion located between the first $O_2$-adsorption catalyst layer and the second $O_2$-adsorption catalyst layer by way of the heating-gas induction pipe. After that, part of the heating gas introduced into this portion located between the first $O_2$-adsorption catalyst layer and the second $O_2$-adsorption catalyst layer turns around and flows through the first $O_2$-adsorption catalyst layer, so that $O_2$ is removed from the heating gas and thereby $O_2$-less gas is produced; the $O_2$-less gas flows through the low-temperature CO-shift catalyst layer and thereby discharges steam that remains in the low-temperature CO-shift catalyst layer, or the $O_2$-less gas flows through the low-temperature CO-shift catalyst layer and then through the CO-removing catalyst layer, and thereby discharges steam that remains in the low-temperature CO-shift catalyst layer and in the CO-removing catalyst layer. The rest of the heating gas introduced into the portion located between the first $O_2$-adsorption catalyst layer and the second $O_2$-adsorption catalyst layer flows through the second $O_2$-adsorption catalyst layer, so that $O_2$ is removed from the heating gas and thereby $O_2$-less gas is produced; the $O_2$-less gas flows through the high-temperature CO-shift catalyst layer and then flows out via the reformed-gas turning portion located at the end of the second reformed-gas flow passage; after that, the heating gas flows through the reforming-catalyst layer and thereby discharges steam that remains in the high-temperature CO-shift catalyst layer and in the reforming-catalyst layer. Accordingly, when the reforming apparatus is stopped, the steam that remains in the reforming-catalyst layer, in the high-temperature CO-shift catalyst layer, and in the low-temperature CO-shift catalyst layer, or the steam that remains in the reforming-catalyst layer, in the high-temperature CO-shift catalyst layer, in the CO-shift catalyst layer, in the low-temperature CO-shift catalyst layer, and in the CO-removing catalyst layer can be discharged by the $O_2$-less gas. As a consequence, degradation of the catalysts in these catalyst layers can be prevented from being provoked by the condensation of the steam.

The reforming apparatus according to the eighteenth aspect of the present invention has the following characteristic features. A cylindrically-shaped header tank is disposed at a portion located between an outlet of the second flow passage of the second vaporizer and an inlet of the reforming-catalyst layer, or at a position located between an outlet of the first flow passage of the first vaporizer and the inlet of the reforming-catalyst layer; a plurality of ejection holes are formed in a side surface or a top surface of the header tank in a circumferential direction of the header tank. The mixture that has flowed out via the outlet of the second flow passage of the second vaporizer or via the outlet of the first flow passage of the first vaporizer flows into the header tank; after that, the mixture jets out through the ejection holes, and flows into the reforming-catalyst layer via the inlet thereof. Accordingly, when the mixture is supplied to the cylindrical reforming-catalyst layer, the mixture can be uniformly dispersed in the circumferential direction of the reforming-catalyst layer by the header tank. As a consequence, the reforming efficiency can be improved.

The reforming apparatus according to the nineteenth aspect of the present invention has the following characteristic features. The reforming apparatus comprises: a duct for cleaning that connects the outlet of the second flow passage of the second vaporizer to the inlet of the reforming-catalyst layer, or connects the outlet of the first flow passage of the first vaporizer to the inlet of the reforming-catalyst layer; and a removable portion for cleaning that is detachably attached to a certain point of the duct for cleaning. When the removable portion for cleaning is removed and a chemical liquid is poured in through a fill port of the duct for cleaning, the chemical liquid flows through the second flow passage of the second vaporizer and then through the first flow passage of the first vaporizer, or the chemical liquid flows through the first flow passage of the first vaporizer and then the second flow passage of the second vaporizer. Accordingly, even when long-time operation of the reforming apparatus makes the solid components, such as silica, contained in the water precipitate in the first flow passage and in the second flow passage, the solid components can be removed by removing the removable portion for cleaning, pouring the chemical liquid in through the fill port of the duct for cleaning, and then making the chemical liquid 111 flow through the second flow passage and then through the first flow passage or through the first flow passage and then through the second flow passage, while the reforming apparatus is not in operation. As a consequence, the solid components can be prevented from clogging the first flow passage and the second flow passage.

The reforming apparatus according to the twentieth aspect of the present invention has the following characteristic features. The raw-material mixing portion has a double-nozzle structure including an external nozzle and an internal nozzle disposed inside the external nozzle. Any one of the steam that has flowed out of the first flow passage of the first vaporizer and the steam that has flowed out of the second flow passage of the second vaporizer flows through an interstice between the external nozzle and the internal nozzle, and the raw material flows through the internal nozzle. Or, the raw material flows through the interstice between the external nozzle and the internal nozzle, and any one of the steam that has flowed out of the first flow passage of the first vaporizer and the steam that has flowed out of the second flow passage of the second vaporizer flows through the internal nozzle. Accordingly, in the raw-material mixing portion, the raw material is turned into fine spray and is then uniformly mixed with the water (steam). As a consequence, the precipitation of carbon from the raw material can be prevented with more certainty, and degradation of the reforming catalyst can be thus prevented with more certainty.

The reforming apparatus according to the twenty-first aspect of the present invention has a characteristic feature in that a cylindrically-shaped thermally-insulating material is disposed so as to surround the reforming-portion cylindrical pipe. Accordingly, the heat radiation from the surface of the reforming-portion cylindrical pipe can be reduced by the thermally-insulating material. Incidentally, the thermally-insulating material may be obtained by using an inexpensive material made of, for example, ceramic fiber in an appropriate thickness.

The method of operating the reforming apparatus according to the twenty-second aspect of the present invention has the following characteristic features. During heating operation for temperature rising for starting the reforming apparatus, without supplying the water or the raw material, the heating gas of the burner flows upwards along the inner-circumferential surface of the inner cylindrical pipe of the reforming pipe, then turns around at the heating-gas turning portion, and then flows downwards through the heating-gas flow passage located outside the reforming pipe; after that, the heating gas flows downwards through the heating-gas flow passage formed between the first vaporizer and the second vaporizer; as a consequence, the heating gas sequentially raises, by heating, the temperatures of the reforming pipe and the reforming-catalyst layer, the temperatures of the first vaporizer and the second vaporizer, and then the temperature of the low-temperature CO-shift catalyst layer. Accordingly, the temperatures of various parts of the reforming apparatus can be efficiently raised by being heated by the heating gas.

The method of operating the reforming apparatus according to the twenty-third aspect of the present invention has the following characteristic features. During heating operation for temperature rising for starting the reforming apparatus, without supplying the water or the raw material, the heating gas of the burner flows upwards along the inner-circumferential surface of the inner cylindrical pipe of the reforming pipe, then turns around at the heating-gas turning portion, and then flows downwards through the heating-gas flow passage located outside the reforming pipe; after that, the heating gas flows downwards through the heating-gas flow passage formed between the first vaporizer and the second vaporizer; as a consequence, the heating gas sequentially raises, by heating, the temperatures of the reforming pipe and the reforming-catalyst layer, the temperatures of the first vaporizer and the second vaporizer, and then the temperature of the low-temperature CO-shift catalyst layer. Subsequently, the water is supplied without supplying the raw material, then flows through the first flow passage of the first vaporizer and then through the second flow passage of the second vaporizer, or flows through the second flow passage of the second vaporizer and then through the first flow passage of the first vaporizer; thereby the water is heated by the heating gas flowing through the heating-gas flow passage formed between the first vaporizer and the second vaporizer so that steam is produced; after the steam flows through the reforming-catalyst layer and while the steam flows through the first reformed-gas flow passage and then through the second reformed-gas flow passage, the steam is condensed on the outer surface of the first cylindrical pipe and on the inner surface of the second cylindrical pipe, and then the condensation thus occurred heats the low-temperature CO-shift catalyst layer and raises the temperature thereof. Accordingly, the temperatures of various parts of the reforming apparatus can be efficiently raised by being heated by the heating gas. In addition, the temperature of the low-temperature CO-shift catalyst layer can be raised more certainly by being heated by the latent heat of condensation of the steam.

The method of operating the reforming apparatus according to the twenty-fourth aspect of the present invention has the following characteristic features. While the reforming apparatus is in steady operation, the temperature of the reformed gas at an outlet of the reforming-catalyst layer is measured; an amount of fuel to be supplied to the burner is controlled so that the measured value of the temperature of the reformed gas is kept at a predetermined temperature. In addition, the temperature of the reformed gas at an inlet of the low-temperature CO-shift catalyst layer is measured; an amount of air to be supplied to the burner is controlled so that the measured value of the temperature of the reformed gas is kept at a predetermined temperature. Accordingly, the temperature of the reformed gas at the outlet of the reforming-catalyst layer and the temperature of the reformed gas at the inlet of the low-temperature CO-shift catalyst layer can be kept at their respective predetermined temperatures with certainty.

The method of operating the reforming apparatus according to the twenty-fifth aspect of the present invention has the following characteristic features. While the reforming apparatus is in steady operation, the temperature of the reformed gas at an outlet of the reforming-catalyst layer is measured; an amount of fuel to be supplied to the burner is controlled so that the measured value of the temperature of the reformed gas is kept at a predetermined temperature. In addition, any one of the temperature of the mixture at an outlet of the second flow passage of the second vaporizer and the temperature of the mixture at an outlet of the first flow passage of the first vaporizer is measured; an amount of air to be supplied to the burner is controlled so that the measured value of the temperature of the mixture is kept at a predetermined temperature. Accordingly, the temperature of the reformed gas at the outlet of the reforming-catalyst layer, the temperature of the mixture at the outlet of the second flow passage of the second vaporizer or the temperature of the mixture at the outlet of the first flow passage of the first vaporizer can be kept at their respective predetermined temperatures with certainty.

BRIEF DESCRIPTION OF THE DRAWINGS

FIG. 4 (a) shows a vertical section of a raw-material mixing portion that the reforming apparatus is provided with.

FIG. 4 (b) shows a cross section taken along and viewed as indicated by the arrowed line C-C of FIG. 4 (a).

FIG. 11 shows a block diagram of a temperature control system that the reforming apparatus is provided with.

DESCRIPTION OF SYMBOLS

Figure 1:
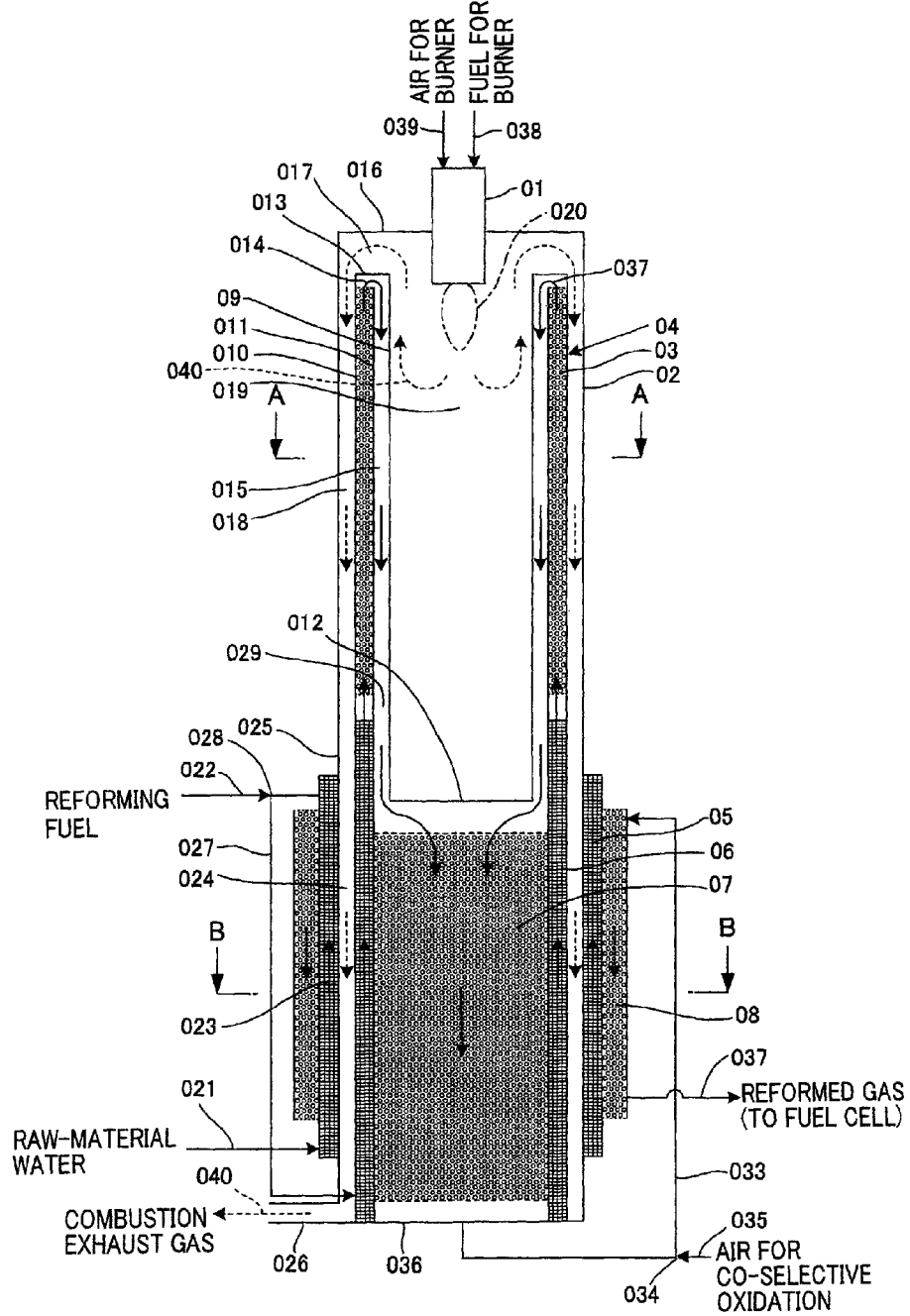
FIG. 1 shows a vertical section of a reforming apparatus according to Embodiment 1 of the present invention.

01: burner; 02: reforming-portion cylindrical pipe; 03: reforming-catalyst layer; 04: reforming pipe; 05: first vaporizer; 06: second vaporizer; 07: low-temperature CO-shift catalyst layer; 08: CO-removing catalyst layer; 09: inner cylindrical pipe; 010: outer cylindrical pipe; 011: intermediate cylindrical pipe; 012: bottom-end plate; 013: upper-end plate; 014: reformed-gas turning portion; 015: reformed-gas flow passage; 016: upper-end plate; 017: heating-gas turning portion; 018: heating-gas flow passage; 019: combustion-portion; 020: flame; 021: water; 022: raw material; 023: mixture; 024: heating-gas flow passage; 025: cylindrical pipe; 026: exhaust pipe; 027: duct; 028: raw-material mixing portion; 029: reformed-gas flow passage; 030: external nozzle; 030a: cylindrical portion; 030b tapered portion; 031: internal nozzle; 031a: cylindrical portion; 031b: tapered portion; 032: raw-material supply pipe; 033: duct; 034: air mixing portion; 035: air for CO selective oxidation; 036: bottom-end plate; 037: reformed gas; 038: fuel for burner; 039 air for burner; 040: heating gas; 1: burner; 2: reforming pipe; 3: high-temperature CO-shift catalyst layer; 4: first vaporizer; 4a: flow passage; 4a-1: inlet; 4a-2: outlet; 4A: wavy pipe; 4B: cylindrical pipe; 4B-1: upper-end portion; 5: second vaporizer; 5a: flow passage; 5a-1: outlet; 5a-2: inlet; 5A: wavy pipe; 5B: cylindrical pipe; 6, 6A, and 6B: $O_2$-adsorption catalyst layer; 7: low-temperature CO-shift catalyst layer; 8: CO-removing catalyst layer; 9: thermally-insulating material; 9a: upper portion; 10: reforming-portion cylindrical pipe; 11: inner cylindrical pipe; 12: outer cylindrical pipe; 13: intermediate cylindrical pipe; 14: circular-shell plate; 15: thermally-insulating material; 16: upper-end plate; 17: reformed-gas turning portion; 18: reformed-gas flow passage; 19 and 20: perforated plate; 21: reforming-catalyst layer; 22: supporting plate; 22a: circulation hole; 23: upper-end plate; 24: heating-gas turning portion; 25: heating-gas flow passage; 25a: inlet; 25b: outlet; 26: heating-gas flow passage; 26a: inlet; 26b: outlet; 27: header tank; 27a: cylindrical pipe; 27b: upper-end plate; 27c: ejection hole; 28: process-water supply pipe; 28a: process-water supply pipe; 29: duct; 30: raw-material supply pipe; 31: raw-material mixing portion; 32: bottom-end plate; 33: combustion-portion; 34: external-cylinder pipe for burner; 35: heating-gas flow passage; 36: heating-gas turning portion; 37: flame; 38: space; 39: exhaust pipe; 40: heat exchanger; 41: air-for-burner supply pipe; 42: exhaust pipe; 43: air-for-burner supply pipe; 44: fuel-for-burner supply pipe; 45: supporting plate; 46: cylindrical pipe; 47: upper-end plate; 48 and 49: perforated plate; 50: cylindrical pipe; 51: upper-end plate; 52: bottom-end plate; 53: reformed-gas flow passage; 54: circulation hole; 55, 56, 57, and 58: perforated plate; 59: heating-gas induction pipe; 60: pump; 61: duct; 62: condenser; 63: duct; 64: cylindrical pipe; 65 and 66: perforated plate; 67: upper-end plate; 68: bottom-end plate; 69: duct; 70: outlet; 71: inlet; 72: outlet; 73: inlet; 74: reformed-gas supply pipe; 75: first reformed-gas thermometer; 76: second reformed-gas thermometer; 77: tube; 78: heat exchanger; 79: outlet; 80: temperature controller; 81: fuel supplying apparatus for burner; 82: air supplying apparatus for burner; 83: fuel for burner; 84: air for burner; 85: process water; 86: raw material; 87: reformed gas; 88: heating gas; 89: mixture; 90: air for CO selective oxidation; 98: air supplying pipe for CO selective oxidation; 99: air mixing portion; 101: duct for cleaning; 102: portion to be removed at the cleaning; 103: fill port; 104: portion, 105: upper-end plate; 105a: ejection hole; 106: inlet; 107: $O_2$-less gas; 108: heating-gas turning portion; 109: exhaust pipe; 110: valve; 111: liquid for cleaning; 112: thermometer for mixture; 201: cylindrical pipe; 202: reformed-gas flow passage; 203: reformed-gas turning portion; 204: circulation hole; 205: upper-end plate; 301: cylindrical pipe; 302: upper-end plate; 303: reformed-gas flow passage; 304 and 305: reformed-gas turning portion; 306: perforated plate

BEST MODES FOR CARRYING OUT THE INVENTION

Embodiments of the present invention will be described in detail with reference to the drawings.

Embodiment 1

Figure 2:
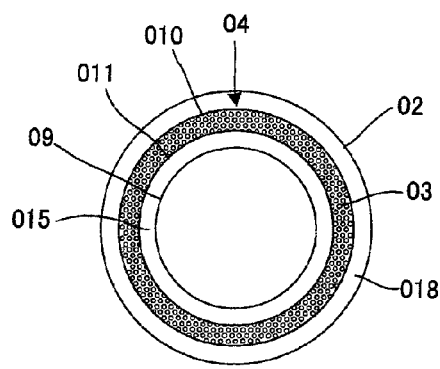
FIG. 2 shows a horizontal section taken along and viewed as indicated by the arrowed line A-A of FIG. 1.
Figure 3:
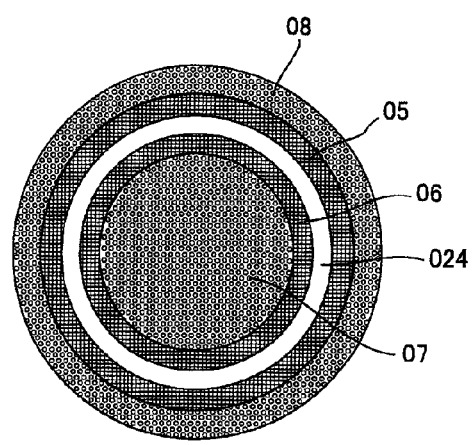
FIG. 3 shows a horizontal section taken along and viewed as indicated by the arrowed line B-B of FIG. 1.
Figure 4A:
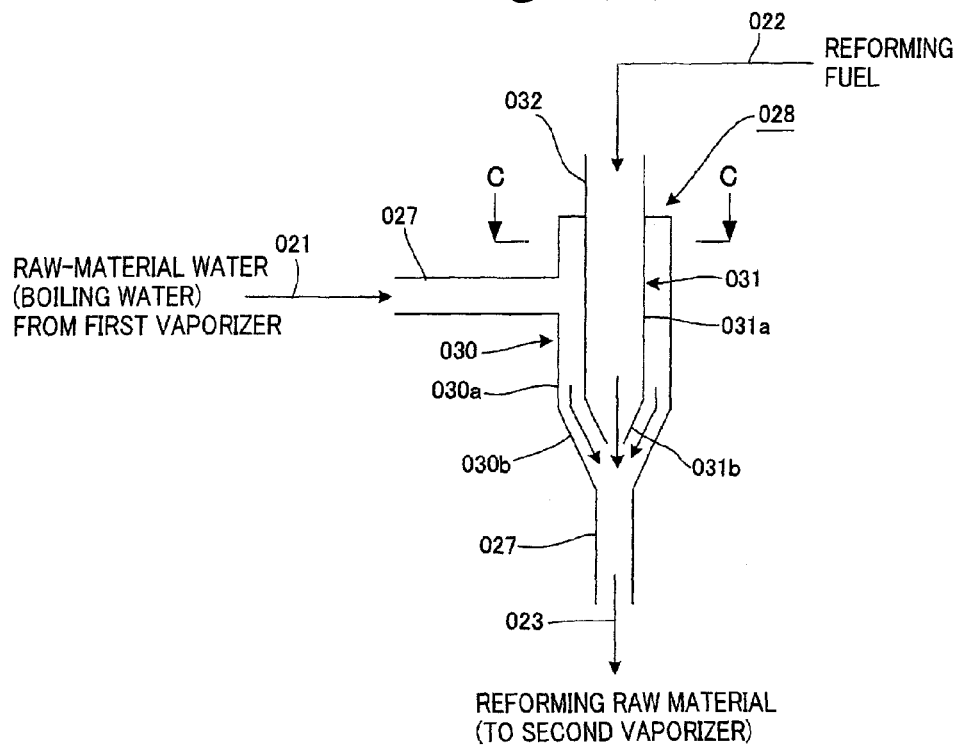
Figure 4B:
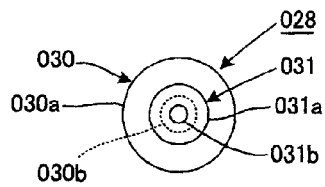

FIG. 1 shows a vertical section of a reforming apparatus according to Embodiment 1 of the present invention. FIG. 2 shows a horizontal section taken along and viewed as indicated by the arrowed line A-A of FIG. 1. FIG. 3 shows a horizontal section taken along and viewed as indicated by the arrowed line B-B of FIG. 1. FIG. 4(a) shows a vertical section illustrating the structure of a raw-material mixing portion that the reforming apparatus is provided with. FIG. 4 (b) shows a cross section taken along and viewed as indicated by the arrowed line C-C of FIG. 4(a).

<Configuration>

As FIG. 1 shows, a burner 01, a reforming-portion cylindrical pipe 02, a reforming pipe 04 that is provided with a reforming-catalyst layer 03, and the like are disposed on the upper side of the reforming apparatus of Embodiment 1, while a first vaporizer 05, a second vaporizer 06, a low-temperature CO-shift catalyst layer 07, a CO-removing catalyst layer 08, and the like are disposed on the lower side of the reforming apparatus.

Detailed description will be given with reference to FIGS. 1 to 3. The reforming pipe 04 has a triple-pipe structure including the following concentrically-arranged three pipes: an inner cylindrical pipe 09 located in the innermost side; an outer cylindrical pipe 010 located in the outermost side; and an intermediate cylindrical pipe 011 located between the inner cylindrical pipe 09 and the outer cylindrical pipe 010. These cylindrical pipes 09, 010, and 011 are disposed so as to surround the burner 01. In other words, the reforming apparatus is not of a multi-tubular type that is provided with multiple reforming pipes, but of a single-pipe type that is provided with only the single reforming pipe 04.

The lower end of the inner cylindrical pipe 09 is closed by a lower-end plate 012. The upper-end side of the interstice between the inner cylindrical pipe 09 and the outer cylindrical pipe 011 is closed by an upper-end plate 013 (first upper-end plate). A gap is left between the upper-end plate 013 and the upper end of the intermediate cylindrical pipe 011, and this gap serves as a reformed-gas turning portion 014.

A cylindrical gap is left between the intermediate cylindrical pipe 011 and the inner cylindrical pipe 09, and this gap serves as a reformed-gas flow passage 015. The reforming-catalyst layer 03 is a cylindrical body that is formed by filling a reforming catalyst into a gap between the intermediate cylindrical pipe 011 and the outer cylindrical pipe 010. The lower end of the reforming-catalyst layer 03 serves as an inlet port while the upper end of the reforming-catalyst layer 03 serves as an outlet port.

The reforming-portion cylindrical pipe 02 is disposed concentrically with the outer cylindrical pipe 010 of the reforming pipe 04 so as to surround the outer cylindrical pipe 010. The upper-end side of the reforming-portion cylindrical pipe 02 is closed by an upper-end plate 016 (second upper-end plate). A gap is left between the upper-end plate 016 and the upper-end plate 013, and this gap serves as a heating-gas turning portion 017. In addition, a cylindrical gap is left between the reforming-portion cylindrical pipe 02 and the outer cylindrical pipe 010, and this gap serves as a heating-gas flow passage 018. The upper end of the heating-gas flow passage 018 serves as an inlet, and the lower end of the heating-gas flow passage serves as an outlet.

The burner 01 is positioned at the upper-end side of the reforming pipe 04 (at the upper-end portion of the reforming apparatus) so as to face downwards. The burner 01 is fixed to the upper-end plate 016 so as to penetrate the upper-end plate 016 of the reforming-portion cylindrical pipe 02. A combustion-portion 019 is formed below the burner 01, and in this space, flame 020 of the burner 01 is created so as to be directed downwards.

The first vaporizer 05 is a cylindrical body, and includes a first flow passage (not illustrated) where water 021 is allowed to flow through. The second vaporizer 06 is a cylindrical body that has a smaller diameter than the diameter of the first vaporizer 05. The second vaporizer 06 includes a second flow passage (not illustrated) where a mixture 023 obtained by mixing a mixed fluid of the water 021 (steam) with a raw material 022 is allowed to flow through. Carbon-based fuel, such as town gas (methane gas) and kerosene, is used as the raw material 022. The first vaporizer 05 and the second vaporizer 06 are concentrically disposed so that the first vaporizer 05 is located at the outer side and the second vaporizer 06 is located at the inner side. A cylindrical gap left between the first vaporizer 05 and the second vaporizer 06 serves as a heating-gas flow passage 024.

The end portion located on the upper side of the heating-gas flow passage 024 serves as an inlet, and the end portion located on the lower side serves as an outlet. The upper end of the heating-gas flow passage 024 leads to the lower end of the heating-gas flow passage 018 formed between the reforming-portion cylindrical pipe 02 and the reforming pipe 04 (outer cylindrical pipe 010). To be more specific, a cylindrical pipe 025 that forms the inner surface of the first vaporizer 05 extends vertically, and the upper end of the cylindrical pipe 025 is connected to the lower end of the reforming-portion cylindrical pipe 02. The lower end of the cylindrical pipe 025 is closed by a lower-end plate 036. The upper end of the second vaporizer 06, meanwhile, is connected to the lower end of the reforming pipe 04 (the outer cylindrical pipe 010 and the intermediate cylindrical pipe 011). Accordingly, the heating-gas flow passage 024 formed between the first vaporizer 05 and the second vaporizer 06 extends vertically, and the upper end of the heating-gas flow passage 024 is connected to the lower end of the heating-gas flow passage 018. In addition, an exhaust pipe 026 is connected to the lower-end portion of the heating-gas flow passage 024 (cylindrical pipe 025).

It is preferable to form the first flow passage of the first vaporizer 05 and the second flow passage of the second vaporizer 06 into spiral shapes. In this case, the spiral shapes of the first flow passage and the second flow passage may be formed, for example, in the following ways. Each of the first vaporizer 05 and the second vaporizer 06 is formed in such a structure that a tube that serves as the first flow passage or the second flow passage is twisted spirally around a cylindrical pipe. Alternatively, the spiral shape of each of the first flow passage and the second flow passage may be formed as in the case of the vaporizer of Embodiment 2 to be described later (see FIG. 5). Specifically, each of the first vaporizer 05 and the second vaporizer 06 is made to have a double-pipe structure formed by fitting a wavy pipe (corrugated pipe) and a cylindrical pipe together.

In the first flow passage of the first vaporizer 05, the end portion located on the lower side thereof serves as an inlet, and the end portion located on the upper side thereof serves as an outlet. Likewise, in the second flow passage of the second vaporizer 06, the end portion located on the lower side thereof serves as an inlet, and the end portion located on the upper side thereof serves as an outlet. The inlet side of the first vaporizer 05 (first flow passage) is connected to an unillustrated water supply apparatus through an unillustrated water supply pipe.

Piping 027 is disposed at the outer side of the first vaporizer 05 (CO-removing catalyst layer 08), and this duct 027 connects the outlet of the first flow passage of the first vaporizer 05 to the inlet of the second flow passage of the second vaporizer 06 A first-end side of an unillustrated raw-material supply pipe is connected to a certain portion on the duct 027, and the connecting portion where the raw-material supply pipe and the duct 027 are connected to each other serves as a raw-material mixing portion 028. The second-end side of the raw-material supply pipe is connected to a raw-material supply apparatus. The outlet of the second flow passage of the second vaporizer 06 leads to the inlet of the reforming-catalyst layer 03.

As FIG. 4 shows, it is preferable that the raw-material mixing portion 028 have a double-nozzle structure including an external nozzle 030 and an internal nozzle 031. The external nozzle 030 and the internal nozzle 031 are concentrically arranged. The external nozzle 030 includes a cylindrical portion 030*a* and a tapered portion 030*b* formed at the end of the cylindrical portion 030*a*. A duct 027 that is connected to the outlet of first vaporizer 05 (first flow passage) is connected to the sidewall of the cylindrical portion 030*a*. Another duct 027 that is connected to the inlet of the second vaporizer 06 (second flow passage) is connected to the leading end of the tapered portion 030*b*. The internal nozzle 031 includes a cylindrical portion 031*a* and a tapered portion 031*b* that is formed at the end of the cylindrical portion 031*a*. A raw-material supply pipe 032 that is connected to the raw-material supply apparatus is connected to the rear end of the cylindrical portion 031*a*.

Accordingly, the water (steam) 021 that has flowed out of the outlet of the first vaporizer 05 (first flow passage) flows through the interstice between the external nozzle 030 and the internal nozzle 031. The raw material 022 that has been supplied from the raw-material supply apparatus flows inside the internal nozzle 031. As a consequence, the raw material that has flowed out of the tapered portion 031*b* of the internal nozzle 031 and the water (steam) 021 that flows along the tapered portion 030*b* of the external nozzle 030 are mixed uniformly with each other at the space located in front of the tapered portion 031*b*, so as to form the mixture 023. This mixture 023 then flows into the second vaporizer 06 (second flow passage). Note that the above-described way of flowing is preferable because the velocity of the water (steam) 021 is higher than the velocity of the raw material 022. Such a way of flowing, however, is not the only way. In an alternative configuration, the raw material 022 may flow through the interstice between the external nozzle 030 and the internal nozzle 031 while the water (steam) 021 may flow inside the internal nozzle 031.

Next, description will be given with reference to FIGS. 1 to 3. The lower portion of the inner cylindrical pipe 09 of the reforming pipe 04 extends so as to reach the upper portion of the inner side of the second vaporizer 06. A cylindrical gap left between the lower portion of the inner cylindrical pipe 09 and the upper portion of the second vaporizer 06 serves as a reformed-gas flow passage 029. This reformed-gas flow passage 029 is communicatively connected to the reformed-gas flow passage 015 formed between the inner cylindrical pipe 09 and the intermediate cylindrical pipe 011.

The low-temperature CO-shift catalyst layer 07 is filled with a low-temperature CO-shift catalyst, and is located inside the second vaporizer 06. In addition, the CO-removing catalyst layer 08 is filled with a CO-removing catalyst (PROX catalyst), and is disposed in a cylindrical shape so as to surround the first vaporizer 05. The upper-end portion of the CO-removing catalyst layer 08 serves as an inlet, and the lower-end portion of the CO-removing catalyst layer 08 serves as an outlet.

A duct 033 is disposed outside the first vaporizer 05 (CO-removing catalyst layer 08). A first-end side of the duct 033 is connected to the lower-end plate 036, and the second-end side of the duct 033 is connected to the upper-end portion of the CO-removing catalyst layer 08. Accordingly, the duct 033 connects the outlet of the low-temperature CO-shift catalyst layer 07 to the inlet of the CO-removing catalyst layer 08. The outlet of the CO-removing catalyst layer 08 is connected to an unillustrated reformed-gas supply pipe that is connected to an unillustrated fuel cell. An air mixing portion 034 is formed at a certain portion of the duct 033. Air for CO selective oxidation 035 is supplied from an unillustrated air supplying apparatus for CO selective oxidation via an air supplying pipe for CO selective oxidation. The air for CO selective oxidation 035 is then mixed with the reformed gas 037 that flows through the duct 033, at the air mixing portion 034. The air for CO selective oxidation 035 thus mixed with the reformed gas 033 is made to flow into the CO-removing catalyst layer 08.

Now, descriptions will be given for the flow of heating gas 040 as well as the flows of the water 021, the raw material 022, the mixture 023, and the reformed gas 037 at the time when the reforming apparatus with the above-described configuration is in steady operation. In FIG. 1, the flow of the heating gas 040 is indicated by arrowed dot-lines, and the flows of the water 021, the raw material 022, the mixture 023, and the reformed gas 037 are indicated by arrowed solid-lines.

Firstly, description will be focused mainly on the flow of the heating gas 040.

By using the burner 01 to burn fuel for burner 038 that is supplied to the burner 01 from an unillustrated fuel supplying apparatus for burner and burn air for burner 039 that is supplied to the burner 01 from an unillustrated air supplying apparatus for burner, the high-temperature (for example, at 1000° C.) heating gas 040 is produced. Since the burner 01 faces downwards, the heating gas 040 flows downwards at first. However, since the lower end of the inner cylindrical pipe 09 of the reforming pipe 04 is closed by the lower-end plate 012, the heating gas 040 turns around and flows upwards along the inner surface of the inner cylindrical pipe 09. At this time, the heat of the heating gas 040 is supplied to the reforming-catalyst layer 03 from the inside of the reforming pipe 04 by way of the inner cylindrical pipe 09 and the intermediate cylindrical pipe 011.

After that, the heating gas 040 turns around at the heating-gas turning portion 017, then flows into the heating-gas flow passage 018 formed at the outer side of the reforming pipe 04, and then flows downwards through the heating-gas flow passage 018. Also at this time, the heat of the heating gas 040 is supplied to the reforming-catalyst layer from the outer side of the reforming pipe 04 via the outer cylindrical pipe 010. In short, heat is exchanged between the heating gas 040 and the reforming-catalyst layer 03 or the mixture 023 that is flowing through the reforming-catalyst layer 03, and the heat exchange takes place both on the inner side and on the outer side of the reforming pipe 04 (reforming-catalyst layer 03). As a consequence, the temperature of the heating gas 040 that has flowed out of the heating-gas flow passage 018 is lowered down to, for example, approximately 400° C.

The heating gas 040 that has flowed out of the heating-gas flow passage 018 flows into the heating-gas flow passage 024 formed between the first vaporizer 05 and the second vaporizer 06, and then flows downwards through the heating-gas flow passage 024. The heating gas 040 that has flowed through the heating-gas flow passage 024 is discharged into the exhaust pipe 39, and then is emitted out to the atmosphere.

Next, description will be focused mainly on the flows of the water 021, the raw material 022, the mixture 023, and the reformed gas 037.

The water 021 supplied from the water supply apparatus flows into the first flow passage of the first vaporizer 05 via the water supply pipe. The water 021 that has flowed into the first flow passage of the first vaporizer 05 flows upwards through the first flow passage. When the first flow passage has a spiral shape, the water 021 rises upwards flowing spirally along the outer-circumferential side of the heating-gas flow passage 024. At this time, the heating gas 040 that is flowing through the heating-gas flow passage 024 heats the water 021. In addition, at the portion where the CO-removing catalyst layer 08 is disposed, the water 021 that is flowing through the first flow passage of the first vaporizer 05 absorbs (removes) the heat amount held by the reformed gas 037 that has flowed into the CO-removing catalyst layer 08 (a heat amount required to lower the temperature of the reformed gas 037 down to a predetermined temperature (for example, from 150° C. down to 80° C.)) and the heat amount generated by the CO-selective-oxidation reaction ($2CO + O_2 \rightarrow 2CO_2$) of the reformed gas 037, the reaction taking place in the CO-removing catalyst layer 08.

At this time, part of (for example, approximately half of) the water 021 that is flowing through the first flow passage of the first vaporizer 05 is vaporized. The water 021 is vaporized at a temperature of, for example, approximately 120° C. This partially vaporized water 021 cools the CO-removing catalyst layer 08, so that the temperature of the CO-removing catalyst layer 08 is kept at the vaporizing temperature of the water 021 (for example, at approximately 120° C.).

On the other hand, the temperature of the heating gas 040 that has flowed out of the heating-gas flow passage 024 is lowered since the heating gas 040 has given its heat to the water 021. The temperature of the heating gas 040 that has flowed out of the heating-gas flow passage 024 becomes as low as, for example, approximately 100° C. because the vaporizing temperature of the water 021 is, for example, approximately 120° C., and because the temperature of lower-end portion of the first vaporizer 05 into which the liquid water 021 is flowed is kept at the room temperature.

The water 021 that has flowed through the first flow passage of the first vaporizer 05 becomes steam (wet steam). The steam flows out of the first flow passage, and then flows downwards through the duct 027. At this time, the raw material 022 supplied from the raw-material supply apparatus is mixed with the water (steam) 021 in the raw-material mixing portion 028 located at the certain portion of the duct 027, and thus the mixture 023 is produced. At this time, the steam flows through the duct 024 at a speed that is as fast as, for example, approximately 50 m/s. Accordingly, by the high-speed flow, the raw material 022 mixed in the raw-material mixing portion 028 is agitated well, and is uniformly dispersed in the water (steam) 021. For this reason, the ratio of the water (steam) 021 and the raw material 022 (S/C=Steam/Carbon) within the mixture 023 does not deviate from a planned value, and is kept in a steady state.

The mixture 023 thus produced flows into the second flow passage of the second vaporizer 06, and then flows upwards through the second flow passage. At this time, when the second flow passage has a spiral shape, the mixture 023 rises upwards flowing spirally along the inner-circumferential side of the heating-gas flow passage 024.

The mixture 023 that is flowing through the second flow passage of the second vaporizer 06 is heated by heat exchange with the heating gas 040 that is flowing through the heating-gas flow passage 024 located at the outer side of the second vaporizer 06. In addition, at the portion where the low-temperature CO-shift catalyst layer 07 is disposed, the mixture 023 flowing through the second flow passage of the second vaporizer 06 absorbs (removes) the heat amount held by the reformed gas 037 that has flowed into the low-temperature CO-shift catalyst layer 07 (an heat amount required to lower the temperature of the reformed gas 037 down to a predetermined temperature (for example, from 250° C. down to 150° C.) and the heat amount generated by the CO-shift reaction ($CO+H_2O \rightarrow H_2+CO_2$) of the reformed gas 037 (the heat amount that is enough to raise the temperature of the reformed gas 037 by, for example, approximately 50° C.), the CO-shift reaction taking place in the low-temperature CO-shift catalyst layer 07.

In addition, at a portion located above the low-temperature CO-shift catalyst layer 07, the mixture 023 that is flowing through the second flow passage of the second vaporizer 06 absorbs the heat amount held by the reformed gas 037 that is flowing through the reformed-gas flow passage 029 located at the inner side of the second vaporizer 06 (an heat amount required to lower the temperature of the reformed gas 037 down to a predetermined temperature, for example, from 550° C. down to 250° C.). Accordingly, while the mixture 023 is flowing through the second flow passage of the second vaporizer 06, the mixture 023 becomes superheated steam (dry steam). In this event, the heat of the heating gas 040, the heat radiated from the low-temperature CO-shift catalyst layer 07, and the heat of the reformed gas 037 vaporize the unvaporized part of the water 021 in the mixture 023. In addition, when the raw material 022 in the mixture 023 is liquid fuel, such as kerosene, the liquid fuel is also vaporized. The temperature of the mixture 023 at the time when the mixture 023 flows out of the second flow passage of the second vaporizer 06 becomes, for example, approximately 400° C.

The mixture 023 that has flowed out of the second flow passage of the second vaporizer 06 flows into the reforming-catalyst layer 03, and then flows upwards through the reforming-catalyst layer 03. Thereafter, as has been described above, the heat of the heating gas 040 that is flowing both at the inner side of the reforming pipe 04 and at the outer side thereof (heating-gas flow passage 018) is supplied to the reforming-catalyst layer 03. Accordingly, in the reforming-catalyst layer 03, a steam reforming reaction of the raw material 022 takes place so as to produce the reformed gas 037 containing hydrogen gas (hydrogen-rich gas). At this time, the temperature of the reforming catalyst located in the upper portion of the reforming-catalyst layer 03 is raised up to, for example, approximately 700° C. by the heat exchange with the heating gas 040. Thus, produced is the reformed gas 037 with a hydrogen content of, for example, 50% or higher.

The reformed gas 037 produced in the reforming-catalyst layer 03 flows out of the upper end of the reforming-catalyst layer 03. At this time, the temperature of the reformed gas 037 at the outlet of the reforming-catalyst layer 03 becomes, for example, 750° C. The reformed gas 037 that has flowed out of the reforming-catalyst layer 03 turns around at the reformed-gas turning portion 014, then flows downwards through the reformed-gas flow passage 015, and then flows into the reformed-gas flow passage 029. While the reformed gas 037 flows through the reformed-gas flow passage 015, the heat of the reformed gas 037 is transferred to the reforming-catalyst layer 03 (mixture 023) through the intermediate cylindrical pipe 011. Accordingly, the temperature of the reformed gas 87 becomes, for example, approximately 550° C., when the reformed gas 037 flows from the reformed-gas flow passage 015 into the reformed-gas flow passage 029.

The reformed gas 037 that has flowed into the reformed-gas flow passage 029 flows downwards through the reformed-gas flow passage 029, and then flows into the low-temperature CO-shift catalyst layer 07. While the reformed gas 037 flows through the reformed-gas flow passage 029, the reformed gas 037 is cooled by heat exchange with the mixture 023 flowing through the second flow passage of the second vaporizer 06. The temperature of the reformed gas 037 is thus lowered down to, for example, approximately 250° C. To put it differently, as has been described above, the mixture 023 flowing through the second flow passage of the second vaporizer 06 absorbs the heat amount which is held by the reformed gas 037 and which is required to lower the temperature of the reformed gas 037 down to a predetermined temperature (for example, from 550° C. down to 250° C.)

The reformed gas 037 that has flowed into the low-temperature CO-shift catalyst layer 07 flows downwards through the low-temperature CO-shift catalyst layer 07. At this time, the CO-shift reaction ($CO+H_2O \rightarrow CO_2+H_2$) of the reformed gas 037 takes place in the low-temperature CO-shift catalyst layer 07, so that the CO-concentration in the reformed gas 037 decreases. This CO-shift reaction is also an exothermic reaction, and, as has been described above, the heat of this reaction is absorbed by the mixture 023 that is flowing through the second flow passage of the second vaporizer 06.

The low-temperature CO-shift catalyst layer 07 is surrounded by the second vaporizer 06, the temperature of which is, for example, approximately 150° C. Accordingly, while the reformed gas 037 flows though the low-temperature CO-shift catalyst layer 07, the reformed gas 037 is cooled by the second vaporizer 06 of 150° C., and thus the temperature of the reformed gas 037 is lowered down to approximately 150° C. To put it differently, as has been described above, at the portion where the low-temperature CO-shift catalyst layer 07 is disposed, the mixture 023 that is flowing through the second flow passage of the second vaporizer 06 absorbs the heat amount which is held by the reformed gas 037 and which is necessary for lowering the temperature of the reformed gas 037 down to a predetermined temperature (for example, from 250° C. down to 150° C.). In addition, with this cooling effect, the CO-concentration in the reformed gas 037 is lowered down to the equilibrium CO-concentration at that temperature. Accordingly, the CO-concentration in the reformed gas 037 can be reduced to a larger extent than a case where the reformed gas 037 is assumed to flow through the low-temperature CO-shift catalyst layer 07 without being cooled down.

The reformed gas 037 that has flowed out of the low-temperature CO-shift catalyst layer 07 flows through the duct 033, and then flows into the CO-removing catalyst layer 08. At this time, at the air mixing portion 034 located at the certain portion of the duct 033, the air for CO selective oxidation 035 supplied from the air supplying apparatus for CO selective oxidation via the air supplying pipe for CO selective oxidation is mixed with the reformed gas 037 that is flowing though the duct 033. Accordingly, the reformed gas 037 together with the air for CO selective oxidation 035 flows into the CO-removing catalyst layer 08, and flows downwards through the CO-removing catalyst layer 08. At this time, the CO-selective-oxidation reaction of the reformed gas 037 takes place in the CO-removing catalyst layer 08, so that the CO-concentration in the reformed gas 037 decreases furthermore.

The CO-selective-oxidation reaction is also an exothermic reaction. As has been described above, the heat generated by this reaction is absorbed by the water 021 that is flowing though the first flow passage of the first vaporizer 05. Here, the CO-removing catalyst layer 08 is disposed so as to surround the first vaporizer 05, and the water 021 flowing through the first flow passage of the first vaporizer 05 has been vaporized, so that the temperature of the CO-removing catalyst layer 08 is constantly kept approximately at the vaporizing temperature of the water 021 (for example, approximately at 120° C.). The temperature of the reformed gas 037 that has flowed out of the CO-removing catalyst layer 08 is lowered down to, for example, approximately 80° C. by being cooled by the water 021 that is flowing through the first flow passage of the first vaporizer 05. To put it differently, as has been described above, at the portion where the CO-removing catalyst layer 08 is disposed, the water 021 that is flowing through the first flow passage of the first vaporizer 05 absorbs the heat amount which is held by the reformed gas 037 and which is necessary for lowering the temperature of the reformed gas 037 down to a predetermined temperature (for example, from 150° C. down to 80° C.). Thereafter, the reformed gas 037 with a low CO-concentration flows out of the CO-removing catalyst layer 08, and then is supplied via the reformed-gas supply pipe to the fuel cell as the fuel to generate electric power.

Next, description that will be given as to heating operation for temperature rising for starting the reforming apparatus.

During the heating operation for temperature rising, for the purpose of producing the heating gas 040, the fuel for burner 038 supplied from the fuel supplying apparatus for burner and the air for burner 038 supplied from the air supplying apparatus for burner are burned by means of the burner 01, as in the case of the steady operation. Note that no mixture 023 (the raw material 022 plus the water 021) is supplied during this temperature raising operation.

Then, as in the case of the steady operation, the heating gas 040 is made to flow upwards along the inner-circumferential surface of the inner cylindrical pipe 09 of the reforming pipe 04. In addition, the heating gas 040 is made to turn around at the heating-gas turning portion 017, then to flow downwards through the heating-gas flow passage 018 located at the outer side of the reforming pipe 04, and then to flow downwards through the heating-gas flow passage 024 formed between the first vaporizer 05 and the second vaporizer 06. As a consequence, the heat of the heating gas 040 sequentially raises, by heating, the temperatures of the reforming pipe 04 and the reforming-catalyst layer 03, the temperatures of the first vaporizer 05 and the second vaporizer 06, and then the temperatures of the low-temperature CO-shift catalyst layer 07 and the CO-removing catalyst layer 08.

To be more specific, the temperatures of the reforming pipe 04 and the reforming-catalyst layer 03 are raised by being heated by the heating gas 040 while the heating gas 040 flows along the inner side and the outer side of the reforming pipe 04. The temperatures of the first vaporizer 05 and the second vaporizer 06 are raised by being heated by the heating gas 040 while the heating gas 040 flows through the heating-gas flow passage 024 formed between the first vaporizer 05 and the second vaporizer 06. Since the low-temperature CO-shift catalyst layer 07 is provided at the inner side of the second vaporizer 06, the temperature of the low-temperature CO-shift catalyst layer 07 is raised by being heated indirectly by way of the second vaporizer 06. Since the CO-removing catalyst layer 08 is provided at the outer side of the first vaporizer 05, the temperature of the CO-removing catalyst layer 08 is raised by being heated indirectly by way of the first vaporizer 05.

Once the heating operation for temperature rising is finished, the mixture 023 (the raw material 022 plus the water 021) starts to be supplied. Thus, the reformed gas 037 starts to be produced. Note that when to finish the heating operation for temperature rising can be determined, for example, in the following ways. The length of time for which the heating operation for temperature rising continues is measured first, and then whether the time thus measured exceeds a predetermined time length or not is determined. Alternatively, the temperature of any catalyst layer is measured first, and then whether the temperature thus measured reaches a predetermined temperature or not is determined.

<Advantageous Effects>

The reforming apparatus of Embodiment 1 has the following configuration. The reforming apparatus includes: the first vaporizer 05 that is cylindrically shaped and includes the first flow passage through which the water 021 flows; the second vaporizer 06 that is cylindrically shaped and includes the second flow passage through which the mixture 023 flows; the duct 027 that connects the outlet of the first flow passage to the inlet of the second flow passage; and the raw-material mixing portion 028 formed at a certain point of the duct 027. The first vaporizer 05 and the second vaporizer 06 are concentrically disposed so that the first vaporizer 05 is located at the outer side and the second vaporizer 06 is located at the inner side. The cylindrical gap left between the first vaporizer 05 and the second vaporizer 06 serves as the heating-gas flow passage 024. In the first vaporizer 05, the water 021 flowing through the first flow passage is turned into steam (wet steam) by being heated by the heating gas 040 flowing through the heating-gas flow passage 024 after the heating gas 040 heats the reforming-catalyst layer 03. In the raw-material mixing portion 028, the mixture 023 is produced by mixing the raw material 022 with the steam which has flowed out of the first flow passage and which is flowing through the duct 027. In the second vaporizer 06, the mixture 023 which has flowed into the second flow passage from the duct 027 and which is flowing through the second flow passage is turned into superheated steam (dry steam) by being heated by the heating gas 040 which is flowing through the heating-gas flow passage 024 after the heating gas 040 heats the reforming-catalyst layer 03. The superheated steam of the mixture 023 flows through the reforming-catalyst layer 03. Accordingly, the water 021 flowing through the first flow passage of the first vaporizer 05 and the mixture 023 flowing through the second flow passage of the second vaporizer 06 can be heated efficiently by the heating gas 040 that is flowing through the heating-gas flow passage 024 formed between the first vaporizer 05 and the second vaporizer 06.

In addition, by the time the water 021 flows out of the first flow passage of the first vaporizer 05, the water 021 is vaporized by being heated by the heating gas 040. Accordingly, the speed of the water 021 flowing through the duct 027 becomes faster (for example, approximately at 50 m/s) than the case without the vaporization. As a consequence, the raw material 022 that is mixed with the water (steam) 021 in the raw-material mixing portion 028 located at the certain point of the duct 027 can be agitated well by the water (steam) 021 of such a high flowing speed, so that the raw material 022 can be dispersed uniformly in the water (steam) 021. For this reason, the water (steam) 021 and the raw material 022 can be mixed together uniformly. Note that, in this case, even when the raw material 022 is liquid fuel, such as kerosene, or even when only a small amount of the raw material 022 is supplied, the water (steam) 021 and the raw material 022 can be mixed together uniformly.

In addition, in the second vaporizer 06, the mixture 023 formed by mixing the raw material 022 and the water (steam) 021 together is heated by the heating gas 040 so as to produce the superheated steam. Accordingly, the raw material 022 in the mixture 023 is vaporized together with the water 021 in the mixture 023. As a consequence, even when the raw material 022 that is likely to precipitate carbon, such as kerosene, is used, the precipitation of carbon from the raw material 022 can be prevented, so that the degradation of the reforming catalyst can be prevented. When the raw material is vaporized in the raw fuel vaporizer as in the conventional cases, the complicated controlling of the temperature rise is necessary, but such complicated controlling of the temperature rise is no longer necessary.

In addition, the reforming apparatus of Embodiment 1 has the following characteristic features. The raw-material mixing portion 028 has a double-nozzle structure including the external nozzle 030 and the internal nozzle 031 provided inside the external nozzle 030. The water (steam) 021 that has flowed out of the first flow passage of the first vaporizer 05 flows through the interstice left between the external nozzle 030 and the internal nozzle 031 while the raw material 022 flows through the internal nozzle 031, or the raw material 022 flows through the interstice left between the external nozzle 030 and the internal nozzle 031 while the water (steam) 021 that has flowed out of the first flow passage of the first vaporizer 05 flows through the internal nozzle 031. Accordingly, in the raw-material mixing portion 028, the raw material 022 is turned into a fine spray, and is then uniformly mixed with the water (steam) 021. As a consequence, the precipitation of carbon from the raw material 022 can be prevented with more certainty, and the degradation of the reforming catalyst can be thus prevented with more certainty.

In addition, the reforming apparatus of Embodiment 1 has the following characteristic features. The low-temperature CO-shift catalyst layer 07 is provided at the inner side of the second vaporizer 06, and the reformed gas 037 that has flowed out of the reforming-catalyst layer 03 flows through the low-temperature CO-shift catalyst layer 07. The mixture 023 flowing through the second flow passage of the second vaporizer 06 at this time absorbs the heat produced by the CO-shift reaction of the reformed gas 037 that takes place in the low-temperature CO-shift catalyst layer 07, and thus cools the reformed gas 037 down. In this configuration, the second vaporizer 06 surrounds the low-temperature CO-shift catalyst layer 07, and the mixture 023 flows through the second flow passage of the second vaporizer 06 while the reforming apparatus is in the steady operation. For this reason, the low-temperature CO-shift catalyst layer 07 is not brought into contact with the heating gas 040 that is flowing through the heating-gas flow passage 024 formed at the outer side of the second vaporizer 06, so that the temperature of the low-temperature CO-shift catalyst layer 07 is not raised by such a contact. In addition, the mixture 023 flowing through the second flow passage of the second vaporizer 06 can certainly absorb the heat produced by the CO-shift reaction that takes place in the low-temperature CO-shift catalyst layer 07, and can certainly cool the reformed gas 037 down. Accordingly, unlike the conventional cases, it is possible to prevent an increase in the CO-concentration in the reformed gas 037 that flows out of the low-temperature CO-shift catalyst layer 07 that is caused by insufficient cooling of the reformed gas 037. For this reason, even when the reformed gas 037 that has flowed out of the low-temperature CO-shift catalyst layer 07 further flows through the CO-removing catalyst layer 08, the amount of the air for CO selective oxidation 035 supplied to the CO-removing catalyst layer 08 can be reduced, so that the reforming efficiency can be improved. In addition, the use of the methanation-type CO-removing catalyst whose temperature is difficult to control is no longer necessary.

In addition, the reforming apparatus of Embodiment 1 has the following characteristic features. The first vaporizer 05 and the second vaporizer 06 are disposed with the inlets of the first flow passage and of the second flow passage located on the lower sides of their respective passages and with the outlets of the first flow passage and of the second flow passage located on the upper sides of their respective passages. In the first vaporizer 05, the water 021 flows upwards through the first flow passage while, in the second vaporizer 06, the mixture 023 flows upwards through the second flow passage. This structure allows the heating gas 040 that flows downwards through the heating-gas flow passage 024 formed between the first vaporizer 05 and the second vaporizer 06 to flow in the opposite direction both to the flowing direction of the water 021 that flows through the first flow passage of the first vaporizer 05 and to the flowing direction of the mixture 023 that flows through the second flow passage of the second vaporizer 06. For this reason, the heat exchange between the heating gas 040 and the water 021 as well as between the heating gas 040 and the mixture 023 can be carried out efficiently.

In addition, the water 021 that flows through the first flow passage of the first vaporizer 05 flows in the opposite direction to the flowing direction of the reformed gas 037 that flows through the CO-removing catalyst layer 08, while the mixture 023 that flows through the second flow passage of the second vaporizer 06 flows in the opposite direction to the flowing direction of the reformed gas 037 that flows through the low-temperature CO-shift catalyst layer 07. Accordingly, the heat exchange therebetween can be carried out efficiently.

In addition, the reforming apparatus of Embodiment 1 has the following characteristic features. The reforming pipe 04 in which the reforming-catalyst layer 03 is installed is disposed above the first vaporizer 05 and the second vaporizer 06. While the superheated steam of the mixture 023 that has flowed out of the second vaporizer 06 flows into the reforming-catalyst layer 03 from the lower end thereof, then flows upwards through the reforming-catalyst layer 03, the superheated steam of the mixture 023 is turned into the reformed gas 037 through a steam reforming process. The reformed gas 037 flows out of the upper end of the reforming-catalyst layer 03, flows downwards, flows into the low-temperature CO-shift catalyst layer 07 from the upper end thereof, and then flows downwards therethrough. Besides, the burner 01 is disposed at the upper-end side of the reforming pipe 04 so as to face downwards. This structure allows the reforming pipe 04, the first vaporizer 05, the second vaporizer 06, and the low-temperature CO-shift catalyst layer 07 to be provided in a compact and reasonable arrangement that considers the flows of the mixture 023 and the reformed gas 037 (i.e., the heat exchange between the mixture 023 and the reformed gas 037). In addition, when some troubles occurs in the burner 01, the maintenance work can be done simply by removing only the burner 01 from the reforming apparatus, without turning the reforming apparatus upside down, unlike the conventional cases. In addition, in comparison to the lengthy burners employed in the conventional cases, the burner 01 of Embodiment 1 can be used easily since it can be very short. Thus, the adjustment work, the exchanging work and the like for the burner 01 can be done on site with only human power.

In addition, the reforming apparatus of Embodiment 1 has the following characteristic features. The CO-removing catalyst layer 08 is cylindrically disposed so as to surround the first vaporizer 05. The reformed gas 037 that has flowed out of the low-temperature CO-shift catalyst layer 07 flows through the CO-removing catalyst layer 08. The water 021 that is flowing through the first flow passage of the first vaporizer 06 at this time absorbs the heat produced by the CO-selective-oxidation reaction of the reformed gas 037 that takes place in the CO-removing catalyst layer 08 and thus cools the reformed gas 037 down. Besides, the first vaporizer 05 exists between the heating-gas flow passage 024 and the CO-removing catalyst layer 08. While the reforming apparatus is in the steady operation, the water 021 flows through the first flow passage of the first vaporizer 05. Accordingly, the CO-removing catalyst layer 08 is not in contact with the heating gas 040 that flows through the heating-gas flow passage 024 located at the inner side of the first vaporizer 06, so that no temperature rise of the CO-removing catalyst layer is provoked by such a contact. In addition, the water 021 flowing through the first flow passage of the first vaporizer 05 can certainly absorb the heat produced by the CO-selective-oxidation reaction that takes place in the CO-removing catalyst layer 08, and thus can certainly cool the reformed gas 037 down. As a consequence, the CO-removing catalyst of the CO-removing catalyst layer 08 that has been cooled down approximately to the vaporizing temperature of the water 021 has a high removing CO capability, so that the employment of a methanation-type CO-removing catalyst whose temperature is difficult to control is not necessary.

In addition, the reforming apparatus of Embodiment 1 has the following characteristic features. The reforming apparatus includes the reforming-portion cylindrical pipe 02 that is disposed so as to surround the reforming pipe 04. The reforming pipe 04 has a triple-pipe structure including the inner cylindrical pipe 09 located at the innermost side, the outer cylindrical pipe 010 located at the outermost side, and the intermediate cylindrical pipe 011 located between the inner cylindrical pipe 09 and the outer cylindrical pipe 010. All of these three pipes 09, 010, and 011 are concentrically disposed so as to surround the burner 01. The lower-end side of the inner cylindrical pipe 09 is closed by the lower-end plate 012 while the upper-end side of the interstice between the inner cylindrical pipe 09 and the outer cylindrical pipe 010 is closed by the upper-end plate 013. The gap left between the upper-end plate 013 and the upper end of the intermediate cylindrical pipe 011 serves as the reformed-gas turning portion 014. The cylindrical gap left between the intermediate cylindrical pipe 011 and the inner cylindrical pipe 09 serves as the reformed-gas flow passage 015. The reforming-catalyst layer 03 is cylindrically formed between the intermediate cylindrical pipe 011 and the outer cylindrical pipe 010. The upper-end side of the reforming-portion cylindrical pipe 02 is closed by the upper-end plate 016. The gap left between the upper-end plate 016 and the upper-end plate 013 serves as the heating-gas turning portion 017. The cylindrical gap left between the reforming-portion cylindrical pipe 02 and the outer cylindrical pipe 010 serves as the heating-gas flow passage 018. The heating gas 040 discharged downwards from the burner 01 flows upwards along the inner circumferential surface of the inner cylindrical pipe 09, and turns around at the heating-gas turning portion 017. The heating gas 040, then, flows downwards through the heating-gas flow passage 018. While flowing downwards through the heating-gas flow passage 018, the heating gas 040 heats the reforming-catalyst layer 03, and then flows into the heating-gas flow passage 024 formed between the first vaporizer 05 and the second vaporizer 06. Meanwhile, the reformed gas 037 that has flowed out of the upper end of the reforming-catalyst layer 03 turns around at the reformed-gas turning portion 014, and flows downwards through the reformed-gas flow passage 015. The reformed gas 037 then flows into the low-temperature CO-shift catalyst layer 07 from the upper end thereof. Accordingly, the heating gas 040 can efficiently heat the reforming-catalyst layer 03 both from the inner side and from the outer side of the cylindrical reforming pipe 04 (reforming-catalyst layer 03). In addition, the reforming pipe 04 of Embodiment 1 is of a single-pipe type, which is different from the conventionally-employed multi-tubular type. Accordingly, the duct to put multiple reforming pipes together, a header tank, and the like are not necessary. As a consequence, the manufacturing cost can be reduced.

Note that, in FIG. 1, the low-temperature CO-shift catalyst layer 07 is provided so as to serve as the sole CO-shift catalyst layer, but the configuration is not limited to this. Alternatively, a high-temperature CO-shift catalyst layer may be additionally provided above the low-temperature CO-shift catalyst layer 07 (i.e., at the upstream side of the flowing direction of the reformed gas). For example, in an alternative configuration, the position of the lower end of the inner cylindrical pipe 09 (lower-end plate 012) may be shifted upwards, and a high-temperature CO-shift catalyst layer may be provided inside of the intermediate cylindrical pipe 011 or inside of the second vaporizer 06. The reformed gas that has flowed out of the reforming-catalyst layer 03 flows through the high-temperature CO-shift catalyst layer, and then, flows through the low-temperature CO-shift catalyst layer 07. In this case, the high-temperature CO-shift catalyst has a high operation temperature and is heat resistant. In addition, because of the high operation temperature, the high-temperature CO-shift catalyst has a high reaction rate. Accordingly, the amount of the high-temperature CO-shift catalyst needed to remove CO is smaller than the low-temperature CO-shift catalyst. As a consequence, the CO-concentration in the reformed gas that has passed through the high-temperature CO-shift catalyst layer is lower than, for example, the CO-concentration in the conventional reformed gas of 650° C. level. For this reason, even when the reformed gas flows into the low-temperature CO-shift catalyst layer, the temperature of the low-temperature CO-shift catalyst is raised to a lesser extent by the heat produced by the CO-shift reaction. As a consequence, the low-temperature CO-shift catalyst can have a longer service life. In addition, when the temperature of the low-temperature CO-shift catalyst is not raised, the temperature at the outlet of the low-temperature CO-shift catalyst layer is lowered down. Accordingly, for the reason related to the equilibrium reaction, the CO-concentration in the reformed gas that has flowed out of the low-temperature CO-shift catalyst layer is also lowered down. For this reason, when the reformed gas that has flowed out of the low-temperature CO-shift catalyst layer further flows into the CO-removing catalyst layer, the load on the CO-removing catalyst can be reduced.

Embodiment 2

Figure 5:
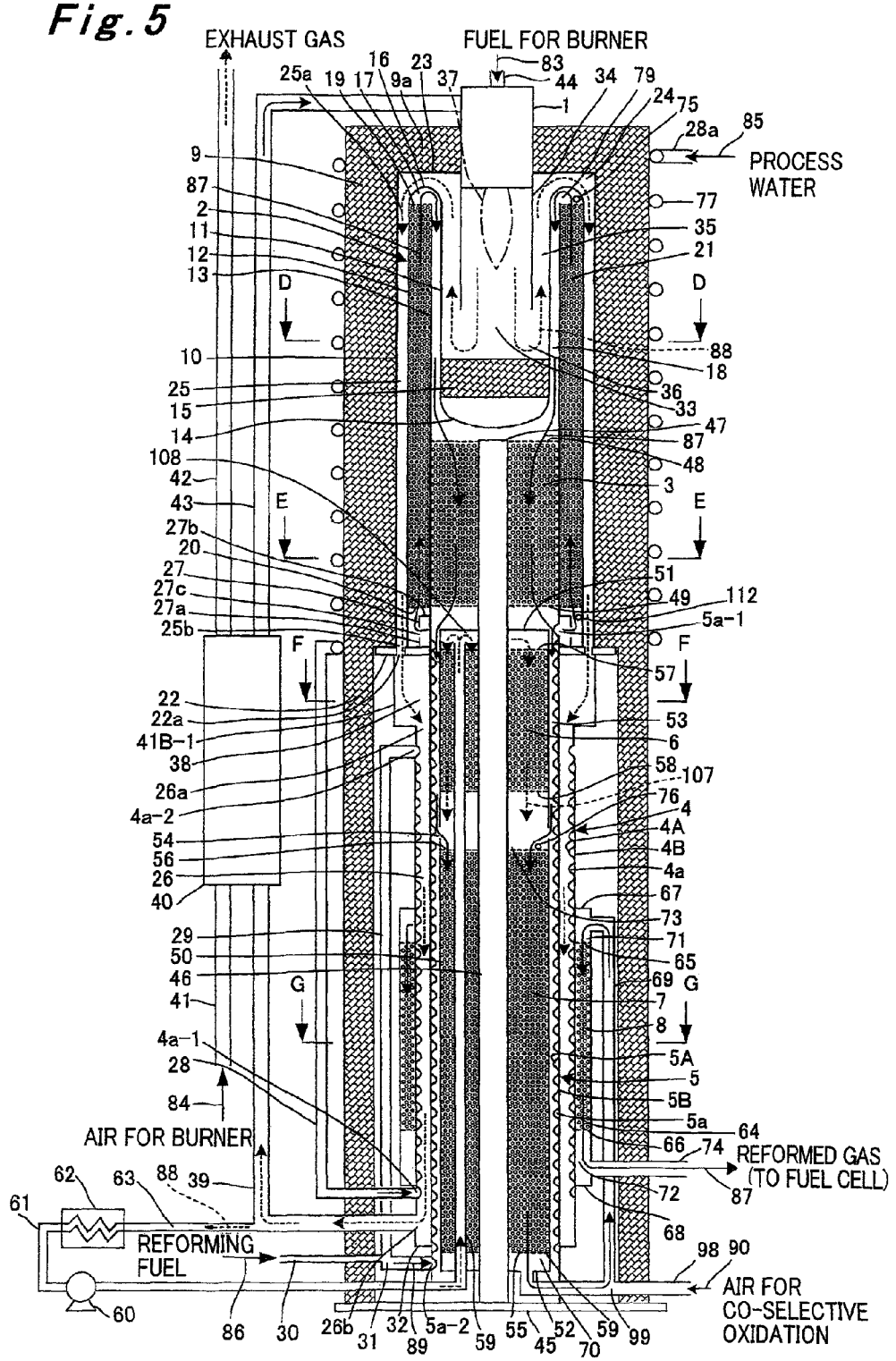
FIG. 5 shows a vertical section of a reforming apparatus according to Embodiment 2 of the present invention.
Figure 6:
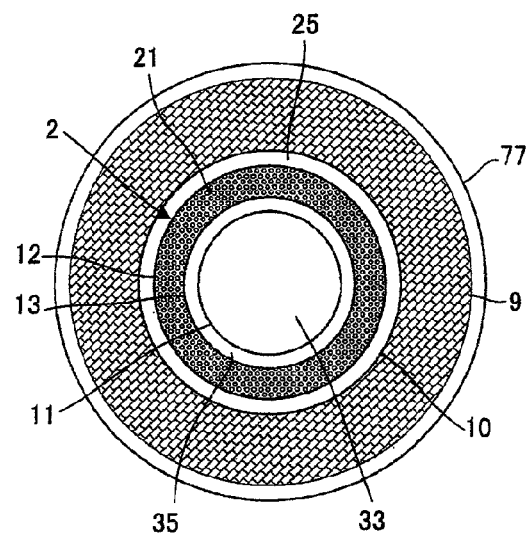
FIG. 6 shows a horizontal section taken along and viewed as indicated by the arrowed line D-D of FIG. 5.
Figure 7:
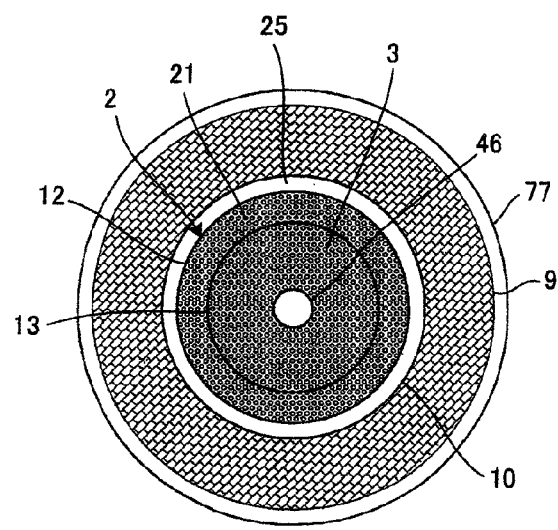
FIG. 7 shows a horizontal section taken along and viewed as indicated by the arrowed line E-E of FIG. 5.
Figure 8:
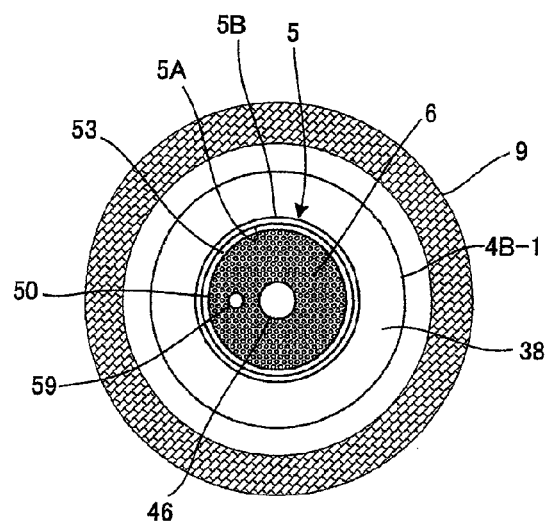
FIG. 8 shows a horizontal section taken along and viewed as indicated by the arrowed line F-F of FIG. 5.
Figure 9:
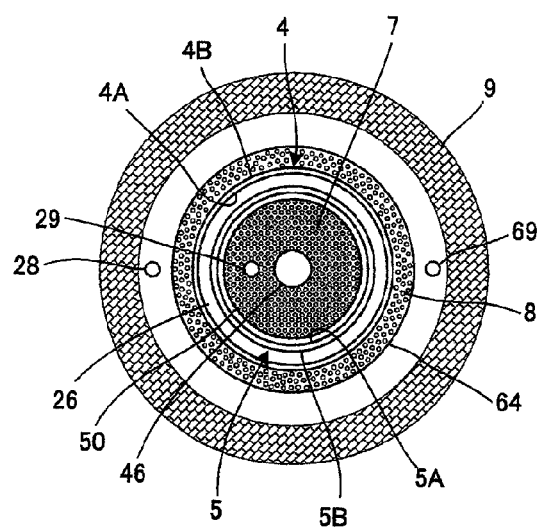
FIG. 9 shows a horizontal section taken along and viewed as indicated by the arrowed line G-G of FIG. 5.
Figure 10:
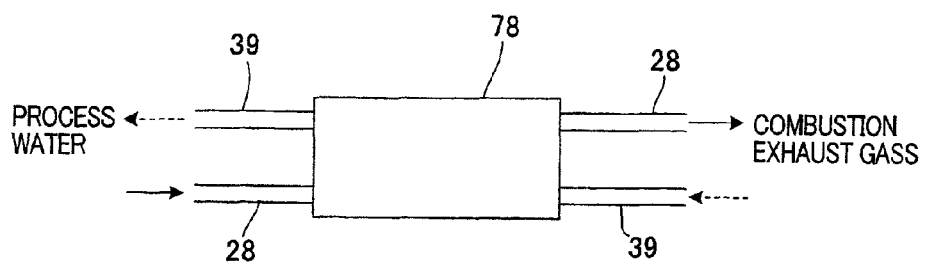
FIG. 10 shows a heat exchanger to exchange heat between heating gas and process water (water).
Figure 11:
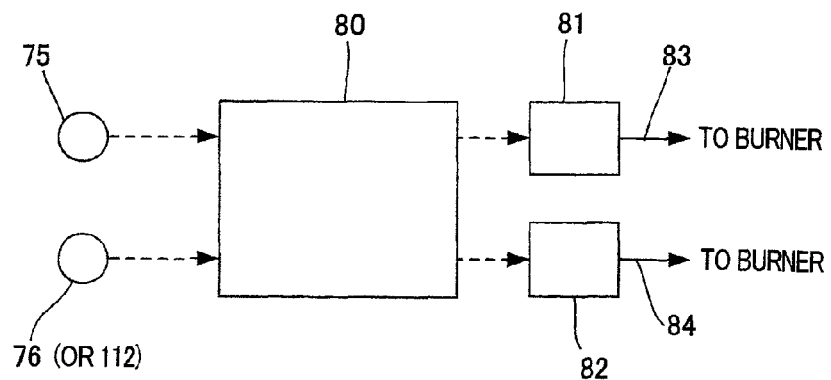
Figure 12:
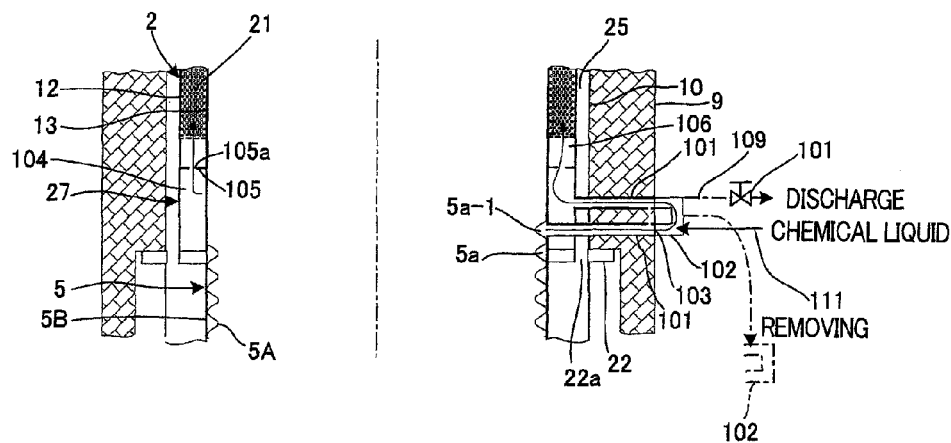
FIG. 12 shows a vertical section illustrating a configuration of a case where a duct for cleaning and a removable portion for cleaning are provided between a second vaporizer and a reforming-catalyst layer.

FIG. 5 shows a vertical section of a reforming apparatus according to Embodiment 2 of the present invention. FIG. 6 shows a horizontal section taken along and viewed as indicated by the arrowed line D-D of FIG. 5. FIG. 7 shows a horizontal section taken along and viewed as indicated by the arrowed line E-E of FIG. 5. FIG. 8 shows a horizontal section taken along and viewed as indicated by the arrowed line F-F of FIG. 5. FIG. 9 shows a horizontal section taken along and viewed as indicated by the arrowed line G-G of FIG. 5. FIG. 10 shows a heat exchanger to exchange heat between heating gas and process water (water). FIG. 11 shows a block diagram illustrating a temperature control system that the reforming apparatus is provided with. FIG. 12 shows a vertical section illustrating a structure of a case where a duct for cleaning and a removable portion for cleaning are provided between a second vaporizer and a reforming-catalyst layer.
<Configuration>

As FIG. 5 shows, a burner 1, a reforming-portion cylindrical pipe 10, a reforming pipe 2 that is provided with a reforming-catalyst layer 21, a high-temperature CO-shift catalyst layer 3, and the like are disposed on the upper side of the reforming apparatus of Embodiment 2, while a first vaporizer 4, a second vaporizer 5, an $O_2$-adsorption catalyst layer 6, a low-temperature CO-shift catalyst layer 7, a CO-removing catalyst layer 8, and the like are disposed on the lower side of the reforming apparatus. A ceramic-fiber thermally-insulating material 9 is provided to cover the above-mentioned constituent elements entirely.

Detailed description will be given with reference to FIGS. 5 to 9. The reforming pipe 2 has a triple-pipe structure including the following concentrically-arranged three pipes: an inner cylindrical pipe 11 located on the innermost side; an outer cylindrical pipe 12 located on the outermost side; and an intermediate cylindrical pipe 13 located between the inner cylindrical pipe 11 and the outer cylindrical pipe 12. These cylindrical pipes 11, 12, and 13 are disposed so as to surround the burner 1. Thus, the reforming apparatus is not of a multitubular type that is provided with multiple reforming pipes, but of a single-pipe type that is provided with only the single reforming pipe 2.

The lower end of the inner cylindrical pipe 11 is closed by a circular-shell plate 14 that serves as a lower-end plate. A thermally-insulating material 15 is provided above the circular-shell plate 14. The thermally-insulating material 15 is a ceramic-fiber member formed into a columnar shape. The circular-shell plate 14 has a circular-arc vertical section that is convex downward. Such a sectional shape is advantageous in terms of thermal stress. The upper-end side of the interstice between the inner cylindrical pipe 11 and the outer cylindrical pipe 12 is closed by an annular upper-end plate 16 (first upper-end plate). A gap is left between the upper-end plate 16 and the upper end of the intermediate cylindrical pipe 13, and this gap serves as a reformed-gas turning portion 17. The upper-end plate 16 has a circular-arc vertical section that is convex upward. Such a sectional shape is also advantageous in terms of thermal stress.

A cylindrical gap is left between the intermediate cylindrical pipe 13 and the inner cylindrical pipe 11, and this gap serves as a reformed-gas flow passage 18. The reformed-gas flow passage 18 has a width of, for example, approximately 2 mm. The reforming-catalyst layer 21 is a cylindrical body formed in the gap between the intermediate cylindrical pipe 13 and the outer cylindrical pipe 12. Each of the intermediate cylindrical pipe 13 and the outer cylindrical pipe 12 has a length of, for example, approximately 600 mm. The distance between the intermediate cylindrical pipe 13 and the outer cylindrical pipe 12 is, for example, approximately 20 mm. In the example shown in FIG. 5, a space is formed by the intermediate cylindrical pipe 13, the outer cylindrical pipe 12, and perforated plates (punching plates) 19 and 20 that are fixed respectively to the upper-end portion and to the lower-end portion of the interstice between these cylindrical pipes 13 and 12. The reforming-catalyst layer 21 is formed by filling a reforming catalyst into the space thus formed. A disc-shaped supporting plate 22 is disposed between the upper side and the lower side of the reforming apparatus. The lower-end side of the interstice between the outer cylindrical pipe 12 and the intermediate cylindrical pipe 13 is closed by the supporting plate 22. To be more specific, the lower end of the outer cylindrical pipe 12 is fixed to the upper-surface side of the supporting plate 22 while the lower end of the intermediate cylindrical pipe 13 is connected to the upper end of the second vaporizer 5. In addition, the sidewall of the second vaporizer 5 is fixed to the inner circumference of the supporting plate 22.

A header tank 27 is disposed under the reforming-catalyst layer 21 so as to surround an outlet 5a-1 of a flow passage 5a of the second vaporizer 5. The header tank 27 includes: a cylindrical pipe 27a that surrounds the flow-passage outlet 5a-1; a part of the second vaporizer 5 (a part of a cylindrical pipe 5B); an annular-shaped upper-end plate 27b that closes the upper end of the interstice between the cylindrical pipe 27a and the second vaporizer 5 (cylindrical pipe 5B); and a part of the supporting plate 22 that closes the lower end of the interstice between the cylindrical pipe 27a and the second vaporizer 5 (cylindrical pipe 5B). Multiple ejection holes 27c are formed in the cylindrical pipe 27a, which forms the sidewall of the header tank 27. The multiple ejection holes 27c are arranged in the circumferential direction of the cylindrical pipe 27a.

The reforming-portion cylindrical pipe 10 is disposed concentrically with the outer cylindrical pipe 12 of the reforming pipe 2 so as to surround the outer cylindrical pipe 12. The upper-end side of the reforming-portion cylindrical pipe 10 is closed by an upper-end plate 23 (second upper-end plate). A gap is left between the upper-end plate 23 and the upper-end plate 16, and this gap serves as a heating-gas turning portion 24. In addition, a cylindrical gap is left between the reforming-portion cylindrical pipe 10 and the outer cylindrical pipe 12, and this gap serves as a heating-gas flow passage 25. The end portion on the upper side of the heating-gas flow passage 25 serves as an inlet 25a, and the end portion on the lower side of the heating-gas flow passage 25 serves as an outlet 25b. The heating-gas flow passage 25 has a width of, for example, approximately 10 mm. The lower end of the reforming-portion cylindrical pipe 10 is fixed to the top-surface side of the supporting plate 22. Multiple circulation holes 22a are formed in the supporting plate 22. The multiple circulation holes 22a are arranged in the circumferential direction of the supporting plate 22 at positions corresponding to the interstice between the reforming-portion cylindrical pipe 10 and the outer cylindrical pipe 12 (i.e., corresponding to the heating-gas flow passage 25).

The burner 1 is positioned at the upper-end side of the reforming pipe 2 (at the upper-end portion of the reforming apparatus) so as to face downwards. The burner 1 is fixed to the upper-end plate 23 so as to penetrate the upper-end plate 23 of the reforming-portion cylindrical pipe 10 and an upper portion 9a of the thermally-insulating material 9. A combustion-space 33 is formed below the burner 1, and in this space, flame 37 of the burner 1 is created so as to be directed downwards. Note that, in the example shown in FIG. 5, a cylindrically-shaped external-cylinder pipe for burner 34 that the burner 1 is provided with extends downwards, and a the cylindrical gap left between the external-cylinder pipe for burner 34 and the inner cylindrical pipe 11 of the reforming pipe 2 serves as a heating-gas flow passage 35. A gap left between the lower end of the external-cylinder pipe for burner 34 and the thermally-insulating material 15 serves as a heating-gas turning portion 36. The length of the burner 1 including the external-cylinder pipe for burner 34 is, for example, approximately 400 mm.

The first vaporizer 4 is a cylindrical body, and includes a spiral flow passage 4a (first flow passage) that process water 85 as water is allowed to flow through. The second vaporizer 5 is a cylindrical body that has a smaller diameter than the diameter of the first vaporizer 4. The second vaporizer 5 includes a spiral flow passage 5a (second flow passage) that a mixture 89, that is, a mixed fluid of the process water (steam) 85 and a raw material 86, is allowed to flow through. The first vaporizer 4 and the second vaporizer 5 are concentrically disposed so that the first vaporizer 4 is located at the outer side and the second vaporizer 5 is located at the inner side. A cylindrical gap left between the first vaporizer 4 and the second vaporizer 5 serves as a heating-gas flow passage 26. The width of the heating-gas flow passage 26 is, for example, approximately 3 mm at a narrower portion (i.e., a portion located between a convex portion of the wavy pipe 4A of the first vaporizer 4 and the cylindrical pipe 5B of the second vaporizer 5). Carbon-based fuel, such as town gas (methane gas) or kerosene, is used as the raw material 86.

The configurations of the first vaporizer 4 and the second vaporizer 5 will be described in detail. The first vaporizer 4 has a double-pipe structure formed by fitting a cylindrical pipe 4B onto the outer-circumferential surface side of a wavy pipe (corrugated pipe) 4A. The second vaporizer 5 also has a double-pipe structure formed by fitting a cylindrical pipe 5B onto the outer-circumferential side of a wavy pipe (corrugated pipe) 5A.

Each of the cylindrical pipes 4B and 5B is a cylindrical body with no protruding or recessed portions formed on its pipe surface. Each of the wavy pipes 4A and 5A has protruding and recessed portions (wavy forms) formed on its pipe surface. The protruding and recessed portions of each of the wavy pipes 4A and 5A are shaped in spiral patterns extending spirally in the pipe-axis direction along the pipe surface of the corresponding one of the wavy pipes 4A and 5A. The wavy pipe 4A has a length of, for example, approximately 600 mm, and the wavy pipe 5A is longer than the wavy pipe 4A. Each of the wavy pipes 4A and 5A with the above-described shape can be easily fabricated, for example, through a spinning process. Specifically, while the two-end sides of a cylindrical pipe is pressed and supported, the cylindrical pipe is rotated about the pipe axis. A pressing roller of a spherical body is then pressed onto the outer-circumferential surface of this rotating cylindrical pipe while the pressing roller is moved in the pipe-axis direction of the cylindrical pipe (feed motion) In addition, fitting the wavy pipe 4A and the cylindrical pipe 4B together can be done easily, for example, by shrink-fitting the cylindrical pipe 4B onto the outer-circumferential surface of the wavy pipe 4A. Alternatively, a sheet material may be wrapped around the outer-circumferential surface of the wavy pipe 4A, and then the end portions, in the wrapping direction, of the sheet material are welded together to form the cylindrical pipe B. The fitting of the wavy pipe 5A and the cylindrical pipe 5B together can be done easily in a similar way to the way of fitting the wavy pipe 4A and the cylindrical pipe 4B together.

In the first vaporizer 4, when the wavy pipe 4A and the cylindrical pipe 4B are fitted together, a spiral gap is formed between the wavy pipe 4A (spiral protruding and recessed portions) and the cylindrical pipe 4B. This gap serves as the above-described flow passage 4a. Likewise, also in second vaporizer 5, when the wavy pipe 5A and cylindrical pipe 5B are fitted together, a spiral gap is formed between the wavy pipe 5A (spiral protruding and recessed portions) and the cylindrical pipe 5B. This gap serves as the above-described flow passage 5a.

The end portion located on the lower side of the flow passage 4a of the first vaporizer 4 serves as an inlet 4a-1, and the end portion located on the upper side of the flow passage 4a of the first vaporizer 4 serves as an outlet 4a-2. The end portion located on the upper side of the flow passage 5a of the second vaporizer 5 serves as an outlet 5a-1, and the end portion located on the lower side of the flow passage 5a of the second vaporizer 5 serves as an inlet 5a-2. A first-end side of a process-water supply pipe 28 is connected to the inlet 4a-1 of the flow passage 4a, and the second-end side of the process-water supply pipe 28 is connected to a first-end side of a tube 77. A second-end side of the tube 77 is connected to an unillustrated process water supply apparatus, such as a pump, via another process-water supply pipe 28a. Note that the tube 77 does not have to be provided. When the tube 77 is not provided, the second-end side of the process-water supply pipe 28, which is the side connected to the inlet 4a-1 of the flow passage 4a in the above-described configuration, is directly connected to the process water supply apparatus.

A duct 29 is disposed at the outer side of the first vaporizer 4 (CO-removing catalyst layer 8). A first-end side of this duct 29 is connected to the upper-end portion of the first vaporizer 4 (cylindrical pipe 4B), and a second-end side of the duct 29 is connected to the lower-end portion of the second vaporizer 5 (cylindrical pipe 5B). To put it differently, by means of the duct 29, the outlet 4a-2 of the flow passage 4a of the first vaporizer 4 is connected to the inlet 5a-2 of the flow passage 5a of the second vaporizer 5. A first-end side of a raw-material supply pipe 30 is connected to a point located on the duct 29, and the connecting portion where the raw-material supply pipe 30 and the duct 29 are connected to each other serves as a raw-material mixing portion 31. Note that the position of the raw-material mixing portion 31, that is, the position where the duct 29 and the raw-material supply pipe 30 are connected to each other, is not limited to the lower-end portion of the duct 29 as in the case of the example shown in FIG. 5, and may be any position on the duct 29. In addition, this raw-material mixing portion 31 preferably has a double-nozzle structure as in the case shown in FIG. 4. A second-end side of the raw-material supply pipe 30 is connected to a raw-material supply apparatus, such as a pump. The outlet 5a-1 of the flow passage 5a leads to the inside of the header tank 27.

The lower-end side of the interstice between the first vaporizer 4 and the second vaporizer 5 (heating-gas flow passage 26) is closed by an annular-shaped lower-end plate 32. The end portion located on the upper side of the heating-gas flow passage 26 serves as an inlet 26a, and the end portion located on the lower side of the heating-gas flow passage 26 serves as an outlet 26b.

An upper-end portion 4B-1 of the cylindrical pipe 4B of the first vaporizer 4 has an amplified internal diameter that is approximately equal to the internal diameter of the reforming-portion cylindrical pipe 10. The upper end of the upper-end portion 4B-1 is fixed to the lower-surface side of the supporting plate 22. Accordingly, in the upper-end portion 4B-1 of the cylindrical pipe 4B, a space 38 that has a larger width than the heating-gas flow passage 26 is formed between the cylindrical pipe 4B and the second vaporizer 5 (cylindrical pipe 5B). The outlet 25b of the heating-gas flow passage 25 on the reforming pipe 2 side is connected to the inlet 26a of the heating-gas flow passage 26 on the vaporizers 4 and 5 side via this space 38 and the circulation holes 22a formed in the supporting plate 22.

A first-end side of an exhaust pipe 39 is connected to the outlet 26b of the heating-gas flow passage 26, and a second-end side of the exhaust pipe 39 is connected to the inlet side of a heat exchanger 40 that is disposed outside of the thermally-insulating material 9. A first-end side of an air-for-burner supply pipe 41 is also connected to the inlet side of the heat exchanger 40, and a second-end side of the air-for-burner supply pipe 41 is connected to an air supplying apparatus for burner 82, such as a pump (see FIG. 11). On the other hand, a first-end side of an exhaust pipe 42 and a first-end side of an air-for-burner supply pipe 43 are connected to the outlet side of the heat exchanger 40. A second-end side of the exhaust pipe 42 is opened to the atmosphere, and a second-end side of the air-for-burner supply pipe 43 is connected to the burner 1. Specifically, the heat exchanger 40 is provided for the purpose of achieving heat exchange between heating gas 88 and air 84 for burner. A first-end side of a fuel-for-burner supply pipe 44 is also connected to the burner 1, and a second-end side of the fuel-for-burner supply pipe 44 is connected to an fuel supplying apparatus for burner 81, such as a pump (see FIG. 11).

A disc-shaped supporting plate 45 is disposed at the lower end of the reforming apparatus, and serves as a base. The lower end of the cylindrical pipe 5B of the second vaporizer 5 is fixed to the upper surface of the lower-end plate 45. In addition, a slender cylindrical pipe 46 (second cylindrical pipe) stands on the upper surface of the lower-end plate 45. The cylindrical pipe 46 extends to a position located in the vicinity of the lower end of the inner cylindrical pipe 11 of the reforming pipe 2 (in the vicinity of the circular-shell plate 25). The upper end of the cylindrical pipe 46 is closed by an upper-end plate 47. In addition, the cylindrical pipe 46 is positioned at the inner side of the second vaporizer 5 (the wavy pipe 5A and the cylindrical pipe 5B) and of the reforming pipe 2 (intermediate cylindrical pipe 13), and is disposed so as to be concentrical with these members.

The high-temperature CO-shift catalyst layer 3 is a cylindrical body provided between the intermediate cylindrical pipe 13 of the reforming pipe 2 and the cylindrical pipe 46. Specifically, the high-temperature CO-shift catalyst layer 3 is disposed at the inner side of the reforming-catalyst layer 21 and below the circular-shell plate 14 of the inner cylindrical pipe 11. In the example shown in FIG. 5, a space is formed by the intermediate cylindrical pipe 13, the cylindrical pipe 46, and perforated plates (punching plates) 48 and 49 that are fixed to the upper-end portion and the lower-end portion of the interstice between these cylindrical pipes 13 and 46. The high-temperature CO-shift catalyst layer 3 is formed by filling a high-temperature CO-shift catalyst into the space thus formed. The operation temperature of this high-temperature CO-shift catalyst ranges, for example, from 550° C. to 400° C.

A cylindrical pipe 50 (first cylindrical pipe) is disposed inside the second vaporizer 5. The cylindrical pipe 50 is positioned between the second vaporizer 5 and the cylindrical pipe 46, and is disposed concentrically with the second vaporizer 5 (the wavy pipe 5A and the cylindrical pipe 5B), the cylindrical pipe 46, and the like. The length of the cylindrical pipe 50 is approximately the same as the length of the second vaporizer 5. The upper and lower ends of the interstice between the cylindrical pipe 50 and the cylindrical pipe 46 are closed respectively by an upper-end plate 51 and a lower-end plate 52. A cylindrical gap is left between the cylindrical pipe 50 and the second vaporizer 5 (wavy pipe 5A), and this gap serves as a reformed-gas flow passage 53. The width of the reformed-gas flow passage 53 is, for example, approximately 2 mm at a narrow portion (i.e., a portion between a convex portion of the wavy pipe 5A of the second vaporizer 5 and the cylindrical pipe 50). Multiple circulation holes 54 are formed in the cylindrical pipe 50. The multiple circulation holes 54 are formed in the circumferential direction of the cylindrical pipe 50 at positions between the $O_2$-adsorption catalyst layer 6 located on the upper side and the low-temperature CO-shift catalyst layer 7 located on the lower side. The circulation holes 54 connects the reformed-gas flow passage 53 located at the outer side of the cylindrical pipe 50, to an inlet 73 of the low-temperature CO-shift catalyst layer 7 (i.e., to a space located between the cylindrical pipe 50 and the cylindrical pipe 46 that are located on the upper-end side of the low-temperature CO-shift catalyst layer 7).

The low-temperature CO-shift catalyst layer 7 is a cylindrical body that is provided in a lower-side portion of the interstice between the cylindrical pipe 50 and the cylindrical pipe 46. The lower-end position of the low-temperature CO-shift catalyst layer 7 corresponds approximately to the lower-end position of the second vaporizer 5. In the example shown in FIG. 5, a space is formed by the cylindrical pipe 50, the cylindrical pipe 46, and perforated plates (punching plates) 55 and 56 that are fixed to the lower-end portion and the middle portion of the interstice between the cylindrical pipes 50 and 46. The low-temperature CO-shift catalyst layer 7 is formed by filling a low-temperature CO-shift catalyst into the space thus formed. The operation temperature of the low-temperature CO-shift catalyst ranges, for example, from 150° C. to 250° C.

The $O_2$-adsorption catalyst layer 6 is a cylindrical body that is provided in an upper-side portion of the interstice between the cylindrical pipe 50 and the cylindrical pipe 46. The $O_2$-adsorption catalyst layer 6 is positioned above the low-temperature CO-shift catalyst layer 7. In the example shown in FIG. 5, a space is formed by the cylindrical pipe 50, the cylindrical pipe 46, and perforated plates (punching plates) 57 and 58 that are fixed to the upper-end portion and the middle portion of the interstice between the cylindrical pipes 50 and 46. The $O_2$-adsorption catalyst layer 6 is formed by filling an oxidizable and reducible $O_2$-adsorption catalyst into the space thus formed.

In addition, a heating-gas induction pipe 59 penetrates the low-temperature CO-shift catalyst layer 7 and the $O_2$-adsorption catalyst layer 6. A first-end side of the heating-gas induction pipe 59 extends upwards, and sticks out of the upper end of the $O_2$-adsorption catalyst layer 6. A gap is left between the first end (the upper end) of the heating-gas induction pipe 59 and the upper-end plate 51, and this gap serves as a heating-gas turning portion 108. A second-end side of the heating-gas induction pipe 59 penetrates the lower-end plate 52 of the cylindrical pipe 50 and the cylindrical pipe 5B of the second vaporizer 5, comes out to the outside, and is connected to the discharging side of a pump 60. The induction side of the pump 60 is connected to the outlet side of a condenser 62 through a duct 61. The inlet side of the condenser 62 is connected to the exhaust pipe 39 through a duct 63.

The cylindrical CO-removing catalyst layer 8 is provided so as to surround the first vaporizer 4. In the example shown in FIG. 5, a space is formed by the cylindrical pipe 64 that is concentrically disposed so as to surround the first vaporizer 4 (cylindrical pipe 4B), the cylindrical pipe 4B of the first vaporizer 4, and perforated plates (punching plates) 65 and 66 that are fixed to the upper-end side and the lower-end side of the interstice between the cylindrical pipes 64 and 4B. The CO-removing catalyst layer 8 is formed by filling a CO-removing catalyst (PROX catalyst) into the space thus formed. The upper and lower ends of the interstice between the cylindrical pipe 4B of the first vaporizer 4 and the cylindrical pipe 64 are closed respectively by an upper-end plate 67 and by a lower-end plate 68.

A duct 69 is disposed outside the first vaporizer 4 (CO-removing catalyst layer 8). A first-end side and second-end side of the duct 69 are connected respectively to the lower-end plate 52, and the upper-end portion of the cylindrical pipe 64. Accordingly, the duct 69 connects an outlet 70 of the low-temperature CO-shift catalyst layer 7 (a space located on the lower-end side of the low-temperature CO-shift catalyst layer 7 and between the cylindrical pipe 50 and the cylindrical pipe 46) to an inlet 71 of the CO-removing catalyst layer 8 (a space located on the upper-end side of the CO-removing catalyst layer 8 and between the cylindrical pipe 64 and the cylindrical pipe 4B). A first end of the reformed-gas supply pipe 74 is connected to the outlet 72 of the CO-removing catalyst layer 8 (i.e., a space located on the lower-end side of the CO-removing catalyst layer 8 and between the cylindrical pipe 64 and the cylindrical pipe 4B). A second-end side of the reformed-gas supply pipe 74 is connected to an unillustrated fuel cell.

In addition, a first-end side of an air supplying pipe 98 for CO selective oxidation is also connected to the duct 69. Accordingly, the portion where the duct 69 and the air supplying pipe 98 for CO selective oxidation are connected to each other serves as an air mixing portion 99. Note that the air mixing portion 99 can be located at any position on the duct 69. A second-end side of the air supplying pipe 98 for CO selective oxidation is connected to an unillustrated air supplying apparatus for CO selective oxidation, such as a pump.

The thermally-insulating material 9 is a cylindrical body, and is placed on top of the supporting plate 45. The upper end of the thermally-insulating material 9 is closed by an upper portion 9a that covers the upper-end plate 23 of the reforming-portion cylindrical pipe 10. The thermally-insulating material 9 thermally insulates the constituent elements of the reforming apparatus entirely. On the upper side of the reforming apparatus, the thermally-insulating material 9 surrounds the reforming-portion cylindrical pipe 10, the reforming pipe 2 (reforming-catalyst layer 21) and the high-temperature CO-shift catalyst layer 3. On the lower side of the reforming apparatus, the thermally-insulating material 9 surrounds the CO-removing catalyst layer 8, the first vaporizer 4, the second vaporizer 5, the $O_2$-adsorption catalyst layer 6, and the low-temperature CO-shift catalyst layer 7. In addition, both of the ducts 29 and 69 are housed in the thermally-insulating material 9.

The external diameter of the thermally-insulating material 9 is invariable from the top to the bottom thereof. In contrast, in the thermally-insulating material 9, the internal diameter is smaller in the upper side while the internal diameter is larger in the lower side. Since the ducts 29 and 69 are included, the external diameter of the lower-side portion of the reforming apparatus is larger than the external diameter of the reforming-portion cylindrical pipe 10 that is disposed on the upper side of the reforming apparatus. To put it differently, considering this difference between these external diameters, even when the thermally-insulating material 9 has an invariable external diameter, the upper side of the thermally-insulating material 9 that needs higher thermal insulation than the lower side of the thermally-insulating material 9 (for example, 70-mm thickness) can be thicker than the lower side of the thermally-insulating material 9 (for example, 50-mm thickness).

In addition, on the upper side of the thermally-insulating material 9, the tube 77 is wrapped spirally around the outer-circumferential surface of the thermally-insulating material 9. As described above, the first-end side of the tube 77 is connected to the second-end side of the process-water supply pipe 28 that is drawn out to the outside of thermally-insulating material 9. In the meanwhile, the second-end side of the tube 77 is connected to an unillustrated process water supply apparatus through the other process-water supply pipe 28a. Note that the tube 77 does not have to be provided, but the tube 77 is effective when the efficiency of the reforming apparatus needs to be improved. For example, when the insulating performance of the thermally-insulating material 9 wrapped around the reforming-portion cylindrical pipe 10 is insufficient and thus the surface temperature of the thermally-insulating material 9 becomes as high as approximately 50° C., it is preferable to provide the tube 77 so as to collect the heat radiated from the thermally-insulating material 9.

In addition, a heat exchanger 78 as shown in FIG. 10 may be provided to exchange heat between the heating gas 88 and the process water 85. The heat exchanger 78 is disposed outside the thermally-insulating material 9, and is placed a certain point between the process-water supply pipe 28 and the exhaust pipe 39.

In addition, as FIG. 5 shows, a first reformed-gas thermometer 75 is disposed at an outlet 79 of the reforming-catalyst layer 21 (i.e., at a space located on the upper-end side of the reforming-catalyst layer 21 and between the outer cylindrical pipe 12 and the intermediate cylindrical pipe 13), and a second formed-gas thermometer 76 is disposed at an inlet 73 of the low-temperature CO-shift catalyst layer 7. The first reformed-gas thermometer 75 is used for the purpose of measuring the temperature of the reformed gas that has flowed out of the reforming-catalyst layer 21, and the second reformed-gas thermometer 76 is used for the purpose of measuring the temperature of the reformed gas that is about to flow flowing into the low-temperature CO-shift catalyst layer 7. As FIG. 11 shows, both the temperature-measurement signal of the first reformed-gas thermometer 75 and the temperature-measurement signal of the second reformed-gas thermometer 76 are inputted into a temperature controller 80.

The temperature controller 80 controls the fuel supplying apparatus for burner 81 so that the value of the reformed-gas temperature measured by the first reformed-gas thermometer 75 at the reforming-catalyst-layer outlet 79 is kept at a predetermined temperature (for example, at 750° C.). Thus, the amount of fuel 83 for burner to be supplied from the fuel supplying apparatus for burner 81 to the burner 1 can be controlled.

Specifically, when the measured value of the reformed-gas temperature at the reforming-catalyst-layer outlet 79 is lower than the predetermined temperature, the amount of the fuel for burner to be supplied to the burner 1 is increased so as to raise the heating-gas temperature at the burner 1 until the reformed-gas temperature (measured value) at the reforming-catalyst-layer outlet 79 reaches the predetermined temperature. In contrast, when the measured value of the reformed-gas temperature at the reforming-catalyst-layer outlet 79 is higher than the predetermined temperature, the amount of the fuel for burner to be supplied to the burner 1 is reduced so as to lower the heating-gas temperature at the burner 1 until the reformed-gas temperature (measured value) at the reforming-catalyst-layer outlet 79 reaches the predetermined temperature. Note that some examples of the control performed, in this case, by the temperature controller 80 on the fuel supplying apparatus for burner 81 include: control on the aperture of a fuel-velocity adjustment valve disposed in the fuel supplying apparatus for burner 81; control on the output of the pump (amount of fuel to be discharged by the pump); and the like.

In addition, the temperature controller 80 controls the air supplying apparatus for burner 82 so that the value of the reformed-gas temperature measured by the second reformed-gas thermometer 76 at the low-temperature-CO-shift-catalyst-layer inlet 73 is kept at a predetermined temperature (for example, at 250° C.). Thus, the amount of the air 84 for burner to be supplied from the air supplying apparatus for burner 82 to the burner 1 can be controlled.

Specifically, when the measured value of the reformed-gas temperature at the low-temperature-CO-shift-catalyst-layer inlet 73 is lower than the predetermined temperature, the amount of air for burner to be supplied to the burner 1 is increased so as to raise the heating-gas velocity at the burner 1, that is, so as to increase the amount of air contained in the heating gas (diluent-air amount) until the reformed-gas temperature (measured value) at the low-temperature-CO-shift-catalyst-layer inlet 73 reaches the predetermined temperature. In contrast, when the measured value of the reformed-gas temperature at the low-temperature-CO-shift-catalyst-layer inlet 73 is higher than the predetermined temperature, the amount of air for burner to be supplied to the burner 1 is lowered so as to reduce the heating-gas velocity at the burner 1 (heating-gas air amount) until the reformed-gas temperature (measured value) at the low-temperature CO-shift-catalyst-layer inlet 73 reaches the predetermined temperature. Note that some examples of the control performed, in this case, by the temperature controller 80 on the air supplying apparatus for burner 82 include: control on the aperture of an air-velocity adjustment valve disposed in the air supplying apparatus for burner 82; control on the output of the pump (amount of air to be discharged by the pump); and the like. Description will be given later as to the principle on which the reformed-gas temperature at the low-temperature-CO-shift-catalyst-layer inlet 73 can be controlled by the heating-gas velocity (heating-gas air amount).

Note that a thermometer for mixture 112 may be disposed at the outlet 5a-1 of the flow passage 5a of the second vaporizer 5. Thus, the temperature controller 80 can control the fuel supplying apparatus for burner 81 so that the value of the temperature of the mixture 89 (superheated steam) measured by the thermometer for mixture 112 at the flow-passage outlet 5a-1 can be kept at a predetermined temperature (for example, at 400° C.). Thus, the amount of the fuel 83 for burner to be supplied from the fuel supplying apparatus for burner 81 to the burner 1 can be controlled. Specifically, when the measured value of the mixture temperature at the flow-passage outlet 5a-1 is lower than the predetermined temperature, the amount of the air for burner to be supplied to the burner 1 is increased so as to raise the heating-gas velocity at the burner 1, that is, so as to increase the amount of the air contained in the heating gas (diluent-air amount) until the mixture temperature (measured value) at the flow-passage outlet 5a-1 reaches the predetermined temperature. In contrast, when the measured value of the mixture temperature at the flow-passage outlet 5a-1 is higher than the predetermined temperature, the amount of air for burner to be supplied to the burner 1 is reduced so as to lower the heating-gas velocity at the burner 1 (heating-gas air amount) until the mixture temperature (measured value) at the flow-passage outlet 5a-1 reaches the predetermined temperature.

In addition, as FIG. 12 shows, a duct for cleaning 101 and a removable portion for cleaning 102 may be provided between the second vaporizer 5 and the reforming-catalyst layer 21. A first-end side and a second-end side of the duct for cleaning 101 are connected respectively to the cylindrical pipe 5B of the second vaporizer 5, and the outer cylindrical pipe 12 of the reforming pipe 2. The duct for cleaning 101 thus connects the outlet 5a-1 of the flow passage 5a of the second vaporizer 5 to a space 104 that is formed below the reforming-catalyst layer 21 and between the outer cylindrical pipe 12 of the reforming pipe 2 and the intermediate cylindrical pipe 13 (i.e., to an inlet 106 of the reforming-catalyst layer 21). In addition, an annular-shaped upper-end plate 105 is provided in the space 104 and between the outer cylindrical pipe 12 and the intermediate cylindrical pipe 13. Multiple ejection holes 105a are formed in the upper-end plate 105 in the circumferential direction thereof. Accordingly, in this case, the header tank 27 is formed by the upper-end plate 105, a part of the outer cylindrical pipe 12, a part of the intermediate cylindrical pipe 13, a part of the second vaporizer 5 (cylindrical pipe 5B), and a part of the supporting plate 22.

In addition, the removable portion for cleaning 102 is detachably attached to a certain position on the duct for cleaning 101. The duct for cleaning 101 penetrates the thermally-insulating material 9, and the removable portion for cleaning 102 is positioned outside the thermally-insulating material 9. As indicated by the dashed-dotted line in FIG. 12, when the removable portion for cleaning 102 is removed, a fill port 103 that is an open end of the duct for cleaning 101 is exposed. A chemical liquid 111 is poured in through the fill port 103. Note that the removable portion for cleaning 102 can be attached by some appropriate attachment-detachment means. For example, the removable portion for cleaning 102 can be simply removably-fitted to the duct for cleaning 101. Alternatively, the removable portion for cleaning 102 can be detachably fastened to the duct for cleaning 101 by some fastening means, such as a bolt and a nut.

Now, descriptions will be given for the flow of heating gas 88 as well as the flows of the process water 85, the raw material 86, the mixture 89, and the reformed gas 87 at the time when the reforming apparatus with the above-described configuration is in the steady operation. In FIG. 5, the flow of the heating gas 88 is indicated by arrowed dot-lines, and the flows of the process water 85, the raw material 86, the mixture 89, and the reformed gas 87 are indicated by arrowed solid-lines.

Firstly, description will be focused mainly on the flow of the heating gas 88.

By using the burner 1 to burn the fuel 83 for burner that is supplied to the burner 1 from the fuel supplying apparatus for burner and burn the air 84 for burner that is supplied to the burner 1 from the air supplying apparatus for burner are burned by the burner 1, the high-temperature (for example, at 1000° C.) heating gas 88 is produced. Since the burner 1 faces downwards, the heating gas 88 flows downwards at first. However, since the lower end of the inner cylindrical pipe 11 of the reforming pipe 2 is closed by the circular-shell plate 14 (since, in the example shown in FIG. 5, the lower end of the inner cylindrical pipe 11 of the reforming pipe 2 is closed by the thermally-insulating material 15 in the first place), the heating gas 88 turns around and flows upwards along the inner surface of the inner cylindrical pipe 11 (in the example shown in FIG. 5, the heating gas 88 flows through the heating-gas flow passage 35). At this time, the heat of the heating gas 88 is supplied to the reforming-catalyst layer 21 from the inside of the reforming pipe 2 by way of the inner cylindrical pipe 11 and the intermediate cylindrical pipe 13.

After that, the heating gas 88 turns around at the heating-gas turning portion 24, then flows into the heating-gas flow passage 25 formed at the outer side of the reforming pipe 2 through the inlet 25a, then flows downwards through the heating-gas flow passage 25, and then flows out through the outlet 25b. Also at this time, the heat of the heating gas 88 is supplied to the reforming-catalyst layer 21 from the outer side of the reforming pipe 2 via the outer cylindrical pipe 12. In short, heat is exchanged between the heating gas 88 and the reforming-catalyst layer 21 or the mixture 89 that is flowing through the reforming-catalyst layer 21, and the heat exchange takes place both on the inner side and on the outer side of the reforming pipe 2 (reforming-catalyst layer 21). As a consequence, the temperature of the heating gas 88 that has flowed out of the heating-gas flow passage 25 is lowered down to, for example, approximately 400° C.

At this time, since the reforming-portion cylindrical pipe 10 is in contact with the heating gas 88 flowing through the heating-gas flow passage 25, the surface temperature of the reforming-portion cylindrical pipe 10 exhibits a temperature distribution, from the upper portion to the lower portion of the surface, ranging, for example, from 800° C. to 400° C., approximately. As described above, in order to reduce the heat radiated from the surface of the reforming-portion cylindrical pipe 10, the portion of thermally-insulating material 9 that surrounds the reforming-portion cylindrical pipe 10 is designed to be thicker (for example, 70-mm thickness) than the portion of the thermally-insulating material 9 that surrounds the first vaporizer 4 and the like (for example, 50-mm thickness).

The heating gas 88 that has flowed out of the heating-gas flow passage 25 flows through the circulation holes 22a of the supporting plate 22 and through the space 38, and then flows into the heating-gas flow passage 26 formed between the first vaporizer 4 and the second vaporizer 5 through the inlet 26a. Then, the heating gas 88 flows downwards through the heating-gas flow passage 26. At this time, the flow of the heating gas 88 is disturbed (agitated) by the protruding and recessed portions (wavy form) of the wavy pipe 4A of the first vaporizer 4, and thus becomes a turbulent flow. Here, both the surface temperature of the first vaporizer 4 (cylindrical pipe 4B) and the surface temperature of the CO-removing catalyst layer 8 (cylindrical pipe 64) are, for example, approximately 150° C. Accordingly, even when the portion of the thermally-insulating material 9 that surrounds the first vaporizer 4 and the CO-removing catalyst layer 8 is as thin as approximately 50 mm, the heat radiated from the surface of the first vaporizer 4 (cylindrical pipe 4B) and from the surface of the CO-removing catalyst layer 8 (cylindrical pipe 64) can be reduced sufficiently.

The heating gas 88 that has flowed through the heating-gas flow passage 26 flows out through the outlet 26b, then flows through the exhaust pipe 39, and then flows into the heat exchanger 40. In the heat exchanger 40, heat is exchanged between the heating gas 88 and the air 84 for burner supplied to the heat exchanger 40 from the air supplying apparatus for burner 82 (see FIG. 11) by way of the air-for-burner supply pipe 41. After the heat exchange, the temperature of the heating gas 88 is lowered down to, for example, approximately 50° C. This is because the heat of the heating gas 88 is collected by the air 84 for burner in this case. The heating gas 88 the heat of which has been collected in the heat exchanger 40 is discharged to the atmosphere by way of the exhaust pipe 42. On the other hand, the air for burner 88 that has collected the heat in the heat exchanger 40 is supplied to the burner 1 by way of the air-for-burner supply pipe 43.

Next, description will be focused mainly on the flows of the process water 85, the raw material 86, the mixture 89, and the reformed gas 87.

When the tube 77 is provided, the process water 85 supplied from the process-water supply apparatus flows through the tube 77 and the process-water supply pipe 28, and then flows into the flow passage 4a of the first vaporizer 4 through the inlet 4a-1. When the tube 77 is not provided, the process water 85 supplied from the process-water supply apparatus flows directly through the process-water supply pipe 28, and then flows into the flow passage 4a through the inlet 4a-1. When the tube 77 is provided, before the process water 85 flows into the flow passage 4a of the first vaporizer 4, that is, when flowing through the tube 77, the process water 85 absorbs the heat of the heating gas 88 that is transferred to the tube 77 from the inner side of the thermally-insulating material 9 via the thermally-insulating material 9.

In addition, when the heat exchanger 78 is provided, heat is exchanged, in this heat exchanger 78, between the process water 85 before flowing into the flow passage 4a of the first vaporizer 4 and the heating gas 88 that has flowed out of the heating-gas flow passage 26 formed between the first vaporizer 4 and the second vaporizer 5. To put it differently, the heat of the heating gas 88 is collected by the process water 85 in this case. The heating gas 88 that has been subjected to the heat collection in the heat exchanger 78 may be subjected to another round of heat collection in the heat exchanger 40 before the heating gas 88 is discharged by way of the exhaust pipe 42. When the heat exchanger 40 is not provided, the heating gas 88 that has been subjected to the heat collection in the heat exchanger 78 may be directly discharged to the atmosphere by way of the exhaust pipe 42. The process water 85 that has been subjected the heat collection in the heat exchanger 78 flows into the flow passage 4a of the first vaporizer 4 through the inlet 4a-1.

The process water 85 that has flowed into the flow passage 4a of the first vaporizer 4 by way of the tube 77 and the heat exchanger 78, or not by way of the tube 77 or the heat exchanger 78, flows upwards through the flow passage 4a. Since the flow passage 4a has a spiral shape, the process water 85 rises upwards flowing spirally along the outer-circumferential side of the heating-gas flow passage 26. At this time, the heating gas 88 that is flowing through the heating-gas flow passage 26 heats the process water 85. In addition, at the position where the CO-removing catalyst layer 8 is disposed, the process water 85 that is flowing through the flow passage 4a of the first vaporizer 4 absorbs (removes) the heat amount held by the reformed gas 87 that has flowed into the CO-removing catalyst layer 8 (a heat amount that is necessary for lowering the temperature of the reformed gas 87 down to a predetermined temperature (for example, from 150° C. down to 80° C.)), and the heat amount generated by the CO-selective-oxidation reaction ($2CO + O_2 \rightarrow 2CO_2$) of the reformed gas 87, the reaction taking place in the CO-removing catalyst layer 8.

At this time, the process water 85 that is flowing through the flow passage 4a of the first vaporizer 4 is vaporized to become water vapor (wet steam). The process water 85 is vaporized at a temperature of, for example, approximately 120° C. With the heat of vaporization of the process water 85, the CO-removing catalyst layer 8 is cooled down, and is kept at the vaporizing temperature of the process water 85 (at, for example, approximately 120° C.). Here, the flow of the heating gas 88 that is flowing through the heating-gas flow passage 26 is disturbed by the protruding and recessed portions (wavy form) of the wavy pipe 4A, and thus becomes a turbulent flow. Accordingly, the heat of the heating gas 88 and the heat of the CO-removing catalyst layer 8 are efficiently transferred to the process water 85.

Meanwhile, the temperature of the heating gas 88 that has flowed out of the heating-gas flow passage 26 is lowered since the heating gas 88 has given its heat to the process water 85. Here, the temperature of the heating gas 88 that has flowed out of the heating-gas flow passage 26 becomes as low as, for example, approximately 100° C. because the vaporizing temperature of the process water 85 is, for example, approximately 120° C., and because the temperature of the lower-end portion of the first vaporizer 4 into which the liquid process water 85 flows is kept at the room temperature. Note that, as described above, the heat amount held by the heating gas 88 can be utilized more effectively through heat exchange between the heating gas 88 that holds a heat amount of approximately 100° C. and the air 84 for burner in the heat exchanger 40 as well as through heat exchange between the heating gas 88 and the process water 85 in the heat exchanger 78.

The process water 85 flowing through the flow passage 4a of the first vaporizer 4 is partially vaporized, flows out through the outlet 4a-2, and then flows downwards through the duct 29. At this time, the raw material 86 supplied from the raw-material supply apparatus is mixed with the process water (steam) 85 in the raw-material mixing portion 31 located at a certain point of the duct 29, and thus the mixture 89 is produced. Here, the process water 85 is vaporized (evaporated), so that the vaporized process water 85 flows through the duct 29 at a speed that is as fast as, for example, approximately 50 m/s. Accordingly, because of the high-speed flow of the process water (steam) 85, the raw material 86 mixed in the raw-material mixing portion 31 is agitated well, and is uniformly dispersed in the process water (steam) 85. For this reason, the ratio of the process water (steam) 85 and the raw material 86 (S/C=Steam/Carbon) within the mixture 89 does not deviate from a planned value, and is kept steady.

The mixture 89 thus produced flows into the flow passage 5a of the second vaporizer 5 through the inlet 5a-2, and then flows upwards through the flow passage 5a. Since the flow passage 5a has a spiral shape, the mixture 89 rises upwards flowing spirally along the inner-circumferential side of the heating-gas flow passage 26.

The mixture 89 flowing through the flow passage 5a of the second vaporizer 5 is heated by the heat exchange with the heating gas 88 flowing through the heating-gas flow passage 26 located at the outer side of the second vaporizer 5. In addition, at the position where the low-temperature CO-shift catalyst layer 7 is disposed, the mixture 89 flowing through the flow passage 5a of the second vaporizer 5 absorbs (removes) the heat amount held by the reformed gas 87 that has flowed into the low-temperature CO-shift catalyst layer 7 (a heat amount that is necessary for lowering the temperature of the reformed gas 87 down to a predetermined temperature (for example, from 250° C. down to 150° C.)) and the heat amount generated by the CO-shift reaction (CO+$H_2O$→$H_2$+$CO_2$) of the reformed gas 87 (a heat amount that is necessary for raising the temperature of the reformed gas 87 by, for example, approximately 50° C.), the reaction taking place in the low-temperature CO-shift catalyst layer 7.

In addition, at a position located above the low-temperature CO-shift catalyst layer 7, the mixture 89 flowing through the flow passage 5a of the second vaporizer 5 absorbs the heat amount held by the reformed gas 87 flowing through the reformed-gas flow passage 53 located at the inner side of the second vaporizer 5 (a heat amount that is necessary for lowering the temperature of the reformed gas 87 down to a predetermined temperature (for example, from 550° C. down to 250° C.)). Accordingly, while the mixture 89 is flowing through the flow passage 5a of the second vaporizer 5, the mixture 89 becomes superheated steam (dry steam). In this event, the heat of the heating gas 88, the heat radiated from the low-temperature CO-shift catalyst layer 7 (cylindrical pipe 50), and the heat of the reformed gas 87 vaporize the unvaporized part of the process water 85 in the mixture 89. In addition, when the raw material 86 in the mixture 89 is liquid fuel, such as kerosene, the liquid fuel is also vaporized. The temperature of the mixture 89 at the time when the mixture 89 flows out of the flow passage 5a of the second vaporizer 5 reaches, for example, approximately 400° C.

At this time, the raw material 86 in the mixture 89 is heated together with the process water 85 in the mixture 89, and the vaporizing temperature of the process water 85 herein is within a range of approximately 100° C. to 150° C. Accordingly, even when the raw material 86 that is likely to precipitate carbon, such as kerosene, is used, the precipitation of carbon from the raw material 86 can be prevented.

The mixture 89 that has flowed out of the flow passage 5a of the second vaporizer 5 flows into the header tank 27, and flows inside the header tank 27 in the circumferential direction thereof. Then, the mixture 89 jets out through the multiple ejection holes 27c formed in the sidewall of the header tank 27 (i.e., formed in the cylindrical pipe 27a), and flows into the reforming-catalyst layer 21 from below.

Note that when the duct for cleaning 101 and the removable portion for cleaning 102 are provided, as in the case shown in FIG. 12, between the second vaporizer 5 and the reforming pipe 2 (reforming-catalyst layer 21), the mixture 89 that has flowed out of the flow passage 5a of the second vaporizer 5 flows through the duct for cleaning 101 and the removable portion for cleaning 102, and then flows into the header tank 27. Then, the mixture 89 flows inside the header tank 27 in the circumferential direction thereof, and jets out through the multiple ejection holes 105a formed in the top surface of the header tank 27 (i.e., formed in the upper-end plate 105). The mixture 89 then flows into the reforming-catalyst layer 21 from below. In any of the above-described cases, when the superheated steam of the mixture 89 is supplied to the cylindrically-shaped reforming-catalyst layer 21, the header tank 27 makes the superheated steam of the mixture 89 be uniformly dispersed in the circumferential direction of the reforming-catalyst layer 21.

The mixture 89 that has flowed into the reforming-catalyst layer 21 flows upwards through the reforming-catalyst layer 21. At this time, as has been described above, the heat of the heating gas 88 that is flowing both at the inner side of the reforming pipe 2 (heating-gas flow passage 35) and at the outer side thereof (heating-gas flow passage 25) is supplied to the reforming-catalyst layer 21. Accordingly, in the reforming-catalyst layer 21, a steam reforming reaction of the raw material 86 takes place so as to produce the reformed gas 87 containing hydrogen gas (hydrogen-rich gas). At this time, the temperature of the reforming catalyst located in the upper portion of the reforming-catalyst layer 21 is raised up to, for example, approximately 700° C., by the heat exchange with the heating gas 88. Thus produced is the reformed gas 87 with a hydrogen content of 50% or higher.

The reformed gas 87 produced in the reforming-catalyst layer 21 flows out of the reforming-catalyst layer 21 through the outlet 79. At this time, the temperature of the reformed gas 87 at the outlet 79 of the reforming-catalyst layer 21 becomes, for example, 750° C. Here, the temperature of the reformed gas at the outlet 79 of the reforming-catalyst layer 21 is measured by the first reformed-gas thermometer 75, and the temperature controller 80 controls the amount of the fuel 83 for burner to be supplied to the burner 1 so that the value of the reformed-gas temperature measured by the first reformed-gas thermometer 75 can be kept at a predetermined temperature (for example, at 750° C.).

The reformed gas 87 that has flowed out of the reforming-catalyst layer 21 turns around at the reformed-gas turning portion 17, flows downwards through the reformed-gas flow passage 18, and then flows into the high-temperature CO-shift catalyst layer 3. While the reformed gas 87 is flowing through the reformed-gas flow passage 18, the heat of the reformed gas 87 is transferred to the reforming-catalyst layer 21 (mixture 89) by way of the intermediate cylindrical pipe 13. Accordingly, by the time when the reformed gas 87 reaches a middle section of the reforming-catalyst layer 21 in the axial direction thereof, the temperature of the reformed gas 87 becomes, for example, approximately 550° C. Accordingly, the temperature of the reformed gas 87 that has flowed out of the reformed-gas flow passage 18 becomes, for example, approximately 550° C., and this reformed gas 87 flows into the high-temperature CO-shift catalyst layer 3.

In the high-temperature CO-shift catalyst layer 3, the reformed gas 87 flows downwards. At this time, the CO-shift reaction ($CO+H_2O \rightarrow CO_2+H_2$) of the reformed gas 87 takes place in the high-temperature CO-shift catalyst layer 3, so that the CO-concentration in the reformed gas 87 decreases, for example, from 13% down to 6%, approximately. This CO-shift reaction is an exothermic reaction, and the heat of this reaction is transferred to the reforming-catalyst layer 21 which is adjacent to the outer side of the high-temperature CO-shift catalyst layer 3 by way of the intermediate cylindrical pipe 13. Accordingly, the temperature of the reformed gas 87 flowing out of the high-temperature CO-shift catalyst layer 3 is, for example, approximately 550° C., and this reformed gas 87 flows into the reformed-gas flow passage 53 formed between the second vaporizer 5 and the cylindrical pipe 50.

The reformed gas 87 that has flowed into the reformed-gas flow passage 53 flows downwards through the reformed-gas flow passage 53, and then flows into the interstice between the cylindrical pipe 50 and the cylindrical pipe 46 through the circulation holes formed in the cylindrical pipe 50. While the reformed gas 87 is flowing through the reformed-gas flow passage 53, the reformed gas 87 is cooled by the heat exchange with the mixture 89 that is flowing through the flow passage 5a of the second vaporizer 5. The temperature of the reformed gas 87 is lowered down to, for example, approximately 250° C. To put it differently, as has been described above, the mixture 89 flowing through the flow passage 5a of the second vaporizer 5 absorbs the heat amount which is held by the reformed gas 87 and which is necessary for lowering the temperature of the reformed gas 87 down to a predetermined temperature (for example, from 550° C. down to 250° C.).

The reformed gas 87 of, for example, 250° C. that has flowed into the interstice between the cylindrical pipe 50 and the cylindrical pipe 46 flows into the low-temperature CO-shift catalyst layer 7 through the inlet 73 formed on the top thereof. At this time, the temperature of the reformed gas 87 at the inlet 73 of the low-temperature CO-shift catalyst layer 7 is measured by the second reformed-gas thermometer 76, and the temperature controller 80 controls the amount of the air 84 for burner to be supplied to the burner 1 so that the value of the reformed-gas temperature measured by the second reformed-gas thermometer 76 can be kept at a predetermined temperature (at, for example, 250° C.). What follows is the principle on which the reformed-gas temperature at the inlet 73 of the low-temperature CO-shift catalyst layer 7 can be controlled by controlling the amount of the air 84 for burner to be supplied to the burner 1.

(1) The temperature of the reformed gas 87 at the inlet 73 of the low-temperature CO-shift catalyst layer 7 is made to be lowered down to 250° C. by the heat exchange between the reformed gas 87 of approximately 550° C. that has passed through the high-temperature CO-shift catalyst layer 3 and the mixture 89 flowing through the flow passage 5a of the second vaporizer 5.

(2) Accordingly, if the amount of heat to be exchanged between the reformed gas 87 and the mixture 89 at this time, the temperature of the reformed gas 87 at the inlet 73 of the low-temperature CO-shift catalyst layer 7 can be controlled.

(3) Before exchanging heat with the above-mentioned reformed gas 87 that has passed through the high-temperature CO-shift catalyst layer 3, the mixture 89 exchange heat with the heating gas 88 flowing through the heating-gas flow passage 26 formed between the first vaporizer 4 and the second vaporizer 5.

(4) If, at this time, the amount of heat exchanged between the mixture 89 and the heating gas 88 decreases, the temperature of the mixture 89 flowing through the flow passage 5a of the second vaporizer 5 is lowered down. Accordingly, in this case, the above-described amount of heat exchanged between the reformed gas 87 and the mixture 89 increases, that is, the reformed gas 87 that has passed through the high-temperature CO-shift catalyst layer 3 is cooled well by this mixture 89 whose temperature is thus lowered down. Thereby, the temperature of the reformed gas 87 at the inlet 73 of the low-temperature CO-shift catalyst layer 7 is lowered down. Conversely, if the above-described amount of heat exchanged between the mixture 89 and the heating gas 88 increases, the temperature of the mixture 89 flowing through the flow passage 5a of the second vaporizer 5 rises. Accordingly, in this case, the above-described amount of heat exchanged between the reformed gas 87 and the mixture 89 decreases, that is, the reformed gas 87 that has passed through the high-temperature CO-shift catalyst layer 3 is not cooled well by the mixture 89 whose temperature is raised. Thereby, the temperature of the reformed gas 87 at the inlet 73 of the low-temperature CO-shift catalyst layer 7 rises.

(5) Accordingly, if the above-described amount of heat exchanged between the mixture 89 and the heating gas 88 can be controlled, the above-described amount of heat exchanged between the reformed gas 87 and the mixture 89 can be controlled, which in turn controls the temperature of the reformed gas 87 at the inlet 73 of the low-temperature CO-shift catalyst layer 7. Here, the above-described amount of heat exchanged between the mixture 89 and the heating gas 88 changes depending on the volume of the heating gas 88. Accordingly, by controlling the volume of the heating gas 88, that is, the amount of the air 84 for burner to be supplied to the burner 1 (the diluents-air amount), the above-described amount of heat exchanged between the mixture 89 and the heating gas 88 can be controlled, and thus the amount of heat exchanged between the reformed gas 87 and the mixture 89 can be controlled. As a consequence, the temperature of the reformed gas 87 at the inlet 73 of the low-temperature CO-shift catalyst layer 7 can be controlled.

Note that, at this time, by controlling the amount of the air 84 for burner to be supplied to the burner 1 (diluents-air amount), the mixture temperature at the flow-passage outlet 5a-1 of the second vaporizer 5 may be kept at a predetermined temperature (at, for example, 400° C.).

The reformed gas 87 of a predetermined temperature (for example, 250° C.) that has flowed into the low-temperature CO-shift catalyst layer 7 flows downwards through the low-temperature CO-shift catalyst layer 7. During this time, the CO-shift reaction ($CO+H_2O \rightarrow CO_2+H_2$) of the reformed gas 87 takes place in the low-temperature CO-shift catalyst layer 7, so that the CO-concentration in the reformed gas 87 decreases, for example, from 6% to 0.3%, approximately. This CO-shift reaction is also an exothermic reaction, and, as has been described above, the heat of this reaction is absorbed by the mixture 89 flowing through the flow passage 5a of the second vaporizer 5.

The low-temperature CO-shift catalyst layer 7 (cylindrical pipe 50) is surrounded by the second vaporizer 5, the temperature of which is, for example, approximately 150° C. Accordingly, while flowing though the low-temperature CO-shift catalyst layer 7, the reformed gas 87 is radiatively cooled by the second vaporizer 5 of 150° C., and thus the temperature of the reformed gas 87 is lowered down to approximately 150° C. To put it differently, as has been described above, at the position where the low-temperature CO-shift catalyst layer 7 is disposed, the mixture 89 flowing through the flow passage 5a of the second vaporizer 5 absorbs the heat amount which is held by the reformed gas 87 and which is necessary for lowering the temperature of the reformed gas 87 down to a predetermined temperature (for example, from 250° C. down to 150° C.). In addition, with this cooling effect, the CO-concentration in the reformed gas 87 is lowered down to the equilibrium CO-temperature at that temperature. Accordingly, the CO-concentration in the reformed gas 87 can be reduced to a larger extent than a case where the reformed gas 87 is assumed to flow through the low-temperature CO-shift catalyst layer 7 without being cooled down.

The reformed gas 87 that has flowed out of the low-temperature CO-shift catalyst layer 07 flows through the duct 69, and then flows into the CO-removing catalyst layer 8 from above. At this time, at the air mixing portion 99 located at a certain point of the duct 69, the air for CO selective oxidation 90 supplied from the air supplying apparatus for CO selective oxidation via the air supplying pipe 98 for CO selective oxidation is mixed with the reformed gas 87 flowing though the duct 69. Accordingly, the reformed gas 87 together with the air for CO selective oxidation 90 flows into the CO-removing catalyst layer 8, and flows downwards through the CO-removing catalyst layer 8. At this time, the CO-selective-oxidation reaction of the reformed gas 87 takes place in the CO-removing catalyst layer 8, so that the CO-concentration in the reformed gas 87 decreases, for example, from 0.3% down to 10 ppm or lower.

The CO-selective-oxidation reaction herein is also an exothermic reaction. As has been described above, the heat of the reaction is absorbed by the process water 85 flowing though the flow passage 4a of the first vaporizer 4. Here, the CO-removing catalyst layer 8 is disposed so as to surround the first vaporizer 4, and the process water 85 flowing through the flow passage 4a of the first vaporizer 4 has been vaporized, so that the temperature of the CO-removing catalyst layer 8 is constantly kept approximately at the vaporizing temperature of the process water 85 (for example, approximately at 120° C.). The temperature of the reformed gas 87 which has flowed out of the CO-removing catalyst layer 8 and which then flows into the reformed-gas supply pipe 74 is lowered down to, for example, approximately 80° C. by being cooled by the process water 85 flowing through the flow passage 4a of the first vaporizer 4. To put it differently, as has been described above, at the position where the CO-removing catalyst layer 8 is disposed, the process water 85 flowing through the flow passage 4a of the first vaporizer 4 absorbs the heat amount which is held by the reformed gas 87 and which is necessary for lowering the temperature of the reformed gas 87 down to a predetermined temperature (for example, from 150° C. down to 80° C.). Then, the reformed gas 87 having a low CO-concentration therein flows out of the CO-removing catalyst layer 8, and then is supplied, via the reformed-gas supply pipe 74, to the fuel cell as fuel to generate electric power.

Next, description will be given as to the heating operation for temperature rising that is performed when the reforming apparatus is started.

During the heating operation for temperature rising, for the purpose of producing the heating gas 88, the fuel 83 for burner supplied from the fuel supplying apparatus for burner and the air 84 for burner supplied from the air supplying apparatus for burner are burned by means of the burner 1, as in the case of the steady operation. Note that no mixture 89 (the raw material 86 plus the process water 85) is supplied during this temperature raising operation.

Then, as in the case of the steady operation, the heating gas 88 is made to flow upwards along the inner-circumferential surface of the inner cylindrical pipe 11 of the reforming pipe 2 (i.e., flow through the heating-gas flow passage 35). In addition, the heating gas 88 is made to turn around at the heating-gas turning portion 17, then to flow downwards through the heating-gas flow passage 25 located at the outer side of the reforming pipe 2, and then to flow downwards through the heating-gas flow passage 26 formed between the first vaporizer 4 and the second vaporizer 5. As a consequence, the heat of the heating gas 88 sequentially raises, by heating, the temperatures of the reforming pipe 2 and the reforming-catalyst layer 21, the temperatures of the high-temperature CO-shift catalyst layer 3, the first vaporizer 4, and the second vaporizer 5, and then the temperatures of the low-temperature CO-shift catalyst layer 7 and the CO-removing catalyst layer 8.

To be more specific, the temperatures of the reforming pipe 2 and the reforming-catalyst layer 21 are raised by being heated by the heating gas 88 while the heating gas 88 flows along the inner side and the outer side of the reforming pipe 2. Since the high-temperature CO-shift catalyst layer 3 is provided at the inner-circumferential side of the reforming-catalyst layer 21, the temperature of the high-temperature CO-shift catalyst layer 3 is raised by being heated indirectly by way of the reforming-catalyst layer 21. The temperatures of the first vaporizer 4 and the second vaporizer 5 are raised by being heated by the heating gas 88 while the heating gas 88 flows through the heating-gas flow passage 26 formed between the first vaporizer 4 and the second vaporizer 5. Since the low-temperature CO-shift catalyst layer 7 is provided at the inner side of the second vaporizer 5, the temperature of the low-temperature CO-shift catalyst layer 7 is raised by being heated indirectly by way of the second vaporizer 5. Since the CO-removing catalyst layer 8 is provided at the outer side of the first vaporizer 4, the temperature of the CO-removing catalyst layer 8 is raised by being heated indirectly by way of the first vaporizer 4.

Once the heating operation for temperature rising is finished, the mixture 89 (the raw material 86 plus the process water 85) starts to be supplied. Thus, the reformed gas 87 starts to be produced. Note that when to finish the heating operation for temperature rising can be determined, for example, in the following ways. The length of time for which the heating operation for temperature rising continues is measured first, and then whether the time thus measured exceeds a predetermined time length or not is determined. Alternatively, the temperature of any catalyst layer is measured first, and then whether the temperature thus measured reaches a predetermined temperature or not is determined.

Next, description will be given as to the steam purging that is carried out at the time of stopping the reforming apparatus. In FIG. 5, the flows of the heating gas 88 and $O_2$-less gas 107 at the time of steam purging are indicated by the arrowed dot-lines.

When production of the reformed gas 87 is ceased by stopping the supply of the process water 85 from the process water supply apparatus and the supply of the raw material 86 from the raw-material supply apparatus, steam remains in the catalyst layers 3, 7, 8, and 21 in the reforming apparatus. As the reforming apparatus in this state is cooled down, the steam that remains in the catalyst layers 3, 7, 8, and 21 is condensed. As a consequence, the catalysts in the catalyst layers 3, 7, 8, and 21 are degraded. To prevent such degradation, the steam that remains in each of the catalyst layers 3, 7, 8, and 21 is purged.

Specifically, after the production of the reformed gas 87 is ceased by stopping the supply of the mixture 89 (the process water 85 plus the raw material 86), the burner 1 is ignited again to produce the heating gas 88. Alternatively, even after the supply of the mixture 89 is stopped, the burner 1 is not extinguished but is caused to continue producing the heating gas. This heating gas 88 is then used as the gas to purge the steam. The heating gas 88, however, contains $O_2$ of 5% and moisture, as well.

Thus, the heating gas 88 that has flowed from the heating-gas flow passage 26 and then discharged supposedly to the exhaust pipe 39, as in the cases of the steady operation or of the heating operation for temperature rising, is taken into the duct 63 from the exhaust pipe 39 by driving the pump 60. Then, the moisture in the heating gas 88 is condensed and removed in the condenser 62. Note that, in the condenser 62, the moisture in the heating gas 88 may be condensed, for example, by making a fan send air. Alternatively, the moisture in the heating gas 88 may be condensed by utilizing the process water 85, the air 84 for burner, or the like.

The heating gas 88 from which the moisture has been removed flows into the heating-gas induction pipe 59, and then flows upwards through the heating-gas induction pipe 59. Thus, the heating gas 88 is led to the upper-end side of the $O_2$-adsorption catalyst layer 6. The heating gas 88 that has flowed out of the heating-gas induction pipe 59 turns around at the heating-gas turning portion 108, and then flows downwards through the $O_2$-adsorption catalyst layer 6. During this time, in the $O_2$-adsorption catalyst layer 6, $O_2$ in the heating gas 88 is adsorbed, so that the $O_2$-less gas 107 is produced.

Part of the $O_2$-less gas 107 that has flowed out of the $O_2$-adsorption catalyst layer 6 flows in the opposite direction to the direction in which the reformed gas 87 flows, thus flowing out to the outside of the cylindrical pipe 50 (i.e., flows into the reformed-gas flow passage 53) through the circulation holes 54 formed in the cylindrical pipe 50. Then, the part of the $O_2$-less gas 107 flows through the high-temperature CO-shift catalyst layer 3, and then through the reforming-catalyst layer 21. The part of the $O_2$-less gas 107 flows through the flow passage 5a of the second vaporizer 5, the duct 29, and the raw-material supply pipe 30, and then is discharged by way of an unillustrated $O_2$-less-gas exhaust pipe. As a consequence, by the $O_2$-less gas 107, the steam remaining in the high-temperature CO-shift catalyst layer 3 and in the reforming-catalyst layer 21 is purged from the high-temperature CO-shift catalyst layer 3 and from the reforming-catalyst layer 21, respectively. Note that the $O_2$-less gas 107 and the steam are discharged through the flow passage 5a of the second vaporizer 5 in the above-described case, but this is not the only way. Instead, the discharging can be done at any position after the $O_2$-less gas 107 and the steam pass through the reforming-catalyst layer 21. For example, as indicated by the dashed-dotted lines in FIG. 12, an $O_2$-less gas exhaust pipe 109 is connected to the duct for cleaning 101. When the steam is purged, the $O_2$-less gas 107 and the steam may be discharged by way of the $O_2$-less gas exhaust pipe 109 by opening a valve 110 provided in the $O_2$-less gas exhaust pipe 109.

In addition, the other part of the $O_2$-less gas 107 that has flowed out of the $O_2$-adsorption catalyst layer 6 flows, as in the case of the flow of the reformed gas 87, through the low-temperature CO-shift catalyst layer 7 and then through the CO-removing catalyst layer 8. After that, the other part of the $O_2$-less gas 107 flows through the reformed-gas supply pipe 74, and then is discharged by way of an unillustrated $O_2$-less gas exhaust pipe. As a consequence, by the $O_2$-less gas 107, the steam remaining in the low-temperature CO-shift catalyst layer 7 and the steam remaining in the CO-removing catalyst layer 8 are purged from the low-temperature CO-shift catalyst layer 7 and from the CO-removing catalyst layer 8, respectively.

Next, description will be given as to the cleaning procedure for the first vaporizer 4 and the second vaporizer 5 in a case where the configuration shown in FIG. 12 is employed in this reforming apparatus.

Solid components, such as silica, are contained in the process water 85. Accordingly, when the reforming apparatus is operated for a long time, the solid components may precipitate in the flow passage 4a of the first vaporizer 4 and in the flow passage 5a of the second vaporizer 5, and may possibly clog the flow passages 4a and 5a. To prevent such inconvenience, it is necessary for the reforming apparatus to employ the configuration as shown in FIG. 12 so that the flow passage 4a of the first vaporizer 4 and the flow passage 5a of the second vaporizer 5 can be cleaned on a regular basis. The cleaning is carried out according to the following procedures.

To begin with, the reforming apparatus is stopped. Then, as indicated by the single dashed-dotted lines in FIG. 12, the removable portion for cleaning 102 is detached from the duct for cleaning 101 so that the fill port 103 is exposed. The chemical liquid 111 to remove the solid components is poured in from an unillustrated chemical-liquid supply apparatus through the fill port 103. As a consequence, the chemical liquid 111 flows into the flow passage 5a of the second vaporizer 5 through the outlet 5a-1, then flows, in the opposite direction to the direction in which the mixture 89 flows, through the flow passage 5a of the second vaporizer 5 and the flow passage 4a of the first vaporizer 4. After that, the chemical liquid 111 flows through the process-water supply pipe 28, and then is discharged by way of an unillustrated chemical-liquid discharge pipe.

As a consequence, the solid components that precipitate in the flow passage 4a of the first vaporizer 4 and in the flow passage 5a of the second vaporizer 5 are removed by the chemical liquid 111, and are discharged out, together with the chemical liquid 111, from the flow passages 4a and 5a. Note that a chemical-liquid circulation line may be formed by connecting the chemical-liquid discharge pipe to the duct for cleaning 101, and the chemical liquid 111 may be circulated. In this way, the chemical liquid 111 can be discharged only after the chemical liquid 111 flows through the flow passage 4a of the first vaporizer 4 and through the flow passage 5a of the second vaporizer 5 several times.

<Advantageous Effects>

The reforming apparatus of Embodiment 2 has the following configuration. The reforming apparatus includes: the first vaporizer 4 that is cylindrically shaped and includes the flow passage 4a through which the process water 85 flows; the second vaporizer 5 that is cylindrically shaped and includes the flow passage 5a through which the mixture 89 flows; the duct 29 that connects the outlet 4a-2 of the flow passage 4a to the inlet 5a-2 of the flow passage 5a; and the raw-material mixing portion 31 formed at a certain point of the duct 29. The first vaporizer 4 and the second vaporizer 5 are concentrically disposed so that the first vaporizer 4 is located at the outer side and the second vaporizer 5 is located at the inner side. The cylindrical gap left between the first vaporizer 4 and the second vaporizer 5 serves as the heating-gas flow passage 26. In the first vaporizer 4, the process water flowing through the flow passage 4a is turned into steam (wet steam) by being heated by the heating gas 88 that is flowing through the heating-gas flow passage 26 after the heating gas 88 heats the reforming-catalyst layer 21. In the raw-material mixing portion 31, the mixture 89 is produced by mixing the raw material 86 with the process water (steam) 85 flowing through the duct 29 after flowing out of the flow passage 4a. In the second vaporizer 5, the mixture 89 which has flowed into the flow passage 5a from the duct 29 and which is flowing through the flow passage 5a is turned into superheated steam (dry steam) by being heated by the heating gas 88 flowing through the heating-gas flow passage 26 after the heating gas 88 heats the reforming-catalyst layer 21. The superheated steam of the mixture 89 flows through the reforming-catalyst layer 21. Accordingly, the process water 85 that is flowing through the flow passage 4a of the first vaporizer 4 and the mixture 89 that is flowing through the flow passage 5a of the second vaporizer 5 can be heated efficiently by the heating gas 88 that is flowing through the heating-gas flow passage 26 formed between the first vaporizer 4 and the second vaporizer 5.

In addition, by the time the process water 85 flows out of the flow passage 4a of the first vaporizer 4, the process water 85 is vaporized by being heated by the heating gas 88. Accordingly, the speed of the process water 85 flowing through the duct 29 becomes faster (for example, 50 m/s, approximately) than the case without the vaporization. As a consequence, the raw material 86 that is mixed with the process water (steam) 85 in the raw-material mixing portion 31 located at the certain point of the duct 29 can be agitated well by the process water (steam) 85 of such a high flowing speed, so that the raw material 86 can be dispersed uniformly in the process water (steam) 85. For this reason, the process water (steam) 85 and the raw material 86 can be mixed together uniformly. Note that, in this case, even when the raw material 86 is liquid fuel, such as kerosene, or even when the raw material 86 is supplied in a small quantity, the process water (steam) 85 and the raw material 86 can be mixed together uniformly.

In addition, in the second vaporizer 5, the mixture 89 formed by mixing the raw material 86 and the process water (steam) 85 together is heated by the heating gas 88 so as to produce the superheated steam. Accordingly, the raw material 86 in the mixture 89 is vaporized together with the process water 85 in the mixture 89. As a consequence, even when the raw material 86 that is likely to precipitate carbon, such as kerosene, is used, the precipitation of carbon from the raw material 86 can be prevented. When the raw material is vaporized in the raw fuel vaporizer as in the conventional cases, the complicated controlling of the temperature rise is necessary, but such complicated controlling of the temperature rise is no longer necessary.

Note that, when the raw-material mixing portion 31 has a double-nozzle structure, the raw material 86 that has been turned into a spray is uniformly mixed with the process water (steam) 85 in the raw-material mixing portion 31. As a consequence, the precipitation of carbon from the raw material 86 can be prevented with more certainty, and thus the degradation of the reforming catalyst can be prevented with more certainty.

In addition, the reforming apparatus of Embodiment 2 has the following characteristic features. The cylindrical low-temperature CO-shift catalyst layer 7 is provided between the cylindrical pipe 50 that is disposed inside the second vaporizer 5 and the cylindrical pipe 46 that is disposed inside the cylindrical pipe 50. The cylindrical gap left between the cylindrical pipe 50 and the second vaporizer 5 serves as the reformed-gas flow passage 53. While the reformed gas 87 that has flowed out of the reforming-catalyst layer 21 flows through the reformed-gas flow passage 53, the temperature of the reformed gas 87 is lowered by the heat exchange with the mixture 89 flowing through the flow passage 5a of the second vaporizer 5. After that, the reformed gas 87 flows into the interstice between the cylindrical pipe 50 and the cylindrical pipe 46 through the circulation holes 54 formed in the cylindrical pipe 50, and flows through the low-temperature CO-shift catalyst layer 7. The mixture 89 flowing through the flow passage 5a of the second vaporizer 5 at this time absorbs the heat produced by the CO-shift reaction of the reformed gas 87 that takes place in the low-temperature CO-shift catalyst layer 7, and cools the reformed gas 87. To put it differently, the low-temperature CO-shift catalyst layer 7 is disposed at the inner side of the second vaporizer 5. The reformed gas 87 that has flowed out of the reforming-catalyst layer 21 flows through the low-temperature CO-shift catalyst layer 7. The mixture 89 flowing through the flow passage 5a of the second vaporizer 5 at this time absorbs the heat produced by the CO-shift reaction of the reformed gas 87 that takes place in the low-temperature CO-shift catalyst layer 7, and cools the reformed gas 87. In this configuration, the second vaporizer 5 surrounds the low-temperature CO-shift catalyst layer 7. While the reforming apparatus is in the steady operation, the mixture 89 flows through the flow passage 5a of the second vaporizer 5. Accordingly, the temperature of the low-temperature CO-shift catalyst layer 7 is not raised by the contact with the heating gas 88 flowing through the heating-gas flow passage 26 located at the outer side of the second vaporizer 5. In addition, the mixture 89 flowing through the flow passage 5a of the second vaporizer 5 can certainly absorb the heat produced by the CO-shift reaction that takes place in the low-temperature CO-shift catalyst layer 7, and thereby can certainly cool the reformed gas 87. Accordingly, unlike the conventional cases, it is possible to prevent an increase in the CO-concentration in the reformed gas 87 flowing out of the low-temperature CO-shift catalyst layer 7 that is caused by insufficient cooling of the reformed gas 87. For this reason, even when the reformed gas 87 that has flowed out of the low-temperature CO-shift catalyst layer 7 further flows through the CO-removing catalyst layer 8, the amount of the air for CO selective oxidation 90 supplied to the CO-removing catalyst layer 8 can be reduced, so that the reforming efficiency can be improved. In addition, the use of the methanation-type CO-removing catalyst whose temperature is difficult to control is no longer necessary.

In addition, the reforming apparatus of Embodiment 2 has the following characteristic features. The first vaporizer 4 and the second vaporizer 5 are disposed with the inlet 4a-1 of the flow passage 4a and the inlet 5a-2 of the flow passage 5a located on the lower sides of their respective passages and with the outlet 4a-2 of the flow passage 4a and the outlet 5a-1 of the flow passage 5a located on the upper sides of their respective passages. In the first vaporizer 4, the process water 85 flows upwards through the flow passage 4a while, in the second vaporizer 5, the mixture 89 flows upwards through the flow passage 5a. This structure allows the heating gas 88 that flows downwards through the heating-gas flow passage 26 formed between the first vaporizer 4 and the second vaporizer 5 to flow in the opposite direction both to the flowing direction of the process water 85 that flows through the flow passage 4a of the first vaporizer 4 and to the flowing direction of the mixture 89 that flows through the flow passage 5a of the second vaporizer 5. For this reason, the heat exchange between the heating gas 88 and the process water 85 as well as between the heating gas 88 and the mixture 89 can be carried out efficiently.

In addition, the process water 85 that flows through the flow passage 4a of the first vaporizer 4 flows in the opposite direction to the flowing direction of the reformed gas 87 that flows through the CO-removing catalyst layer 8 while the mixture 89 that flows through the flow passage 5a of the second vaporizer 5 flows in the opposite direction to the flowing direction of the reformed gas 87 that flows through the low-temperature CO-shift catalyst layer 7. Accordingly, the heat exchange therebetween can be carried out efficiently.

In addition, the reforming apparatus of Embodiment 2 has the following characteristic features. The reforming pipe 2 in which the reforming-catalyst layer 21 is installed is disposed above the first vaporizer 4 and the second vaporizer 5. While the superheated steam of the mixture 89 that has flowed out of the second vaporizer 5 flows into the reforming-catalyst layer 21 from the lower end thereof, then flows upwards through the reforming-catalyst layer 21, the superheated steam of the mixture 89 is turned into the reformed gas 87 through a steam reforming process. The reformed gas 87 flows out of the upper end of the reforming-catalyst layer 21, flows downwards, flows into the low-temperature CO-shift catalyst layer 7 from the upper end thereof, and then flows downwards therethrough. Besides, the burner 1 is disposed at the upper-end side of the reforming pipe 2 so as to face downwards. This structure allows the reforming pipe 2, the first vaporizer 4, the second vaporizer 5, and the low-temperature CO-shift catalyst layer 7 to be provided in a compact and reasonable arrangement that considers the flows of the mixture 89 and the reformed gas 87 (i.e., the heat exchange between the mixture 89 and the reformed gas 87). In addition, when some troubles occurs in the burner 1, the maintenance work can be done by removing only the burner 1, without turning the reforming apparatus upside down, unlike the conventional cases. Besides, in comparison to the lengthy burners employed in the conventional cases, the burner 1 of Embodiment 2 can be used easily since it can be very short. The length of the burner 1 may be, for example, 400 mm. Thus, the adjustment work, the exchanging work and the like for the burner 1 can be done on site with only human power.

In addition, the reforming apparatus of Embodiment 2 has the following characteristic features. The CO-removing catalyst layer 8 is cylindrically disposed so as to surround the first vaporizer 4. The reformed gas 87 that has flowed out of the low-temperature CO-shift catalyst layer 7 flows through the CO-removing catalyst layer 8. The process water 85 that is flowing through the flow passage 4a of the first vaporizer 4 at this time absorbs the heat produced by the CO-selective-oxidation reaction of the reformed gas 87 taking place in the CO-removing catalyst layer 8, and thus cools the reformed gas 87 down. Besides, the first vaporizer 4 exists between the heating-gas flow passage 26 and the CO-removing catalyst layer 8. While the reforming apparatus is in the steady operation, the process water 85 flows through the flow passage 4a of the first vaporizer 4. Accordingly, the CO-removing catalyst layer 8 is not in contact with the heating gas 88 that flows through the heating-gas flow passage 26 located at the inner side of the first vaporizer 4, so that no temperature rise is provoked by such a contact. In addition, the process water 85 flowing through the flow passage 4a of the first vaporizer 4 can certainly absorb the heat produced by the CO-selective-oxidation reaction that takes place in the CO-removing catalyst layer 8, and thus can certainly cool the reformed gas 87 down. As a consequence, the CO-removing catalyst of the CO-removing catalyst layer 8 that has been cooled down approximately to the vaporizing temperature of the process water 85 (for example, down to 120° C.) has a high capability of removing CO, so that the employment of a methanation-type CO-removing catalyst whose temperature is difficult to control is not necessary.

In addition, the reforming apparatus of Embodiment 2 has the following characteristic features. The reforming apparatus includes the reforming-portion cylindrical pipe 10 that is disposed so as to surround the reforming pipe 2. The reforming pipe 2 has a triple-pipe structure including the inner cylindrical pipe 11 located at the innermost side, the outer cylindrical pipe 12 located at the outermost side, and the intermediate cylindrical pipe 13 located between the inner cylindrical pipe 11 and the outer cylindrical pipe 12. All of these three pipes 11, 12, and 13 are concentrically disposed, so as to surround the burner 1. The lower-end side of the inner cylindrical pipe 11 is closed by the circular-shell plate 14 while the upper-end side of the interstice between the inner cylindrical pipe 11 and the outer cylindrical pipe 12 is closed by the upper-end plate 16. The gap left between the upper-end plate 16 and the upper end of the intermediate cylindrical pipe 13 serves as the reformed-gas turning portion 17. The cylindrical gap left between the intermediate cylindrical pipe 13 and the inner cylindrical pipe 11 serves as the reformed-gas flow passage 18. The reforming-catalyst layer 21 is cylindrically formed between the intermediate cylindrical pipe 13 and the outer cylindrical pipe 12. The upper-end side of the reforming-portion cylindrical pipe 10 is closed by the upper-end plate 23. The gap left between the upper-end plate 23 and the upper-end plate 16 serves as the heating-gas turning portion 24. The cylindrical gap left between the reforming-portion cylindrical pipe 10 and the outer cylindrical pipe 12 serves as the heating-gas flow passage 25. The heating gas 88 discharged downwards from the burner 1 flows upwards along the inner circumferential surface of the inner cylindrical pipe 11, and turns around at the heating-gas turning portion 24. The heating gas 88, then, flows downwards through the heating-gas flow passage 25. While flowing downwards through the heating-gas flow passage 25, the heating gas 88 heats the reforming-catalyst layer 21, and then flows into the heating-gas flow passage 26 formed between the first vaporizer 4 and the second vaporizer 5. Meanwhile, while the superheated steam of the mixture 89 that has flowed out of the flow passage 5a of the second vaporizer 5 flows upwards through the reforming-catalyst layer 21, the superheated steam of the mixture 89 turns into the reformed gas 87 through a steam reforming process. This reformed gas 87 flows out of the upper end of the reforming-catalyst layer 21, turns around at the reformed-gas turning portion 17, and then flows downwards through the reformed-gas flow passage 18. Accordingly, the heating gas 88 can efficiently heat the reforming-catalyst layer 21 both from the inner side and from the outer side of the cylindrical reforming pipe 2 (reforming-catalyst layer 21). In addition, the reforming pipe 2 of Embodiment 2 is of a single-pipe type, which is different from the conventionally-employed multi-tubular type. Accordingly, the duct to put the multiple reforming pipes, a header tank, and the like together is not necessary. As a consequence, the manufacturing cost can be reduced.

In addition, in the reforming apparatus of Embodiment 2, the reformed gas 87 that has flowed out of the reforming-catalyst layer 21 flows through the high-temperature CO-shift catalyst layer 3, and then flows into the reformed-gas flow passage 53. To put it differently, besides the low-temperature CO-shift catalyst layer 7, the high-temperature CO-shift catalyst layer 3 is provided as another CO-shift catalyst layer. The high-temperature CO-shift catalyst has a high operation temperature (for example, for example, from 550° C. to 400° C.) and is heat resistant. In addition, because of the high operation temperature, the high-temperature CO-shift catalyst has a high reaction rate. Accordingly, the amount of the high-temperature CO-shift catalyst needed to remove CO is smaller than the low-temperature CO-shift catalyst 7. As a consequence, the CO-concentration in the reformed gas 87 having passed through the high-temperature CO-shift catalyst layer 3 is lower than, for example, the CO-concentration in the conventional reformed gas of 650° C. level. For this reason, even when the reformed gas 87 flows into the low-temperature CO-shift catalyst layer 7, the temperature of the low-temperature CO-shift catalyst is raised to a lesser extent by the heat produced by the CO-shift reaction. As a consequence, the low-temperature CO-shift catalyst can have a longer service life. In addition, when the temperature of the low-temperature CO-shift catalyst is not raised, the temperature at the outlet of the low-temperature CO-shift catalyst layer 7 is also lowered down. Accordingly, for the reason related to the equilibrium reaction, the CO-concentration in the reformed gas 87 that has flowed out of the low-temperature CO-shift catalyst layer 7 is also lowered down. As a consequence, the load on the CO-removing catalyst can be reduced.

In addition, in the reforming apparatus of Embodiment 2, each of the flow passage 4a and the flow passage 5a is formed into a spiral shape. Accordingly, the process water 85 flows spirally in the flow passage 4a while the mixture 89 flows spirally in the flow passage 5a. As a consequence, the heat exchange between the process water 85 and the heating gas 88 in the first vaporizer 4 as well as the heat exchange between the mixture 89 and the heating gas 88 in the second vaporizer 5 can be carried out with certainty. If the flow passage 5a is a simple cylindrically-shaped flow passage, the velocity of the mixture 89 becomes slower. Accordingly, the process water (steam) 85 and the raw material 86 in the mixture 89 are separated from each other, so that the proportion between the process water (steam) 85 and the raw material 86 (S/C) may possibly deviate from a planned value, and carbon may possibly precipitate from the raw material 86, which results in a shorter service life of the reforming catalyst layer 21. In contrast, the use of the spiral flow passage 5a makes the velocity of the mixture 89 higher than the case of the above-described simple cylindrical flow passage or the like. Accordingly, the separation of the process water (steam) 85 from the raw material 86 in the mixture 89 can be prevented.

In addition, in the reforming apparatus of Embodiment 2, the first vaporizer 4 has a double-pipe structure formed by fitting the cylindrical pipe 4B onto the outer-circumferential surface side of the wavy pipe 4A having spirally protruding and recessed portions formed in the pipe surface thereof. The spiral gap formed between the wavy pipe 4A and the cylindrical pipe 4B serves as the flow passage 4a. The second vaporizer 5 also has a double-pipe structure formed by fitting the cylindrical pipe 5B onto the outer-circumferential surface side of the wavy pipe 5A having spirally protruding and recessed portions formed in the pipe surface thereof. The spiral gap formed between the wavy pipe 5A and the cylindrical pipe 5B serves as the flow passage 5a. Accordingly, the process water 85 and the heating gas 88 are in surface-to-surface contact with each other with the wavy pipe 4A of the first vaporizer 4 located in between. The mixture 89 and the heating gas 88 are in surface-to-surface contact with the cylindrical pipe 3B of the second vaporizer 5 located in between. Moreover, the protruding and recessed portions of the wavy pipe 4A of the first vaporizer 4 makes the flow of the heating gas 88 turbulent. As a consequence, the heat exchange between the process water 85 and the heating gas 88 as well as between the mixture 89 and the heating gas 88 can be carried out efficiently.

In addition, suppose a case where the reforming apparatus of Embodiment 2 employs the configuration shown in FIG. 12, that is, a case where the following configuration is employed. The reforming apparatus includes: the duct for cleaning 101 that connects the outlet 5a-1 of the flow passage 5a of the second vaporizer 5 to the inlet 106 of the reforming-catalyst layer 21; the removable portion for cleaning 102 that is detachably attached to a certain point of the duct for cleaning 101. When the removable portion for cleaning 102 is removed and then the chemical liquid 111 is poured in through the fill port 103 of the duct for cleaning 101, the chemical liquid 111 flows through the flow passage 5a of the second vaporizer 5 and then through the flow passage 4a of the first vaporizer 4. In this configuration, even when long-time operation of the reforming apparatus makes the solid components, such as silica, contained in the process water 85 precipitate in the flow passage 4a and the flow passage 5a, the solid component can be removed by removing the removable portion for cleaning 102, pouring the chemical liquid 111 in through the fill port 103 of the duct for cleaning 101, and then making the chemical liquid 111 flow sequentially through the flow passage 5a and the flow passage 4a, while the reforming apparatus is not in operation. As a consequence, the solid components can be prevented from clogging the flow passage 4a and the flow passage 5a.

In addition, the reforming apparatus of Embodiment 2 is provided with the heat exchanger 40 to carry out the heat exchange between the heating gas 88 that has flowed out of the heating-gas flow passage 26 and the air 84 for burner to be supplied to the burner 1. Accordingly, the heat of the heating gas 88 discharged from the heating-gas flow passage 26 is not wasted, but is collected and utilized effectively for the purpose of heating the air 84 for burner. As a consequence, a further improvement of the efficiency can be expected.

In addition, suppose a case where the reforming apparatus of Embodiment 2 is provided with the heat exchanger 78 as shown in FIG. 10 to carry out the heat exchange between the heating gas 88 that has flowed out of the heating-gas flow passage 26 and the process water 85 that is to flow into the flow passage 4a of the first vaporizer 4. In this case, the heat of the heating gas 88 discharged from the heating-gas flow passage 26 is not wasted, but is collected and utilized effectively for the purpose of heating the process water 85. As a consequence, a further improvement of the efficiency can be expected.

In addition, in the reforming apparatus of Embodiment 2, when the reforming apparatus is stopped: the heating gas 88 is sucked by the pump 60; the moisture is removed from the heating gas 88 by the condenser 62; the heating gas 88 is introduced to a first-end side (upper-end side) of the $O_2$-adsorption catalyst layer 6 by way of the heating-gas induction pipe 59; and, after that, the heating gas 88 turns around and flows through the $O_2$-adsorption catalyst layer 6. Thus, $O_2$ is removed from the heating gas 88 and thereby the $O_2$-less gas is produced. Part of this $O_2$-less gas flows through the low-temperature CO-shift catalyst layer 7, and then through the CO-removing catalyst layer 8, and thereby discharges the steam that remains in the low-temperature CO-shift catalyst layer 7 and in the CO-removing catalyst layer 8. The rest of the $O_2$-less gas flows out through the circulation holes 54 formed in the cylindrical pipe 50, and flows through the high-temperature CO-shift catalyst layer 3 and then through the reforming-catalyst layer 21, thereby discharging the steam that remains in the high-temperature CO-shift catalyst layer 3 and in the reforming-catalyst layer 21. Accordingly, while the reforming apparatus is not in operation, the $O_2$-less gas can be used to discharge the steam that remains in the reforming-catalyst layer 21, in the high-temperature CO-shift catalyst layer 3, in the low-temperature CO-shift catalyst layer 7, and in the CO-removing catalyst layer 8, thereby preventing the degradation of the catalysts in the catalyst layers 21, 3, 7, and 8 provoked by the condensation of the steam.

In addition, in the reforming apparatus of Embodiment 2, the cylindrical high-temperature CO-shift catalyst layer 3 is provided below the circular-shell plate 14 and between the intermediate cylindrical pipe 13 and the cylindrical pipe 46 disposed inside the intermediate cylindrical pipe 13. Accordingly, while the reforming apparatus is in the heating operation for temperature rising to raise, by heating, the temperature of the reforming pipe 2 (reforming-catalyst layer 21) by the heating gas, the temperature of the high-temperature CO-shift catalyst layer 3 disposed inside the intermediate cylindrical pipe 13 can be raised by being heated by way of the reforming pipe 2 (reforming-catalyst layer 21).

In addition, the reforming apparatus of Embodiment 2 has the following characteristic features. The cylindrically-shaped header tank 27 is provided at a portion location between the second vaporizer 5 and the reforming-catalyst layer 21. The multiple ejection holes 27c or 105a are formed in the side surface (cylindrical pipe 27a) or in the top surface (upper-end plate 105) of the header tank 27 in the circumferential direction of the header tank. The superheated steam of the mixture 89 that has flowed out of the second flow passage 5a of the second vaporizer 5 flows into the header tank 27, jets out through the ejection holes 27c or 105a, and flows into the reforming-catalyst layer 21. Accordingly, when the superheated steam of the mixture 89 is supplied to the cylindrically-shaped reforming-catalyst layer 21, the steam of the mixture 89 can be dispersed uniformly in the circumferential direction of the reforming-catalyst layer 21 by the header tank 27. As a consequence, an improvement in the reforming efficiency can be expected.

In addition, in the reforming apparatus of Embodiment 2, the cylindrically-shaped thermally-insulating material 9 is disposed so as to surround the reforming-portion cylindrical pipe 10. Accordingly, the heat radiated from the surface of the reforming-portion cylindrical pipe 10 can be reduced by the thermally-insulating material 9. Incidentally, the thermally-insulating material 9 may be obtained by using an inexpensive material made of, for example, ceramic fiber in an appropriate thickness (for example, 70-mm thickness).

In addition, in the reforming apparatus of Embodiment 2, the tube 77 is wrapped spirally around the outer-circumferential surface of the thermally-insulating material 9. The heat radiated from the inner side of the thermally-insulating material 9 by way of the thermally-insulating material 9 can be absorbed by the process water 85 flowing through the tube 77 before flowing into the flow passage 4a. Accordingly, the heat of the heating gas 88 radiated by way of the thermally-insulating material 9 is not wasted, but can be collected and utilized effectively to heat the process water 85. As a consequence, a further improvement in the efficiency can be expected.

In addition, according to the method of operating the reforming apparatus of Embodiment 2, during the heating operation for temperature rising performed for starting the reforming apparatus, without supplying the mixture 89, the heating gas 88 of the burner 1 flows upwards along the inner-circumferential surface of the inner cylindrical pipe 11 of the reforming pipe 2. Then, the heating gas 88 turns around at the heating-gas turning portion 24, and then flows downwards through the heating-gas flow passage 25 located at the outer side of the reforming pipe 2. After that, the heating gas 88 flows downwards through the heating-gas flow passage 26 formed between the first vaporizer 4 and the second vaporizer 5. Accordingly, the heating gas 88 sequentially raises, by heating, the temperatures of the reforming pipe 2 and the reforming-catalyst layer 21, the temperature of the high-temperature CO-shift catalyst layer 3, the temperatures of the first vaporizer 4 and the second vaporizer 5, and then the temperatures of the low-temperature CO-shift catalyst layer 7 and the CO-removing catalyst layer 8. As a consequence, the temperature of every portion of the reforming apparatus can be efficiently raised by being heated by the heating gas 88.

In addition, according to the method of operating the reforming apparatus of Embodiment 2, while the reforming apparatus is in the steady operation, the temperature of the reformed-gas at the outlet 79 of the reforming-catalyst layer 21 is measured. The amount of fuel to be supplied to the burner 1 is controlled so that the measured value of the reformed-gas temperature can be kept at a predetermined temperature. In addition, the temperature of the reformed-gas at the inlet 73 of the low-temperature CO-shift catalyst layer 7 is measured. The amount of air to be supplied to the burner 1 is controlled so that the measured value of the reformed-gas temperature can be kept at a predetermined temperature. Accordingly, the reformed-gas temperature at the outlet 79 of the reforming-catalyst layer 21 and the reformed-gas temperature at the inlet 73 of the low-temperature CO-shift catalyst layer 7 can be certainly kept at their respective predetermined temperatures.

In addition, according to the method of operating the reforming apparatus of Embodiment 2, while the reforming apparatus is in the steady operation, the temperature of the reformed-gas at the outlet 79 of the reforming-catalyst layer 21 is measured. The amount of fuel to be supplied to the burner 1 is controlled so that the measured value of the reformed-gas can be kept at a predetermined temperature. In addition, the temperature of the mixture at the outlet 5a-1 of the flow passage 5a of the second vaporizer 5 is measured. The amount of air to be supplied to the burner 1 is controlled so that the measured value of the mixture temperature can be kept at a predetermined temperature. With this configuration, the reformed-gas temperature at the outlet 79 of the reforming-catalyst layer 21 and the mixture temperature at the outlet 5a-1 of the flow passage 5a of the second vaporizer 5 can be kept at their respective predetermined temperatures with certainty.

Note that the control of the reformed-gas temperature or of the mixture temperature described above can be employed in Embodiment 1 as well.

Incidentally, as described above, the reforming apparatus of Embodiment 2 exhibits excellent performance, but, to achieve a further improvement in performance, it is preferable to improve the following points.

(1) Specifically, in the reforming apparatus of Embodiment 2, as shown in FIG. 5, the second vaporizer 5 is provided at the outer-circumferential side of the low-temperature CO-shift catalyst layer 7 as the sole means for cooling the low-temperature CO-shift catalyst layer 7 down. Accordingly, during the steady operation of the reforming apparatus, the cooling of the low-temperature CO-shift catalyst layer 7 (i.e., the absorption or the removal of the heat produced by the CO-shift reaction and the heat amount held by the reformed gas 87 flowing into the low-temperature CO-shift catalyst layer 7) is carried out mainly through the radiant heat transfer from the outer-circumferential surface of the low-temperature CO-shift catalyst layer 7 (cylindrical pipe 50) to the inner-circumferential surface of the second vaporizer 5 (wavy pipe 5A). Accordingly, when the amount of reformed-gas production is large, the cooling of the low-temperature CO-shift catalyst layer 7 may possibly be insufficient. When the cooling of the low-temperature CO-shift catalyst layer 7 is insufficient, the temperature of the low-temperature CO-shift catalyst layer 7 becomes high, so that the CO-concentration in the reformed gas 87 flowing out of the low-temperature CO-shift catalyst layer 7 increases. As a consequence, the load on the CO-removing catalyst layer 8 located at the downstream side of the low-temperature CO-shift catalyst layer 7 becomes large, so that the reforming efficiency may possibly be lowered down. In other words, when the CO-concentration in the reformed gas 87 flowing into the CO-removing catalyst layer 8 becomes higher, the supply of the air for CO selective oxidation 90 needs to be increased. As a consequence, the consumption of hydrogen in the reformed gas 87 is also increased, so that the reforming efficiency is lowered down. (2) At the same time, the cooling of the low-temperature CO-shift catalyst layer 7 is carried out solely by the cooling from the outer-circumferential surface of the low-temperature CO-shift catalyst layer 7 (cylindrical pipe 50). Accordingly, it is difficult to cool the inner-side portion of the low-temperature CO-shift catalyst layer 7 down, and the temperature of this portion thus tends to become high. As a consequence, the CO-concentration in the reformed gas 87 passing through this inner-side portion tends to become high. (3) In addition, in the heating operation for temperature rising for starting the reforming apparatus, the heating gas 88 flowing through the heating-gas flow passage 26 heats the second vaporizer 5. The temperature of the low-temperature CO-shift catalyst layer 7 is raised by the radiant heat transfer from the second vaporizer 5. Accordingly, the temperature rise of the low-temperature CO-shift catalyst layer 7 becomes slower. When the supply of the process water 85 is started and the steam of the process water 85 flows into the low-temperature CO-shift catalyst layer 7 while the temperature of the low-temperature CO-shift catalyst layer 7 has been not raised sufficiently yet and, the steam may be condensed in the lower-temperature portion of the low-temperature CO-shift catalyst layer 7, so that the catalyst of the low-temperature CO-shift catalyst layer 7 may possibly be degraded.

Accordingly, for the purpose of achieving further improvement in performance, these points are improved in the reforming apparatus of Embodiment 3 of the present invention, which will be described next.

Embodiment 3

Figure 13:
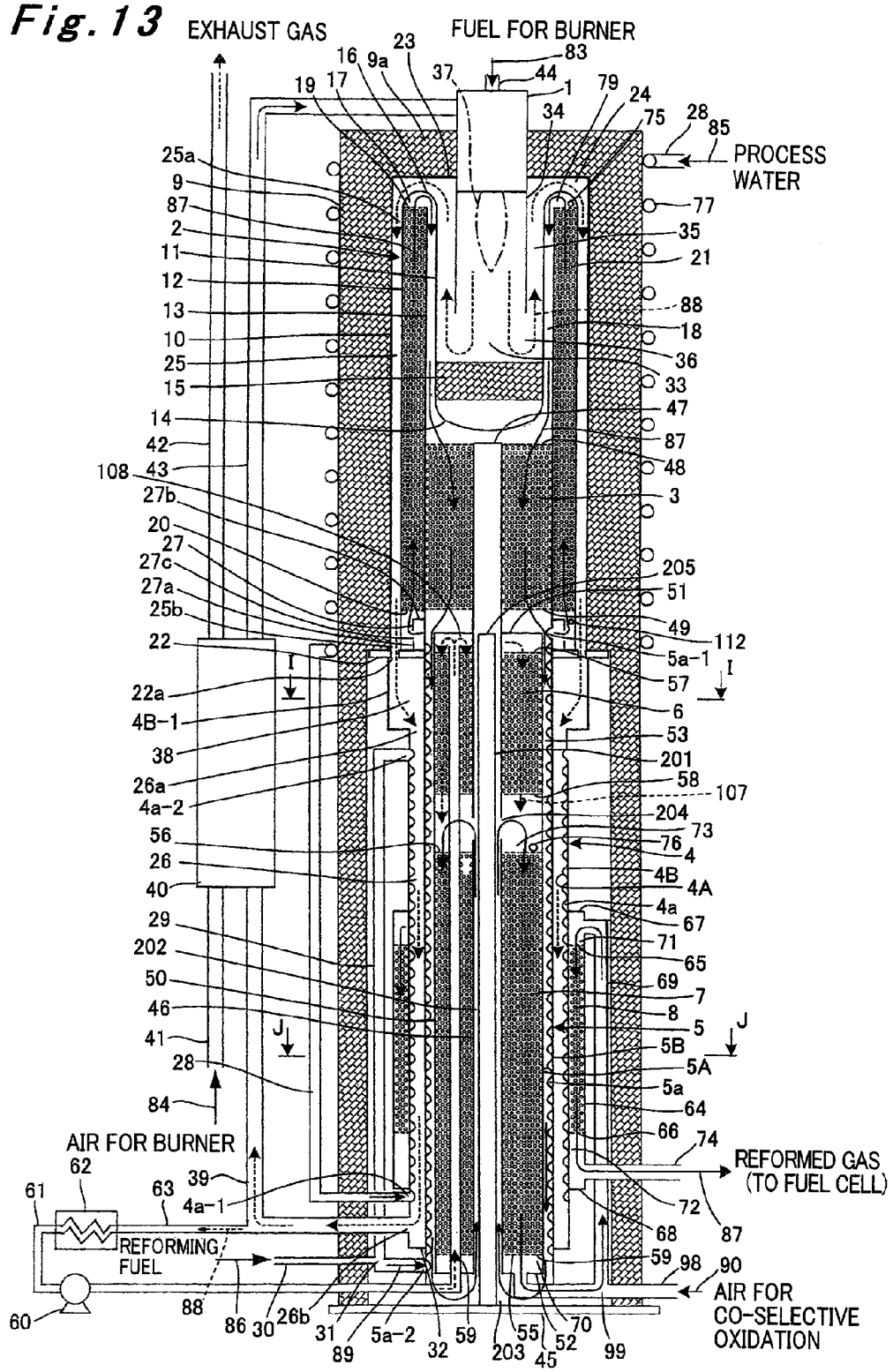
FIG. 13 shows a vertical section of a reforming apparatus according to Embodiment 3 of the present invention.
Figure 14:
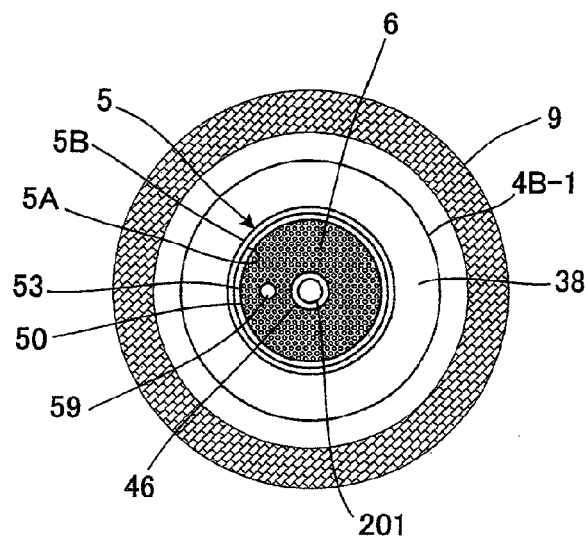
FIG. 14 shows a horizontal section taken along and viewed as indicated by the arrowed line I-I of FIG. 13.
Figure 15:
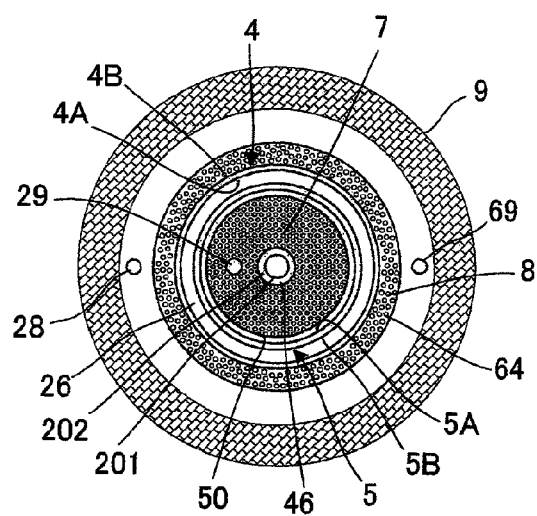
FIG. 15 shows a horizontal section taken along and viewed as indicated by the arrowed line J-J of FIG. 13.

FIG. 13 shows a vertical section of a reforming apparatus according to Embodiment 3 of the present invention. FIG. 14 shows a horizontal section taken along and viewed as indicated by the arrowed line I-I of FIG. 13. FIG. 15 shows a horizontal section taken along and viewed as indicated by the arrowed line J-J of FIG. 13. Note that in FIGS. 13 to 15, those parts that have their equivalents in Embodiment 2 (see FIGS. 5 to 9) will be represented by the same reference numerals. Accordingly, detailed description for these parts will be omitted.

<Configuration>

As FIGS. 13 to 15 show, in the reforming apparatus of Embodiment 3, a slender cylindrical pipe 201 (third cylindrical pipe) is disposed inside a cylindrical pipe 46. The cylindrical pipe 201 stands on top of a supporting plate 45. The upper end of the cylindrical pipe 201 extends to the vicinity of a cylindrical pipe 50, and is closed by an upper-end plate 205. Meanwhile, unlike the case shown in FIG. 5, the cylindrical pipe 46 does not stand on top of the supporting plate 45, and has an open lower end that is separated away from the supporting plate 45. In addition, unlike the case shown in FIG. 5, no circulation holes 54 are formed in the cylindrical pipe 50.

A cylindrical gap is left between the cylindrical pipe 46 and the cylindrical pipe 201, and the gap serves as a reformed-gas flow passage 202. To put it differently, the reformed-gas flow passage 202 is formed at the inner-circumferential side of a low-temperature CO-shift catalyst layer 7. In addition, a gap is also left between the supporting plate 45 and a lower-end plate 52 that closes the lower end of the interstice between the cylindrical pipe 50 and the cylindrical pipe 46, and the gap serves as a reformed-gas turning portion 203. As in the case shown in FIG. 5, at the outer-circumferential surface side of the low-temperature CO-shift catalyst layer 7, a cylindrical gap is left between a second vaporizer 5 (wavy pipe 5A) and the cylindrical pipe 50, and the gap serves as a reformed-gas flow passage 53.

The outer reformed-gas flow passage 53 and the inner reformed-gas flow passage 202 are connected to each other by the reformed-gas turning portion 203. In addition, multiple circulation holes 204 are formed in the cylindrical pipe 46. The multiple circulation holes 204 are formed in the circumferential direction of the cylindrical pipe 46 at positions located between an $O_2$-adsorption catalyst layer 6 located above and the low-temperature CO-shift catalyst layer 7 located below. The circulation holes 204 communicatively connects the reformed-gas flow passage 202 formed inside the cylindrical pipe 46 to an inlet 73 of the low-temperature CO-shift catalyst layer 7 (i.e., a space left between the cylindrical pipe 50 and cylindrical pipe 46 and located on the upper-end side of the low-temperature CO-shift catalyst layer 7).

The rest of the configuration of the reforming apparatus of Embodiment 3 is similar to the reforming apparatus of Embodiment 1. Note that the reforming apparatus of Embodiment 3 may be also provided with the heat exchanger 78 as shown in FIG. 10 to carry out heat exchange between heating gas 88 and process water 85. In addition, the reforming apparatus of Embodiment 2 is also provided with a temperature control system shown in FIG. 11. By means of the temperature control system, as in the case of the reforming apparatus of Embodiment 2, the reformed-gas temperature at an outlet 79 of a reforming-catalyst layer 21 and the reformed-gas temperature at the inlet 73 of the low-temperature CO-shift catalyst layer 7 or the mixture temperature at an outlet 5a-1 of a flow passage 5a of a second vaporizer 5 are controlled so as to be kept at their respective predetermined temperatures (at, for example, 750° C. and 200° C. or 400° C., respectively). In addition, the reforming apparatus of Embodiment 3 can also employ the configuration shown in FIG. 12.

The flow of the heating gas 88 in the reforming apparatus of Embodiment 3 in the steady operation is similar to Embodiment 2. Accordingly, detail description of the flow will be omitted here. In addition, while the reforming apparatus is in the steady operation, the reforming apparatus of Embodiment 3 has similar flows of the process water 85, a raw material 86, a mixture 89, and reformed gas 87 to their counterparts in Embodiment 2 up to the point where the reformed gas 87 of, for example, 550° C. that has flowed out of the high-temperature CO-shift catalyst layer 3 flows into the reformed-gas flow passage 53 formed between the second vaporizer 5 and the cylindrical pipe 50. Accordingly, detail description of the flows will be omitted here. For this reason, the following description will be focused mainly on the subsequent flow of the reformed gas 87.

The reformed gas 87 that has flowed into the reformed-gas flow passage 53 flows downwards along the outer surface of the $O_2$-adsorption catalyst layer 6 (cylindrical pipe 50) and through the reformed-gas flow passage 53. By the time when the reformed gas 87 reaches the upper-end position of the low-temperature CO-shift catalyst layer 7, the reformed gas 87 is cooled through the heat exchange with the mixture 89 flowing through the flow passage 5a of the second vaporizer 5, and the temperature of the reformed gas 87 is lowered, for example, from 550° C. down to 250° C. To put it differently, the mixture 89 that is flowing through the flow passage 5a of the second vaporizer 5 absorbs the heat amount which is held by the reformed gas 87 and which is necessary for lowering the temperature of the reformed gas 87 down to a predetermined temperature (for example, from 550° C. down to 250° C.). This is similar to the case of Embodiment 2.

In Embodiment 3, the reformed gas 87 then flows downwards along the outer surface of the low-temperature CO-shift catalyst layer 7 (cylindrical pipe 50) and through the reformed-gas flow passage 53. The reformed gas 87 turns around at the reformed-gas turning portion 203 located at the lower-end side of the low-temperature CO-shift catalyst layer 7, and flows into the reformed-gas flow passage 202 located inside the low-temperature CO-shift catalyst layer 7. The reformed gas 87 that has flowed into the reformed-gas flow passage 202 flows upwards along the inner surface of the low-temperature CO-shift catalyst layer 7 (cylindrical pipe 46) and through the reformed-gas flow passage 202. After that, the reformed gas 87 flows into the interstice between the cylindrical pipe 50 and the cylindrical pipe 46 through the circulation holes 204 formed in the cylindrical pipe 46.

During this time, the heat transfer from the low-temperature CO-shift catalyst layer 7 to the second vaporizer 5 (mixture 89) is carried out not only by the radiant heat transfer but also by the convective heat caused by the flow of the reformed gas 87 because the reformed gas 87 flows through the reformed-gas flow passage 53 formed between the low-temperature CO-shift catalyst layer 7 and the second vaporizer 5. For this reason, the second vaporizer 5 (mixture 89) exhibits higher performance of cooling the low-temperature CO-shift catalyst layer 7 than the case of Embodiment 2.

In addition, while flowing along the outer surface of the low-temperature CO-shift catalyst layer 7 (cylindrical pipe 50) and through the reformed-gas flow passage 53, the reformed gas 87 is also cooled by the heat exchange with the mixture 89 flowing through the flow passage 5a of the second vaporizer 5. Accordingly, the temperature of the reformed gas 87 is lowered, for example, from 250° C. down to 130° C. To put it differently, at the position where the low-temperature CO-shift catalyst layer 7 is disposed, the mixture 89 flowing through the flow passage 5a of the second vaporizer 5 absorbs the heat amount which is held by the reformed gas 87 and which is necessary for lowering the temperature of the reformed gas 87 down to a predetermined temperature (for example, from 250° C. down to 130° C.). On the other hand, while the reformed gas 87 flows upwards along the inner surface of the low-temperature CO-shift catalyst layer 7 (cylindrical pipe 46) and through the reformed-gas flow passage 202, the temperature of the reformed gas 87 is raised, for example, from 130° C. up to 200° C. by the heat exchange with the low-temperature CO-shift catalyst layer 7. In other words, at this time, the reformed gas 87 cools the inner-side portion of the low-temperature CO-shift catalyst layer 7, and the temperature of the inner-side portion is thus lowered down.

As in the case of Embodiment 2, the reformed gas that has flowed into the interstice between the cylindrical pipe 50 and the cylindrical pipe 46 flows into the low-temperature CO-shift catalyst layer 7. At this time, a temperature controller 80 as shown in FIG. 11 controls the amount of air 84 for burner to be supplied to a burner 1 so that the value of the temperature of the reformed gas 87 measured by a second reformed-gas thermometer 76 at the inlet 73 of the low-temperature CO-shift catalyst layer 7 can be kept at a predetermined temperature (at, for example, 200° C.). Alternatively, the temperature controller 80 controls the amount of the air 84 for burner to be supplied to the burner 1 (diluent-air amount) so that the mixture temperature at the flow-passage outlet 5a-1 of the second vaporizer 5 can be kept at a predetermined temperature (at, for example, 400° C.).

The reformed gas 87 that has flowed into the low-temperature CO-shift catalyst layer 7 flows downwards therethrough. During this time, the CO-shift reaction of the reformed gas 87 takes place in the low-temperature CO-shift catalyst layer 7, so that the CO-concentration in the reformed gas 87 is lowered further. By the time when the reformed gas 87 flows out of the low-temperature CO-shift catalyst layer 7, the temperature of the reformed gas 87 is lowered down, for example, to 140° C. by being cooled by the second vaporizer 5 (mixture 89). Specifically, by the above-described radiant heat transmission and the convective heat transfer, the second vaporizer 5 (mixture 89) absorbs (removes) the heat amount held by the reformed gas 87 that has flowed into the low-temperature CO-shift catalyst layer 7 (a heat amount which is necessary for lowering the temperature of the reformed gas 87 down to a predetermined temperature (for example, from 200° C. down to 140° C.)) and the heat amount produced by the CO-shift reaction of the reformed gas 87 that takes place in the low-temperature CO-shift catalyst layer 7.

At the position where the low-temperature CO-shift catalyst layer 7 is provided, the temperature of the second vaporizer 5 is approximately the vaporizing temperature of the process water 85 (for example, 120° C.), so that the low-temperature CO-shift catalyst layer 7 is not cooled any further than this temperature. Accordingly, there is no occurrence of a situation where the low-temperature CO-shift catalyst layer 7 is so cooled that the temperature of the low-temperature CO-shift catalyst layer 7 deviates from the range of the operation temperature of the low-temperature CO-shift catalyst (for example, a range between 150° C. and 250° C.). After flowing out of the low-temperature CO-shift catalyst layer 7, the reformed gas 87 flows in a similar way to the case of Embodiment 2. Accordingly, description as to this flow will be omitted here.

In addition, as described above, the reforming apparatus is design that the reformed gas 87 flows through the reformed-gas passage 53 located outside the low-temperature CO-shift catalyst layer 7 and through the reformed-gas flow passage 202 located inside the low-temperature CO-shift catalyst layer 7. Thus, even in a case where, after the heating operation for temperature rising for starting the reforming apparatus, the supply of the process water 85 is started so as to start the production of the reformed gas 87, and the steam of the process water 85 thus flows in, this steam is not condensed in the low-temperature CO-shift catalyst layer 7 because the steam is condensed firstly in the reformed-gas flow passages 53 and 202, that is, on the outer surface of the cylindrical pipe 50 and on the inner surface of the cylindrical pipe 46. In addition, when the steam is condensed on the outer surface of the cylindrical pipe 50 and on the inner surface of the cylindrical pipe 46, the latent heat of condensation is transferred to the low-temperature CO-shift catalyst layer 7. Accordingly, the temperature of the low-temperature CO-shift catalyst layer 7 rises. As a consequence, when the steam flows into the low-temperature CO-shift catalyst layer 7, the steam should not be condensed in the low-temperature CO-shift catalyst layer 7. Accordingly, no degradation of the low-temperature CO-shift catalyst in the low-temperature CO-shift catalyst layer 7 is provoked by the condensation of the steam.

Note that, as to the flow of the heating gas 88, the sequence of raising, by heating, the temperatures of the catalyst layers 3, 7, 8, and 21, and the like during the heating operation for temperature rising, Embodiment 3 is similar to Embodiment 1. Accordingly, detailed description as to these points will be omitted here.

As to the steam purging that is carried out when the reforming apparatus is stopped, Embodiment 3 is similar to Embodiment 2. Accordingly, detailed description as to this point will be omitted here. Note that, in Embodiment 2 (FIG. 5), the part of the $O_2$-less gas 107 that has flowed out of the $O_2$-adsorption catalyst layer 6 flows out to the outside of the cylindrical pipe 50 (into the reformed-gas flow passage 53) via the circulation holes 54 formed in the cylindrical pipe 50. In contrast, in Embodiment 3 (FIG. 13), part of the $O_2$-less gas 107 that has flowed out of the $O_2$-adsorption catalyst layer 6 flows out to the inside of the cylindrical pipe 46 (into the reformed-gas flow passage 202) via the circulation holes 204 formed in the cylindrical pipe 46, turns around at the reformed-gas turning portion 203, and then flows into the reformed-gas flow passage 53. As to the subsequent flow of the $O_2$-less gas 107 after flowing into the reformed-gas flow passage 53, Embodiment 3 is similar to Embodiment 2.

In addition, also as to the cleaning procedure of the first vaporizer 4 and the second vaporizer 5 in the case where the configuration shown in FIG. 12 is employed, Embodiment 3 is similar to Embodiment 2. Accordingly, detailed description as to these points will be omitted here.

<Advantageous Effects>

Advantageous effects that are similar to those obtained by the reforming apparatus of Embodiment 2 and by its operating method can be obtained by the reforming apparatus of Embodiment 3. In addition, according to the reforming apparatus of Embodiment 3, the following advantageous effects can be obtained, as well.

The reforming apparatus of Embodiment 3 has the following configuration. The cylindrically-shaped low-temperature CO-shift catalyst layer 7 is disposed between the cylindrical pipe 50 disposed inside the second vaporizer 5 and the cylindrical pipe 46 disposed inside the cylindrical pipe 50. The cylindrical gap left between the cylindrical pipe 50 and the second vaporizer 5 serves as the first reformed-gas passage 53. The cylindrical gap left between the cylindrical pipe 46 and the cylindrical pipe 201 that is disposed inside the cylindrical pipe 46 serves as the second reformed-gas flow passage 202. While the reformed gas 87 that has flowed out of the reforming-catalyst layer 21 flows through the first reformed-gas flow passage 53 from a first-end side (the upper-end side) to a second-end side (lower-end side) of the low-temperature CO-shift catalyst layer 7, the temperature of the reformed gas 87 is lowered by the heat exchange with the mixture 89 flowing through the flow passage 5a of the second vaporizer 5. The reformed gas 87 then turns around at the reformed-gas turning portion 203 located at the second-end side of the low-temperature CO-shift catalyst layer 7. While flowing through the second reformed-gas flow passage 202 from the second-end side to the first-end side of the low-temperature CO-shift catalyst layer 7, the temperature of the reformed gas 87 is raised by the heat exchange with the low-temperature CO-shift catalyst layer 7. After that, the reformed gas 87 flows into the interstice between the cylindrical pipe 50 and the cylindrical pipe 46 via the circulation holes 204 formed in the cylindrical pipe 46, and then flows through the low-temperature CO-shift catalyst layer 7. The mixture 89 flowing through the flow passage 5a of the second vaporizer 5 at the time absorbs the heat produced by the CO-shift reaction of the reformed gas 87 that takes place in the low-temperature CO-shift catalyst layer 7, so that the reformed gas 87 is cooled down. Accordingly, similar advantageous effects to those obtained by the reforming-catalyst layer in Embodiment 2 can be obtained. Besides, the heat transfer from the low-temperature CO-shift catalyst layer 7 to the second vaporizer 5 (mixture 89) can be achieved not only by the radiant heat transfer but also by the convective heat transfer caused by the flow of the reformed gas 87 flowing through the first reformed-gas flow passage 53 formed between the low-temperature CO-shift catalyst layer 7 and the second vaporizer 5. Accordingly, the second vaporizer 5 (mixture 89) exhibits higher performance of cooling the low-temperature CO-shift catalyst layer 7 than the case where the heat transfer is carried out only by the radiant heat transfer.

In addition, the reformed gas 87 flows through the first reformed-gas flow passage 53 formed at the outer side of the low-temperature CO-shift catalyst layer 7 and through the second reformed-gas flow passage 202 formed at the inner side thereof. Accordingly, even when the supply of the process water 85 is started after the heating operation for temperature rising and the steam of the process water 85 then flows in, no condensation of the steam takes place in the low-temperature CO-shift catalyst layer 7 because the steam is condensed firstly in the first reformed-gas flow passage 53 and the second reformed-gas flow passage 202, that is, on the outer surface of the cylindrical pipe 50 and on the inner surface of the cylindrical pipe 46. In addition, when the steam is condensed on the outer surface of the cylindrical pipe 50 and on the inner surface of the cylindrical pipe 46, the latent heat of condensation is transferred to the low-temperature CO-shift catalyst layer 7, so that the temperature of the low-temperature CO-shift catalyst layer 7 rises. Accordingly, when the steam flows into the low-temperature CO-shift catalyst layer 7, the steam should not be condensed in the low-temperature CO-shift catalyst layer 7. As a consequence, the degradation of the low-temperature CO-shift catalyst can be prevented from being provoked by the condensation of the steam.

In addition, the reformed gas 87 flowing through the second reformed-gas flow passage 202 cools the inner-side portion of the low-temperature CO-shift catalyst layer 7. Accordingly, the temperature rise of this inner-side portion can be prevented, and thus the CO-concentration in the reformed gas 87 that passes through this inner-side portion can be lowered down.

In addition, during the heating operation for temperature rising, the temperature-rise of every portion caused by being heated by the heating gas 88 is followed by the supply of the process water 85 without supplying the raw material 86. The process water 85 thus supplied flows through the flow passage 4a of the first vaporizer 4, and then the flow passage 5a of the second vaporizer 5. Thereby, the process water 85 is heated by the heating gas 88 flowing through the heating-gas flow passage 26 formed between the first vaporizer 4 and the second vaporizer 5 so that steam is produced. After the steam flows through the reforming-catalyst layer 21, and while the steam flows through the first reformed-gas flow passage 53 and then through the second reformed-gas flow passage 202, the steam is condensed on the outer surface of the first cylindrical pipe 50 and on the inner surface of the second cylindrical pipe 46. The condensation thus occurred heats the low-temperature CO-shift catalyst layer 7 and raises the temperature thereof. Thereby, the temperature rise of the low-temperature CO-shift catalyst layer 7 can be achieved with more certainty by the latent heat of condensation of the steam.

Incidentally, as described above, the reforming apparatuses of Embodiments 2 and 3 exhibit excellent performance, but, to achieve a further improvement in performance, it is preferable to improve the following points.

(1) Specifically, in each of Embodiments 2 and 3 (FIG. 5 and FIG. 13), the high-temperature CO-shift catalyst layer 3 is designed to be in direct contact with the reforming pipe 2 (intermediate cylindrical pipe 13), so that, in the fabrication process of the reforming apparatus, the high-temperature CO-shift catalyst layer 3 cannot be fabricated concurrently with the low-temperature CO-shift catalyst layer 7 and the like. Instead, the reforming apparatus needs to be fabricated by: firstly, disposing the high-temperature CO-shift catalyst layer 3 inside the reforming pipe 2; and then attaching, in a separate process, a unit in which the O$_2$-adsorption catalyst layer 6 and the low-temperature CO-shift catalyst layer 7 are formed by use of the cylindrical pipes 46 and 50 to the lower side of the high-temperature CO-shift catalyst layer 3. Such a procedure has more manufacturing steps, which leads to an increase in the cost of the apparatus.

(2) In addition, suppose a case where, during the, the temperature of the reforming-catalyst layer 21 is raised by being heated by the heating gas 88 flowing through the heating-gas flow passage 25 located at the outer side of the reforming-catalyst layer 21. In this case, the temperature of the portion of the reforming-catalyst layer 21 where the high-temperature CO-shift catalyst layer 3 is disposed is harder to be raised than the temperature of the portion of the reforming-catalyst layer 21 located at the upper side of the above-mentioned portion due to the influence of the heat capacity of the high-temperature CO-shift catalyst layer 3.

Accordingly, for the purpose of achieving further improvement in performance, these points are improved in the reforming apparatus of Embodiment 4 of the present invention, which will be described next.

Embodiment 4

Figure 16:
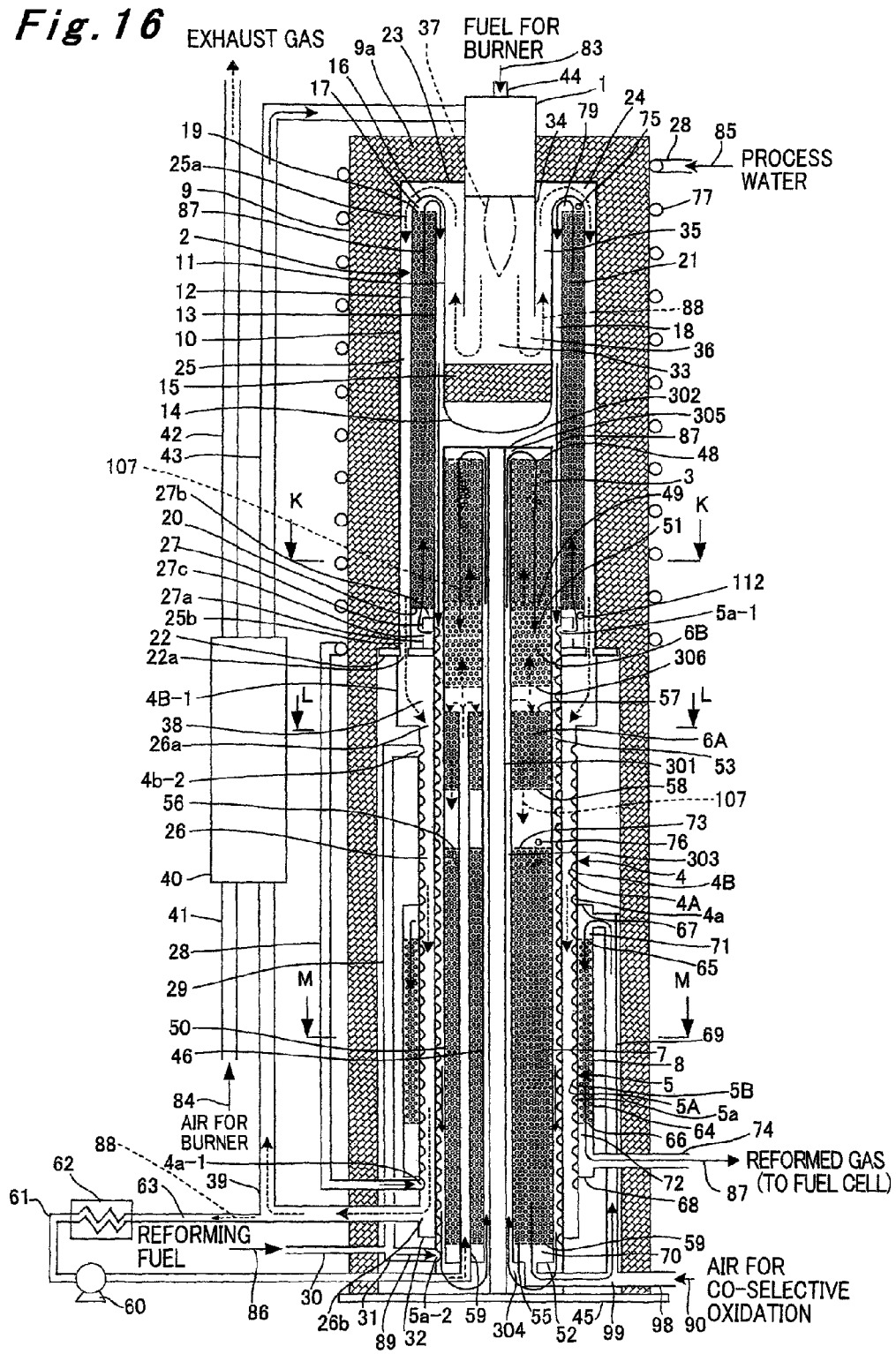
FIG. 16 shows a vertical section of a reforming apparatus according to Embodiment 4 of the present invention.
Figure 17:
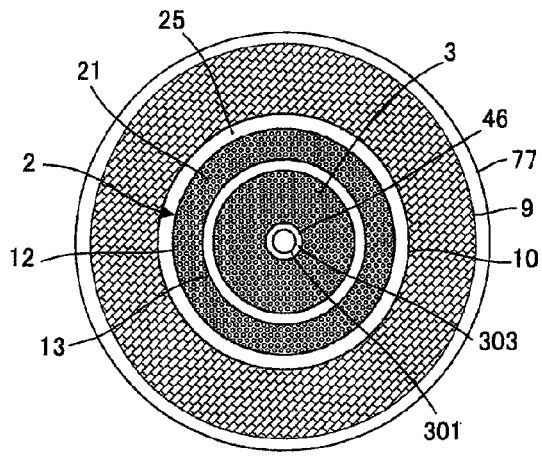
FIG. 17 shows a horizontal section taken along and viewed as indicated by the arrowed line K-K of FIG. 16.
Figure 18:
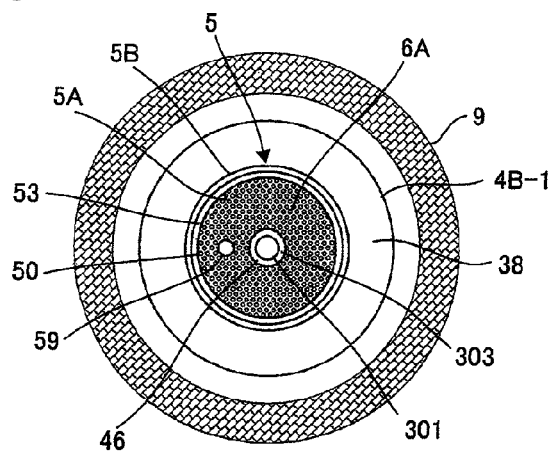
FIG. 18 shows a horizontal section taken along and viewed as indicated by the arrowed line L-L of FIG. 16.
Figure 19:
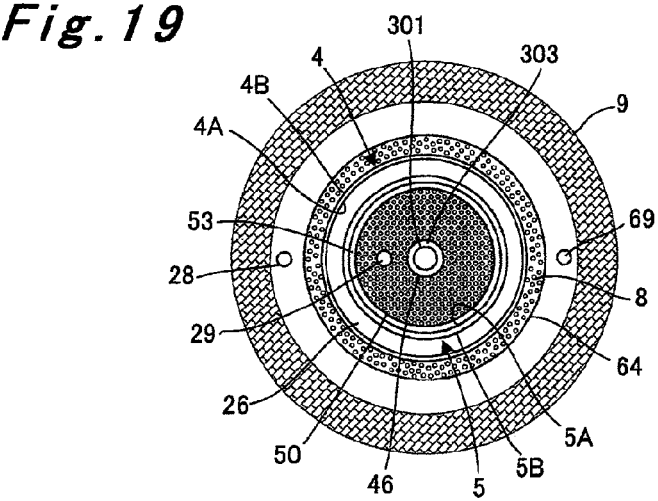
FIG. 19 shows a horizontal section taken along and viewed as indicated by the arrowed line M-M of FIG. 16.

FIG. 16 shows a vertical section of a reforming apparatus according to Embodiment 4 of the present invention. FIG. 17 shows a horizontal section taken along and viewed as indicated by the arrowed line K-K of FIG. 16. FIG. 18 shows a horizontal section taken along and viewed as indicated by the arrowed line L-L of FIG. 16. FIG. 19 shows a horizontal section taken along and viewed as indicated by the arrowed line M-M of FIG. 16. Note that, in FIGS. 16 to 19, those parts that have their equivalents in Embodiment 2 (see FIGS. 5 to 9) or in Embodiment 3 (see FIGS. 13 to 15) will be represented by the same reference numerals as those used in Embodiment 2 or 3. Accordingly, detailed description for these parts will be omitted.

<Configuration>

As FIGS. 16 to 19 show, in the reforming apparatus of Embodiment 4, a slender cylindrical pipe 301 (third cylindrical pipe) is disposed inside a cylindrical pipe 46. The cylindrical pipe 301 stands on top of a supporting plate 45. The upper end of the cylindrical pipe 301 extends to the vicinity of the lower-end of an inner cylindrical pipe 11 of a reforming pipe 2 (i.e., to the vicinity of a circular-shell plate 14). In addition, in Embodiment 4, the upper end of the cylindrical pipes 46 and 50 also extend to the vicinity of the lower-end of the inner cylindrical pipe 11 of the reforming pipe 2 (i.e., to the vicinity of the circular-shell plate 14). The upper ends of the cylindrical pipe 50 and the cylindrical pipe 301 are closed by an upper-end plate 302.

On the other hand, unlike the case shown in FIG. 5, the cylindrical pipe 46 does not stand on top of the supporting plate 45, and has an open lower end that is separated away from the supporting plate 45. In addition, unlike the case shown in FIG. 5, no circulation holes 54 are formed in the cylindrical pipe 50. Moreover, unlike the case shown in FIG. 13, no circulation holes 204 are formed in the cylindrical pipe 46.

In addition, as in the case shown in FIG. 5, a cylindrically-shaped high-temperature CO-shift catalyst 3 is disposed at the inner side of a reforming-catalyst layer 21 and below the lower end of the inner cylindrical pipe 11 of the reforming pipe 2 (i.e., below the circular-shell plate 14) in Embodiment 4. In Embodiment 4, however, the high-temperature CO-shift catalyst layer 3 is disposed between the cylindrical pipe 50 and the cylindrical pipe 46, which is different from the case shown in FIG. 5. In the example shown in FIG. 16, a space is formed by the cylindrical pipe 50, the cylindrical pipe 46, and perforated plates (punching plates) 48 and 49 fixed respectively to the upper side and the lower side of the interstice between the cylindrical pipes 50 and 46. The high-temperature CO-shift catalyst layer 3 in the example shown in FIG. 16 is formed by filling a high-temperature CO-shift catalyst into the space thus formed.

A cylindrical gap is left between the cylindrical pipe 46 and the cylindrical pipe 301, and the gap serves as a reformed-gas flow passage 303. To put it differently, the reformed-gas flow passage 303 is formed at the inner-circumferential side of the low-temperature CO-shift catalyst layer 7 and at the inner-circumferential side of the high-temperature CO-shift catalyst layer 3. In addition, a gap is also left between the supporting plate 45 and a lower-end plate 52 that closes the lower end of the interstice between the cylindrical pipe 50 and the cylindrical pipe 46, and the gap serves as a reformed-gas turning portion 304.

As in the case shown in FIG. 5, at the outer-circumferential surface side of the low-temperature CO-shift catalyst layer 7, a cylindrical gap is left between a second vaporizer 5 (wavy pipe 5A) and the cylindrical pipe 50, and the gap serves as a reformed-gas flow passage 53. In Embodiment 4, however, the reformed-gas flow passage 53 extends between the intermediate cylindrical pipe 13 of the reforming pipe 2 and the cylindrical pipe 50. To put it differently, a cylindrical gap is also left between the intermediate cylindrical pipe 13 of the reforming pipe 2 and the cylindrical pipe 50, and the gap also forms a part of the reformed-gas flow passage 53.

The outer first reformed-gas flow passage 53 and the inner second reformed-gas flow passage 303 are connected to each other by the reformed-gas turning portion 304. In addition, a gap is also left between the cylindrical pipe 46 and the upper-end plate 302, and this gap serves as a reformed-gas turning portion 305. By this reformed-gas turning portion 305, the reformed-gas flow passage 303 is connected to the upper-end portion of the interstice between the cylindrical pipe 46 and the cylindrical pipe 50 (i.e., to the upper-end side of the high-temperature CO-shift catalyst layer 3).

In addition, as in the case of Embodiments 2 and 3, the reforming apparatus of Embodiment 4 includes a pump 60 and a condenser 62. In Embodiment 4, however, two layers, namely a first $O_2$-adsorption catalyst layer 6A and a second $O_2$-adsorption catalyst layer 6B are provided to serve as $O_2$-adsorption catalyst layers. Both the first $O_2$-adsorption catalyst layer 6A and the second $O_2$-adsorption catalyst layer 6B are cylindrically disposed between the first cylindrical pipe 50 and the second cylindrical pipe 46 and, at the same time, are positioned between a low-temperature CO-shift catalyst layer 7 and the high-temperature CO-shift catalyst layer 3. The first $O_2$-adsorption catalyst layer 6A is formed by filling an $O_2$-adsorption catalyst into the interstice between the perforated plates 57 and 58, and is positioned on a side that is closer to the low-temperature CO-shift catalyst layer 7. The second $O_2$-adsorption catalyst layer 6B is formed by filling an $O_2$-adsorption catalyst into the interstice between the perforated plates 49 and 306, and is positioned on a side that is closer to the high-temperature CO-shift catalyst layer 3. A heating-gas induction pipe 59 penetrates the low-temperature CO-shift catalyst layer 7 and the first $O_2$-adsorption catalyst layer 6A. Accordingly, when the reforming apparatus is stopped, heating gas 88 is introduced by way of the heating-gas induction pipe 59 into the interstice between the first $O_2$-adsorption catalyst layer 6A and the second $O_2$-adsorption catalyst layer 6B.

Part of the heating gas 88 introduced into the interstice between the first $O_2$-adsorption catalyst layer 6A and the second $O_2$-adsorption catalyst layer 6B turns around, and then flows through the first $O_2$-adsorption catalyst layer 6A. At this time, $O_2$ in the heating gas 88 is removed so as to produce $O_2$-less gas 107. This $O_2$-less gas 107 flows through the low-temperature CO-shift catalyst layer 7, and then through a CO-removing catalyst layer 8, so that the steam that remains in the low-temperature CO-shift catalyst layer 7 and in the CO-removing catalyst layer 8 is discharged. The rest of the heating gas 88 introduced into the interstice between the first $O_2$-adsorption catalyst layer 6A and the second $O_2$-adsorption catalyst layer 6B flows through the second $O_2$-adsorption catalyst layer 6B. At this time, $O_2$ in the heating gas 88 is removed so as to produce $O_2$-less gas 107. This $O_2$-less gas 107 flows through the high-temperature CO-shift catalyst layer 3, and then flows out by way of the reformed-gas turning portion 305 located at the end of the second reformed-gas flow passage 303. After that, the $O_2$-less gas 107 flows through the reforming-catalyst layer 21. As a consequence, the steam that remains in the high-temperature CO-shift catalyst layer 3 and in the reforming-catalyst layer 21 is discharged.

The rest of the configuration of the reforming apparatus of Embodiment 4 is similar to the reforming apparatus of Embodiment 1. Note that the reforming apparatus of Embodiment 4 may be provided with the heat exchanger 78 as shown in FIG. 10 to carry out the heat exchange between the heating gas 88 and process water 85. In addition, the reforming apparatus of Embodiment 3 is also provided with a temperature control system shown in FIG. 11. By means of the temperature control system, as in the case of the reforming apparatus of Embodiment 2, the reformed-gas temperature at an outlet 79 of the reforming-catalyst layer 21 and the reformed-gas temperature at an inlet 73 of the low-temperature CO-shift catalyst layer 7 or the mixture temperature at an outlet 5a-1 of a flow passage 5a of a second vaporizer 5 are controlled so as to be kept at their respective predetermined temperatures (at, for example, 750° C. and 200° C. or 400° C., respectively). In addition, the reforming apparatus of Embodiment 4 can also employ the configuration shown in FIG. 12.

The flow of the heating gas 88 in the reforming apparatus of Embodiment 4 during the steady operation is similar to Embodiment 2. Accordingly, detail description as to the flow will be omitted here. In addition, while the reforming apparatus is in the steady operation, the reforming apparatus of Embodiment 4 has similar flows of the process water 85, a raw material 86, a mixture 89, and reformed gas 87 to their counterparts in Embodiment 2 up to the point where the reformed gas 87 of, for example, 750° C. that has flowed out of the reforming catalyst layer 21 flows into and downwards through a reformed-gas flow passage 18 located inside the reforming catalyst layer 21 and the temperature of the reformed gas 87 is lowered down to, for example, 50° C. by the heat exchange with the reforming catalyst layer 21 (i.e., with the mixture 89). Accordingly, detail description as to the flows will be omitted here. For this reason, the following description will be focused mainly on the subsequent flow of the reformed gas 87.

The reformed gas 87 that has flowed through the reformed-gas flow passage 18 flows into the first reformed-gas flow passage 53. The reformed gas 87 that has flowed into the first reformed-gas flow passage 53 flows downwards along the outer surface of the high-temperature CO-shift catalyst layer 3 (cylindrical pipe 50) and through the first reformed-gas flow passage 53. Then, as in the case of Embodiment 2, the reformed gas 87 flows downwards along the outer surface of an $O_2$-adsorption catalyst layer 6 (cylindrical pipe 50) and through the reformed-gas flow passage 53. By the time when the reformed gas 87 reaches the upper-end position of the low-temperature CO-shift catalyst layer 7, the reformed gas 87 is cooled through the heat exchange with the mixture 89 flowing through the flow passage 5a of the second vaporizer 5, and the temperature of the reformed gas 87 is thus lowered, for example, from 550° C. down to 250° C. To put it differently, the mixture 89 flowing through the flow passage 5a of the second vaporizer 5 absorbs the heat amount which is held by the reformed gas 87 and which is necessary for lowering the temperature of the reformed gas 87 down to a predetermined temperature (for example, from 550° C. down to 250° C.).

In Embodiment 4, the reformed gas 87 then flows downwards through the reformed-gas flow passage 53 along the outer surface of the low-temperature CO-shift catalyst layer 7 (cylindrical pipe 50). The reformed gas 87 turns around at the reformed-gas turning portion 304 located at the lower-end side of the low-temperature CO-shift catalyst layer 7, and flows into the second reformed-gas flow passage 303 located at the inner side of the low-temperature CO-shift catalyst layer 7. The reformed gas 87 that has flowed into the second reformed-gas flow passage 303 flows upwards through the second reformed-gas flow passage 303 along the inner surface of the low-temperature CO-shift catalyst layer 7 (cylindrical pipe 46). Then, the reformed gas 87 flows upwards through the second reformed-gas passage 303 along the inner surface of the $O_2$-adsorption catalyst layer 6 (cylindrical pipe 46) and along the inner surface of the high-temperature CO-shift catalyst layer 3 (cylindrical pipe 46). After that, the reformed gas 87 turns around at the reformed-gas turning portion 305 located at the upper-end side of the high-temperature CO-shift catalyst layer 3, and then flows into the high-temperature CO-shift catalyst layer 3 (i.e., into the interstice between the cylindrical pipe 50 and the cylindrical pipe 46).

At this time, the second vaporizer 5 (mixture 89) exhibits a higher performance of cooling the low-temperature CO-shift catalyst layer 7 than the case of Embodiment 2 for the following reason. The cooling performance is determined not only by the radiant heat transfer but also by the convective heat transfer caused by the flow of the reformed gas 87 because the reformed gas 87 flows through the reformed-gas flow passage 53 formed between the low-temperature CO-shift catalyst layer 7 and the second vaporizer 5 as in the case of Embodiment 3.

In addition, while flowing through the first reformed-gas flow passage 53 along the outer surface of the low-temperature CO-shift catalyst layer 7 (cylindrical pipe 50), the reformed gas 87 is also cooled by the heat exchange with the mixture 89 flowing through the flow passage 5a of the second vaporizer 5. Accordingly, the temperature of the reformed gas 87 is lowered, for example, from 250° C. down to 130° C. To put it differently, at the position where the low-temperature CO-shift catalyst layer 7 is disposed, the mixture 89 flowing through the flow passage 5a of the second vaporizer 5 absorbs the heat amount which is held by the reformed gas 87 and which is necessary for lowering the temperature of the reformed gas 87 down to a predetermined temperature (for example, from 250° C. down to 130° C.). On the other hand, while the reformed gas 87 is flowing upwards through the second reformed-gas flow passage 303 along the inner surfaces of the high-temperature CO-shift catalyst layer 3, the $O_2$-adsorption catalyst layer 6, and the low-temperature CO-shift catalyst layer 7 (cylindrical pipe 46), the temperature of the reformed gas 87 is raised, for example, from 130° C. up to 400° C. by the heat exchange with the high-temperature CO-shift catalyst layer 3 and the low-temperature CO-shift catalyst layer 7. To put it differently, at this time, the reformed gas 87 cools the inner-side portions of the high-temperature CO-shift layer 3 and of the low-temperature CO-shift catalyst layer 7, and thus the temperatures of these inner-side portions are lowered down.

The reformed gas 87 that has flowed into the high-temperature CO-shift catalyst layer 3 flows downwards therethrough. During this time, the CO-concentration in the reformed gas 87 is lowered by the CO-shift reaction. The heat produced by this CO-shift reaction of reformed gas 87 is transferred to the reformed gas 87 flowing through the second reformed-gas flow passage 303 and, by way of the intermediate cylindrical pipe 13, to the reforming-catalyst layer 21 that is adjacent to the outer side of the high-temperature CO-shift catalyst layer 3 with the reformed-gas flow passage 53 located in between. Accordingly, the temperature of the reformed gas 87 that has flowed out of the high-temperature CO-shift catalyst layer 3 is, for example, approximately 400° C. The reformed gas 87 that has flowed out of the high-temperature CO-shift catalyst layer 3 passes through the $O_2$-adsorption catalyst layer 6 and then flows into the low-temperature CO-shift catalyst layer 7. During this time, the temperature of the reformed gas 87 is lowered down, for example, to approximately 200° C. by being cooled by the heat exchange with the mixture 89 flowing through the flow passage 5a of the second vaporizer 5. To put it differently, the mixture 89 flowing through the flow passage 5a of the second vaporizer 5 absorbs the heat amount held by the reformed gas 87 and which is necessary for lowering the temperature of the reformed gas 87 down to a predetermined temperature (for example, approximately from 400° C. down to 200° C.).

Here, a temperature controller 80 shown in FIG. 11 controls the amount of air 84 for burner to be supplied to a burner 1 so that the temperature of the reformed gas 87 at the inlet 73 of the low-temperature CO-shift catalyst layer 7 (i.e., the value of the temperature of the reformed gas 87 measured by a second reformed-gas thermometer 76) can be kept at a predetermined temperature (at, for example, 200° C.). Alternatively, the temperature controller 80 controls the amount of the air 84 for burner to be supplied to the burner 1 (diluent-air amount) so that the mixture temperature at the flow-passage outlet 5a-1 of the second vaporizer 5 is kept at a predetermined temperature (at, for example, 400° C.).

The reformed gas 87 that has flowed into the low-temperature CO-shift catalyst layer 7 flows downwards therethrough. During this time, the CO-shift reaction of the reformed gas 87 takes place in the low-temperature CO-shift catalyst layer 7, so that the CO-concentration in the reformed gas 87 is lowered further. The temperature of the reformed gas 87 that has flowed out of the low-temperature CO-shift catalyst layer 7 is lowered down, for example, to 140° C. by being cooled by the second vaporizer 5 (mixture 89). In other words, through the above-described radiant heat transmission and the convective heat transfer, the second vaporizer 5 (mixture 89) absorbs (removes) the heat amount held by the reformed gas 87 having flowed into the low-temperature CO-shift catalyst layer 7 (a heat amount which is necessary for lowering the temperature of the reformed gas 87 down to a predetermined temperature (for example, from 200° C. down to 140° C.)) and the heat amount produced by the CO-shift reaction of the reformed gas 87 that takes place in the low-temperature CO-shift catalyst layer 7.

At the position where the low-temperature CO-shift catalyst layer 7 is provided, the temperature of the second vaporizer 5 is approximately the vaporizing temperature of the process water 85 (for example, 120° C.), so that the low-temperature CO-shift catalyst layer 7 is not cooled any further than this temperature. Accordingly, there is no occurrence of a situation where the low-temperature CO-shift catalyst layer 7 is so cooled down that the temperature of the low-temperature CO-shift catalyst layer 7 deviates from the range of the operation temperature of the low-temperature CO-shift catalyst (for example, a range between 150° C. and 250° C.). After flowing out of the low-temperature CO-shift catalyst layer 7, the reformed gas 87 flows in a similar way to the case of Embodiment 2. Accordingly, description as to this flow will be omitted here.

In addition, as in the case of Embodiment 3, the reformed gas 87 flows both at the outer side of the lower-temperature CO-shift layer 7 (i.e., through the reformed-gas flow passage 53) and at the inner side of the same (i.e., through the reformed-gas flow passage 303) in Embodiment 4. Thus, even in case where, after the heating operation for temperature rising for starting the reforming apparatus, the supply of the process water 85 is started so as to start the production of the reformed gas 87, and the steam of the process water 85 thus flows in, this steam is not condensed in the low-temperature CO-shift catalyst layer 7 because the steam is condensed firstly in the reformed-gas flow passages 53 and 303, that is, on the outer surface of the cylindrical pipe 50 and on the inner surface of the cylindrical pipe 46. In addition, when the steam is condensed on the outer surface of the cylindrical pipe 50 and on the inner surface of the cylindrical pipe 46, the latent heat of condensation is transferred to the low-temperature CO-shift catalyst layer 7. Accordingly, the temperature of the low-temperature CO-shift catalyst layer 7 rises. As a consequence, when the steam flows into the low-temperature CO-shift catalyst layer 7, the steam should not be condensed in the low-temperature CO-shift catalyst layer 7. Accordingly, no degradation of the low-temperature CO-shift catalyst in the low-temperature CO-shift catalyst layer 7 is provoked by the condensation of the steam.

In addition, in Embodiment 4, as described above, the latent heat of the condensation produced when the steam is condensed on the outer surface of the cylindrical pipe 50 and on the inner surface of the cylindrical pipe 50 at the start of the supply of the process water 85, is transferred also to the high-temperature CO-shift catalyst layer 3. Accordingly, the temperature of the high-temperature CO-shift catalyst layer 3 also rises. As a consequence, when the steam flows into the high-temperature CO-shift catalyst layer 3, the steam should not be condensed in the high-temperature CO-shift catalyst layer 3. Accordingly, degradation of the high-temperature CO-shift catalyst is not provoked by the condensation of the steam.

In Embodiment 4, during the heating operation for temperature rising, the temperature of the reforming-catalyst layer 21 is raised by being heated by the heating gas 88 flowing through the heating-gas flow passage 25 located at the outer side of the reforming-catalyst layer 21. At this time, since the reformed-gas flow passage 53 exists between the reforming-catalyst layer 21 (intermediate cylindrical pipe 13) and the high-temperature CO-shift catalyst layer 3 (cylindrical pipe 50), the temperature of the portion of reforming-catalyst layer 21 where the high-temperature CO-shift catalyst layer 3 is provided is smoothly raised by the heating gas 88 without being influenced much by the heat capacity of the high-temperature CO-shift catalyst layer 3. Note that, in this case, during the heating operation for temperature rising, the temperature of the high-temperature CO-shift catalyst layer 3 is harder to be raised than the case of Embodiment 2. Nonetheless, even if this temperature rise of the high-temperature CO-shift catalyst layer 3 is insufficient, the temperature of the high-temperature CO-shift catalyst layer 3 can be raised by the latent heat of condensation, as described above. Accordingly, no condensation of the steam occurs in the high-temperature CO-shift catalyst layer 3.

In addition, in the fabrication steps of the reforming apparatus, the $O_2$-adsorption catalyst layer 6, the low-temperature CO-shift catalyst layer 7, and the high-temperature CO-shift catalyst layer 3 that have been fabricated simultaneously in advance by using the cylindrical pipes 46 and 50, are assembled to the apparatus.

Note that, as to the flow of the heating gas 88, the sequence of raising, by heating, the temperatures of the catalyst layers 3, 7, 8, and 21, and the like during the heating operation for temperature rising, Embodiment 4 is also similar to Embodiment 1. Accordingly, detailed description as to these points will be omitted here.

The steam purging at the time of stopping the reforming apparatus is carried out in the following way. Specifically, after the heating gas 88 that has flowed in a similar way to the case of the steady operation or of the heating operation for temperature rising, the heating gas 88 is discharged to an exhaust pipe 39 via a heating-gas flow passage 26. The heating gas 88 thus discharged is led from the exhaust pipe 39 into a duct 63 by driving a pump 60. Note that, in FIG. 16, the flows of the heating gas 88 and of the $O_2$-less gas 107 at the time of the steam purging are indicated by the arrowed dot-lines. Then, the moisture in the heating gas 88 is condensed in a condenser 62, and is then removed. Incidentally, in the condenser 62, the condensation of the moisture may be achieved by, for example, sending air with a fan, or by using the process water 85 or the air 84 for burner. The heating gas 88 from which the moisture has been removed flows into the heating-gas induction pipe 59, and flows upwards through the heating-gas induction pipe 59. Accordingly, the heating gas 88 is introduced into the portion located between the first $O_2$-adsorption catalyst layer 6A and the second $O_2$-adsorption catalyst layer 6B. After that, the production of the $O_2$-less gas 107 and the purging of the remaining steam carried out by use of the $O_2$-less gas 107 are accomplished in the above-described way.

As to the cleaning procedure of the first vaporizer 4 and the second vaporizer 5 in the case where the configuration shown in FIG. 12 is employed, Embodiment 4 is similar to Embodiment 2. Accordingly, detailed description as to these points will be omitted here.

<Advantageous Effects>

Advantageous effects that are similar to those obtained by the reforming apparatus of Embodiment 2 and by its operating method can be obtained by the reforming apparatus of Embodiment 4. In addition, according to the reforming apparatus of Embodiment 4, the following advantageous effects can be obtained, as well.

The reforming apparatus of Embodiment 4 has the following configuration. The cylindrically-shaped low-temperature CO-shift catalyst layer 7 is disposed between the cylindrical pipe 50 disposed inside the second vaporizer 5 and the cylindrical pipe 46 disposed inside the cylindrical pipe 50. The high-temperature CO-shift catalyst layer 3 is disposed below the circular-shell plate 14 and at inner side of the intermediate cylindrical pipe 13, and the cylindrically-shaped high-temperature CO-shift catalyst layer 3 is provided between the cylindrical pipe 46 and the cylindrical pipe 50 that extends to the inner side of the intermediate cylindrical pipe 13. The cylindrical gap left between the cylindrical pipe 50 and the second vaporizer 5 serves as the first reformed-gas flow passage 53. The cylindrical gap left between the cylindrical pipe 46 and the cylindrical pipe 301 that is disposed inside the cylindrical pipe 46 serves as the second reformed-gas flow passage 303. While the reformed gas 87 that has flowed out of the reforming-catalyst layer 21 flows through the first reformed-gas flow passage 53 from a first-end side (upper-end side) to a second-end side (lower-end side) of the high-temperature CO-shift catalyst layer 3 and from a first-end side (upper-end side) to a second-end side (lower-end side) of the low-temperature CO-shift catalyst layer 7, the temperature of the reformed gas 87 is lowered by the heat exchange with the mixture 89 that is flowing through the flow passage 5a of the second vaporizer 5. Then, the reformed gas 87 turns around at the reformed-gas turning portion 304 located at the second-end side (lower-end side) of the low-temperature CO-shift catalyst layer 7. While flowing through the second reformed-gas flow passage 303 from the second-end side to the first-end side of the low-temperature CO-shift catalyst layer 7, and from the second-end side to the first-end side of the high-temperature CO-shift catalyst layer 3, the temperature of the reformed gas 87 is raised by the heat exchange with the low-temperature CO-shift catalyst layer 7 and with the high-temperature CO-shift catalyst layer 3. After that, the reformed gas 87 turns around at the reformed-gas turning portion 305 located at the upper-end side of the second reformed-gas flow passage 303, and flows into the interstice between the cylindrical pipe 50 and the cylindrical pipe 46. The reformed gas 87 flows through the high-temperature CO-shift catalyst layer 3 and then through the low-temperature CO-shift catalyst layer 7. The mixture 89 flowing through the flow passage 5a of the second vaporizer 5 at this time absorbs the heat produced by the CO-shift reaction of the reformed gas 87 that takes place in the low-temperature CO-shift catalyst layer 7, so that the reformed gas 87 is cooled down. With this configuration, similar advantageous effects to those obtained by the reforming-catalyst layer in Embodiment 2 can be obtained. Besides, the heat transfer from the low-temperature CO-shift catalyst layer 7 to the second vaporizer 5 (mixture 89) can be achieved not only by the radiant heat transfer but also by the convective heat transfer caused by the flow of the reformed gas 87 flowing through the first reformed-gas flow passage 53 formed between the low-temperature CO-shift catalyst layer 7 and the second vaporizer 5. Accordingly, the second vaporizer 5 (mixture) exhibits higher performance of cooling the low-temperature CO-shift catalyst layer 7 than the case where the heat transfer is carried out only by the radiant heat transfer.

In addition, the reforming apparatus has a configuration in which the reformed gas 87 flows through the first reformed-gas flow passage 53 formed at the outer side of the low-temperature CO-shift catalyst layer 7 and through the second reformed-gas flow passage 303 formed at the inner side thereof. Accordingly, even when the supply of the process water 85 is started after the heating operation for temperature rising, and the steam of the process water 85 flows in, no condensation of the steam takes place in the low-temperature CO-shift catalyst layer 7 because the steam is condensed firstly in the first reformed-gas flow passage 53 and the second reformed-gas flow passage 303, that is, on the outer surface of the cylindrical pipe 50 and on the inner surface of the cylindrical pipe 46. In addition, when the steam is condensed on the outer surface of the cylindrical pipe 50 and on the inner surface of the cylindrical pipe 46, the latent heat of condensation is transferred to the low-temperature CO-shift catalyst layer 7, so that the temperature of the low-temperature CO-shift catalyst layer 7 rises. Accordingly, when the steam flows into the low-temperature CO-shift catalyst layer 7, the steam should not be condensed in the low-temperature CO-shift catalyst layer 7. As a consequence, the degradation of the low-temperature CO-shift catalyst can be prevented from being provoked by the condensation of the steam.

In addition, as described above, the latent heat of condensation produced when the steam is condensed on the outer surface of the cylindrical pipe 50 and on the inner surface of the cylindrical pipe 46 at the start of the supply of the process water 85, is transferred also to the high-temperature CO-shift catalyst layer 3. Accordingly, the temperature of the high-temperature CO-shift catalyst layer 3 also rises. For this reason, when the steam flows into the high-temperature CO-shift catalyst layer 3, the steam should not be condensed in the high-temperature CO-shift catalyst layer 3. As a consequence, no degradation of the high-temperature CO-shift catalyst is provoked by the condensation of the steam.

In addition, the reformed gas 87 that is flows through the second reformed-gas flow passage 303 cools the inner-side portions of the low-temperature CO-shift catalyst layer 7 and of the high-temperature CO-shift catalyst layer 3. Accordingly, the temperature rise of these inner-side portions can be prevented, and thus the CO-concentration in the reformed gas 87 that passes through these inner-side portions can be lowered down.

In addition to the low-temperature CO-shift catalyst layer 7, the high-temperature CO-shift catalyst layer 3 is provided as another CO-shift catalyst layer. The high-temperature CO-shift catalyst has a high operation temperature and is heat resistant. In addition, because of the high operation temperature, the high-temperature CO-shift catalyst has a high reaction rate. Accordingly, the amount of the high-temperature CO-shift catalyst needed to remove CO is smaller than the low-temperature CO-shift catalyst. As a consequence, the CO-concentration in the reformed gas that has passed through the high-temperature CO-shift catalyst layer 3 is lower than the CO-concentration in the conventional reformed gas of, for example, 650° C. level. For this reason, even when the reformed gas flows into the low-temperature CO-shift catalyst layer 7, the temperature of the low-temperature CO-shift catalyst is raised to a lesser extent by the heat produced by the CO-shift reaction. As a consequence, the low-temperature CO-shift catalyst can have a longer service life. In addition, when the temperature of the low-temperature CO-shift catalyst is not raised, the temperature at the outlet of the low-temperature CO-shift catalyst layer 7 is also lowered down. Accordingly, for the reason related to the equilibrium reaction, the CO-concentration in the reformed gas that has flowed out of the low-temperature CO-shift catalyst layer 7 is also lowered down. As a consequence, when the reformed gas that has flowed out of the low-temperature CO-shift catalyst layer 7 flows further through the CO-removing catalyst layer 8, the load on the CO-removing catalyst can be reduced.

In addition, in the fabrication processes of the reforming apparatus, it is not necessary to form, in advance, the high-temperature CO-shift catalyst layer 3 in the reforming apparatus. Instead, as a separate process, the high-temperature CO-shift catalyst layer 3 can be fabricated simultaneously with the low-temperature CO-shift catalyst layer 7 by using the cylindrical pipe 50 and of the cylindrical pipe 46. Then, the high-temperature CO-shift catalyst layer 3 and the low-temperature CO-shift catalyst layer 7 can be assembled later to the reforming apparatus. For this reason, the handling of these members in the fabrication processes can be improved, resulting in a reduction in the manufacturing cost.

In addition, while the reforming apparatus is in the heating operation for temperature rising, the temperature of the reforming pipe 2 (reforming-catalyst layer 21) is raised by being heated by the heating gas. At this time, since the first reformed-gas flow passage 53 exists between the reforming-catalyst layer 21 (intermediate cylindrical pipe 13) and the high-temperature CO-shift catalyst layer 3 (cylindrical pipe 50), the portion of the reforming-catalyst layer 21 where the high-temperature CO-shift catalyst layer 3 is disposed is also less influenced by the heat capacity of the high-temperature CO-shift catalyst layer 3. Accordingly, the temperature of the above-mentioned portion can be raised smoothly by the heating gas 88. Note that, even when the temperature-rise of the high-temperature CO-shift catalyst layer 3 at this time is insufficient, the temperature of the high-temperature CO-shift catalyst layer 3 can be raised by the latent heat of condensation of the steam, as described above. Accordingly, no condensation of steam takes place in the high-temperature CO-shift catalyst layer 3.

In addition, during the heating operation for temperature rising, the temperature-rise of every portion caused by being heated by the heating gas 88 is followed by the supply of the process water 85 without supplying the raw material 86. The process water 85 thus supplied flows through the flow passage 4a of the first vaporizer 4, and then the flow passage 5a of the second vaporizer 5. Thereby, the process water 85 is heated by the heating gas 88 flowing through the heating-gas flow passage 26 formed between the first vaporizer 4 and then through the second vaporizer 5 so that steam is produced. After the steam flows through the reforming-catalyst layer 21, and while the steam flows through the first reformed-gas flow passage 53 and then through the second reformed-gas flow passage 303, the steam is condensed on the outer surface of the cylindrical pipe 50 and on the inner surface of the cylindrical pipe 46. The condensation thus occurred heats the high-temperature CO-shift catalyst layer 3 and the low-temperature CO-shift catalyst layer 7 and raises the temperatures thereof. Thereby, the temperatures rise of the high-temperature CO-shift catalyst layer 3 and of the low-temperature CO-shift catalyst layer 7 can be achieved with more certainty by the latent heat of condensation of the steam.

In addition the reforming apparatus of Embodiment 4 has the following characteristic features. The reforming apparatus includes: the first $O_2$-adsorption catalyst layer 6A and the second $O_2$-adsorption catalyst layer 6B both of which are cylindrically disposed between the cylindrical pipe 50 and the cylindrical pipe 46, and both of which are disposed between the low-temperature CO-shift catalyst layer 7 and the high-temperature CO-shift catalyst layer 3 with first $O_2$-adsorption catalyst layer 6A positioned on a side closer to the low-temperature CO-shift catalyst layer 7 and with the second $O_2$-adsorption catalyst layer 6B positioned on a side closer to the high-temperature CO-shift catalyst layer 3; the heating-gas induction pipe 59 that penetrates the low-temperature CO-shift catalyst layer 7 and the first $O_2$-adsorption catalyst layer 6A; the condenser 62 to remove the moisture from the heating gas 88; and the pump 60 that sucks the heating gas 88. When the reforming apparatus is stopped, the heating gas 88 is sucked by the pump 60, and the moisture is removed by the condenser 62. Then, the heating gas 88 is introduced to the portion located between the first $O_2$-adsorption catalyst layer 6A and the second $O_2$-adsorption catalyst layer 6B by way of the heating-gas induction pipe 59. After that, part of the heating gas 88 introduced into the portion positioned between the first $O_2$-adsorption catalyst layer 6A and the second $O_2$-adsorption catalyst layer 6B turns around, and then flows through the first $O_2$-adsorption catalyst layer 6A, so that the $O_2$ is removed from the heating gas 88 and thereby the $O_2$-less gas 107 is produced. The $O_2$-less gas 107 flows through the low-temperature CO-shift catalyst layer 7 and then through the CO-removing catalyst layer 8, thereby discharging the steam that remains in the low-temperature CO-shift catalyst layer 7 and in the CO-removing catalyst layer 8. The rest of the heating gas 88 introduced into the portion located between the first $O_2$-adsorption catalyst layer 6A and the second $O_2$-adsorption catalyst layer 6B flows through the second $O_2$-adsorption catalyst layer 6B, so that $O_2$ is removed from the heating gas 88, thereby producing the $O_2$-less gas 107. The $O_2$-less gas 107 thus produced flows through the high-temperature CO-shift catalyst layer 3, and flows out via the reformed-gas turning portion 305 located at the end of the second reformed-gas flow passage 303. After that, the $O_2$-less gas 107 flows through the reforming-catalyst layer 21, and thereby discharges the steam that remains in the high-temperature CO-shift catalyst layer 3 and in the reforming-catalyst layer 21. Accordingly, when the reforming apparatus is stopped, the steam that remains in the reforming-catalyst layer 21, the high-temperature CO-shift catalyst layer 3, the low-temperature CO-shift catalyst layer 7, and the CO-removing catalyst layer 8 can be discharged by use of the $O_2$-less gas 107. For this reason, the degradation of these catalysts in these catalyst layers 21, 3, 7, and 8 can be prevented from being provoked by the condensation of the steam.

Incidentally, it is preferable to form each of the first vaporizer and the second vaporizer by fitting a wavy pipe and a cylindrical pipe together as in the cases of the first vaporizer 4 and of the second vaporizer 5 in each of Embodiments 2 to 4. This is not the only way of forming each vaporizer. It is allowable as long as each vaporizer is cylindrically shaped and includes a flow passage in which the process water 85 or the mixture 89 is allowed to flow. For example, each vaporizer may be formed by wrapping a tube to flow the process water 85 or the mixture 89 spirally around a cylindrical pipe.

In addition, it is preferable that the reforming pipe is of a single-pipe type as in the reforming pipe 2 of each of Embodiments 1 to 4, but this is not the only type of the reforming pipe. For example, annular-shaped multi-tubular type (multiple) reforming pipes may be disposed so as to surround the burner 01 or 1, and the first vaporizer 05 or 4, the second vaporizer 06 or 5, the low-temperature CO-shift catalyst layer 07 or 7, the CO-removing catalyst layer 08 or 8, and the like may be disposed below the multi-tubular type reforming pipes.

In addition, in each of Embodiments 1 to 4, the water flows through the first flow passage of the first vaporizer, and the mixture of the steam and the raw material flows through the second flow passage of the second vaporizer. This, however, is not the only possible configuration. Alternatively, the flow of the water and the flow of the mixture may be exchanged with each other. Specifically, the mixture of the steam and the raw material may flow through the first flow passage of the first vaporizer, and the water may flow through the second flow passage of the second vaporizer. In such configuration, in the second vaporizer, the water flowing through the second flow passage is heated by the heating gas flowing through the heating-gas flow passage formed between the first vaporizer and the second vaporizer so that the water is turned into the steam. In the raw-material mixing portion formed at a certain point of the duct that connects the outlet of the second flow passage to the inlet of the first flow passage, the mixture is obtained by mixing the raw material with the steam which has flowed out of the second flow passage and which flows through the duct. In the first vaporizer, the mixture flowing through the first flow passage is heated further by the heating gas flowing through the heating-gas flow passage. The mixture thus heated is supplied to the reforming-catalyst layer.

INDUSTRIAL APPLICABILITY

The present invention relates to a reforming apparatus and a method of operating the reforming apparatus. The present invention is useful when applied to a case of providing a reforming apparatus which is capable of uniformly mixing raw material and water (steam) so as to produce reformed gas, of preventing the precipitation of carbon, and of improving the maintainability.

The invention claimed is:
1. A reforming apparatus that includes a reforming-catalyst layer and produces reformed gas containing hydrogen, characterized by comprising:
a first vaporizer that is cylindrically shaped and includes a first flow passage through which water flows;
a second vaporizer that is cylindrically shaped and includes a second flow passage through which a mixture of steam and a raw material flows;
a duct that connects an outlet of the first flow passage to an inlet of the second flow passage; and
a raw-material mixing portion formed at a certain point of the duct, the reforming apparatus characterized in that
the first vaporizer and the second vaporizer are concentrically disposed so that the first vaporizer is located on the outer side and the second vaporizer is located on the inner side,
a cylindrical gap left between the first vaporizer and the second vaporizer serves as a heating-gas flow passage,
in the first vaporizer, the water flowing through the first flow passage is heated by heating gas flowing through the heating-gas flow passage, and thereby the water is turned into steam,
in the raw-material mixing portion, the mixture is obtained by mixing the raw material with the steam flowing through the duct after flowing out of the first flow passage,
in the second vaporizer, while flowing through the second flow passage, the mixture is heated further by the heating gas flowing through the heating-gas flow passage, and the mixture is supplied to the reforming-catalyst layer; and
wherein a low temperature CO-shift catalyst layer is
disposed at an inner side of the second vaporizer.

2. The reforming apparatus according to claim 1, characterized in that a reforming pipe in which the reforming-catalyst layer is installed is disposed above the first vaporizer and the second vaporizer; while any one of the mixture that has flowed out of the second flow passage of the second vaporizer and the mixture that has flowed out of the first flow passage of the first vaporizer flows into the reforming-catalyst layer from a lower end thereof and then flows upwards through the reforming-catalyst layer, the mixture is turned into the reformed gas through a steam-reforming process; the reformed gas flows out of an upper end of the reforming-catalyst layer, flows downwards, flows into the low-temperature CO-shift catalyst layer from an upper end thereof, and then flows downwards through the low-temperature CO-shift catalyst layer.

3. The reforming apparatus according to claim 2, characterized in that a burner to produce the heating gas is disposed at an upper-end side of the reforming pipe so as to face downwards.

4. The reforming apparatus according to claim 3, characterized by comprising a reforming-portion cylindrical pipe that is disposed so as to surround the reforming pipe, the reforming apparatus characterized in that the reforming pipe has a triple-pipe structure including an inner cylindrical pipe located at the inner side, an outer cylindrical pipe located at the outer side, and an intermediate cylindrical pipe located between the inner cylindrical pipe and the outer cylindrical pipe, all of these pipes disposed concentrically so as to surround the burner, a lower-end side of the inner cylindrical pipe is closed by a lower-end plate, an upper-end side of an interstice between the inner cylindrical pipe and the outer cylindrical pipe is closed by a first upper-end plate; a gap left between the first upper-end plate and an upper end of the intermediate cylindrical pipe serves as a reformed-gas turning portion, a cylindrical gap left between the intermediate cylindrical pipe and the inner cylindrical pipe serves as a reformed-gas flow passage, the reforming-catalyst layer is cylindrically formed between the intermediate cylindrical pipe and the outer cylindrical pipe, an upper-end side of the reforming-portion cylindrical pipe is closed by a second upper-end plate; a gap left between the second upper-end plate and the first upper-end plate serves as a heating-gas turning portion, a cylindrical gap left between the reforming-portion cylindrical pipe and the outer cylindrical pipe serves as a heating-gas flow passage, heating gas discharged downwards from the burner flows upwards along an inner-circumferential surface of the inner cylindrical pipe; while the heating gas turns around at the heating-gas turning portion and flows downwards through the heating-gas flow passage, the heating gas heats the reforming-catalyst layer, and then flows into the heating-gas flow passage formed between the first vaporizer and the second vaporizer, and the reformed gas that has flowed out from the upper end of the reforming-catalyst layer turns around at the reformed-gas turning portion, flows downwards through the reformed-gas flow passage, and then flows into the low-temperature CO-shift catalyst layer from the upper end thereof.

5. The reforming apparatus according to claim 2, characterized in that a high-temperature CO-shift catalyst is disposed in an area that is located at an inner side of a reforming pipe in which the reforming-catalyst layer is installed and that is located above the low-temperature CO-shift catalyst layer, the area being where the reformed gas flows in.

6. The reforming apparatus according to claim 2, characterized in that a cylindrically-shaped header tank is disposed at a portion located between an outlet of the second flow passage of the second vaporizer and an inlet of the reforming-catalyst layer, or at a position located between an outlet of the first flow passage of the first vaporizer and the inlet of the reforming-catalyst layer; a plurality of ejection holes are formed in a side surface or a top surface of the header tank in a circumferential direction of the header tank, and the mixture that has flowed out via the outlet of the second flow passage of the second vaporizer or via the outlet of the first flow passage of the first vaporizer flows into the header tank; after that, the mixture jets out through the ejection holes, and flows into the reforming-catalyst layer via the inlet thereof.

7. A method of operating the reforming apparatus according to claim 3, characterized in that while the reforming apparatus is in steady operation, the temperature of the reformed gas at an outlet of the reforming-catalyst layer is measured; an amount of fuel to be supplied to the burner is controlled so that the measured value of the temperature of the reformed gas is kept at a predetermined temperature, and in addition, the temperature of the reformed gas at an inlet of the low-temperature CO-shift catalyst layer is measured; an amount of air to be supplied to the burner is controlled so that the measured value of the temperature of the reformed gas is kept at a predetermined temperature.

8. A method of operating the reforming apparatus according to claim 3, characterized in that while the reforming apparatus is in steady operation, the temperature of the reformed gas at an outlet of the reforming-catalyst layer is measured; an amount of fuel to be supplied to the burner is controlled so that the measured value of the temperature of the reformed gas is kept at a predetermined temperature, and in addition, any one of the temperature of the mixture at an outlet of the second flow passage of the second vaporizer and the temperature of the mixture at an outlet of the first flow passage of the first vaporizer is measured; an amount of air to be supplied to the burner is controlled so that the measured value of the temperature of the mixture is kept at a predetermined temperature.

9. The reforming apparatus according to claim 4, characterized in that the low-temperature CO-shift catalyst layer is cylindrically disposed between a first cylindrical pipe disposed at an inner side of the second vaporizer and a second cylindrical pipe disposed inside the first cylindrical pipe, a cylindrical gap left between the first cylindrical pipe and the second vaporizer serves as a first reformed-gas flow passage, the inside of the second cylindrical pipe serves as a second reformed-gas flow passage, and while the reformed gas that has flowed out of the reforming-catalyst layer flows through the first reformed-gas flow passage from a first-end side to a second-end side of the low-temperature CO-shift catalyst layer, the temperature of the reformed gas is lowered by heat exchange with any one of the mixture and the water that flows through the second flow passage of the second vaporizer; the reformed gas then turns around at a reformed-gas turning portion located at the second-end side of the low-temperature CO-shift catalyst layer; while the reformed gas flows through the second reformed-gas flow passage from the second-end side to the first-end side of the low-temperature CO-shift catalyst layer, the temperature of the reformed gas is raised by heat exchange with the low-temperature CO-shift catalyst layer; after that, the reformed gas flows into an interstice between the first cylindrical pipe and the second cylindrical pipe via a circulation hole formed in the second cylindrical pipe, and then flows through the low-temperature CO-shift catalyst layer.

10. A method of operating the reforming apparatus according to claim 9, characterized in that, during heating operation for temperature rising for starting the reforming apparatus, without supplying the water or the raw material, the heating gas of the burner flows upwards along the inner-circumferential surface of the inner cylindrical pipe of the reforming pipe, then turns around at the heating-gas turning portion, and then flows downwards through the heating-gas flow passage located outside the reforming pipe; after that, the heating gas flows downwards through the heating-gas flow passage formed between the first vaporizer and the second vaporizer; as a consequence, the heating gas sequentially raises, by heating, the temperatures of the reforming pipe and the reforming-catalyst layer, the temperatures of the first vaporizer and the second vaporizer, and then the temperature of the low-temperature CO-shift catalyst layer, and subsequently, the water is supplied without supplying the raw material, then flows through the first flow passage of the first vaporizer and then through the second flow passage of the second vaporizer, or flows through the second flow passage of the second vaporizer and then through the first flow passage of the first vaporizer; thereby the water is heated by the heating gas flowing through the heating-gas flow passage formed between the first vaporizer and the second vaporizer so that steam is produced; after the steam flows through the reforming-catalyst layer and while the steam flows through the first reformed-gas flow passage and then through the second reformed-gas flow passage, the steam is condensed on the outer surface of the first cylindrical pipe and on the inner surface of the second cylindrical pipe, and then the condensation thus occurred heats the low-temperature CO-shift catalyst layer and raises the temperature thereof.

11. The reforming apparatus according to claim 8, characterized in that a cylindrically-shaped thermally-insulating material is disposed so as to surround the reforming-portion cylindrical pipe.

12. A method of operating the reforming apparatus according to claim 8, characterized in that, during heating operation for temperature rising for starting the reforming apparatus, without supplying the water or the raw material, the heating gas of the burner flows upwards along the inner-circumferential surface of the inner cylindrical pipe of the reforming pipe, then turns around at the heating-gas turning portion, and then flows downwards through the heating-gas flow passage located outside the reforming pipe; after that, the heating gas flows downwards through the heating-gas flow passage formed between the first vaporizer and the second vaporizer; as a consequence, the heating gas sequentially raises, by heating, the temperatures of the reforming pipe and the reforming-catalyst layer, the temperatures of the first vaporizer and the second vaporizer, and then the temperature of the low-temperature CO-shift catalyst layer.

13. The reforming apparatus according to claim 1, characterized in that a CO-removing catalyst layer is cylindrically disposed so as to surround the first vaporizer, and the reformed gas that has flowed out of the low-temperature CO-shift catalyst layer flows through the CO-removing catalyst layer.

14. The reforming apparatus according to claim 1, characterized in that a high-temperature CO-shift catalyst layer is provided at a position which allows the reformed gas to pass the high-temperature CO-shift catalyst layer before passing through the low-temperature CO-shift catalyst layer, and the reformed gas that has flowed out of the reforming-catalyst layer flows through the high-temperature CO-shift catalyst layer, and then flows through the low-temperature CO-shift catalyst layer.

15. The reforming apparatus according to claim 1, characterized in that each of the first flow passage and the second flow passage is formed into a spiral shape.

16. The reforming apparatus according to claim 1, characterized in that the first vaporizer has a double-pipe structure formed by fitting a cylindrical pipe onto the outer-circumferential surface side of a wavy pipe having spirally protruding and recessed portions formed in the outer-circumferential surface of the wavy pipe; a spiral gap formed between the wavy pipe and the cylindrical pipe serves as the first flow passage, and the second vaporizer has a double-pipe structure formed by fitting a different cylindrical pipe onto the outer-circumferential surface side of a different wavy pipe having spirally protruding and recessed portions formed in the outer-circumferential surface of the different wavy pipe; a spiral gap formed between the different wavy pipe and the different cylindrical pipe serves as the second flow passage.

17. The reforming apparatus according to claim 1, characterized in that the low-temperature CO-shift catalyst layer is provided inside a cylindrical pipe, a cylindrical gap left between the cylindrical pipe and the second vaporizer serves as a reformed-gas flow passage, and while the reformed gas that has flowed out of the reforming-catalyst layer flows through the reformed-gas flow passage, the temperature of the reformed gas is lowered by heat exchange with any one of the mixture and the water that flows through the second flow passage of the second vaporizer; after that, the reformed gas flows into the inside of the cylindrical pipe by way of a circulation hole formed in the cylindrical pipe, and then flows through the low-temperature CO-shift catalyst layer.

18. The reforming apparatus according to claim 17, characterized by comprising:

an $O_2$-adsorption catalyst layer disposed inside the cylindrical pipe;

a heating-gas induction pipe that penetrates the low-temperature CO-shift catalyst layer and the O2-adsorption catalyst layer;

a condenser that removes moisture from the heating gas; and a pump that sucks the heating gas, the reforming apparatus characterized in that, when the reforming apparatus is stopped, the heating gas is sucked by the pump; the condenser removes the moisture; the heating gas is introduced to an upper-end side of the $O_2$-adsorption catalyst layer by way of the heating-gas induction pipe; after that, the heating gas turns around and flows through the $O_2$-adsorption catalyst layer, so that $O_2$ is removed from the heating gas and thereby $O_2$-less gas is produced, part of the $O_2$-less gas flows through the low-temperature CO-shift catalyst layer and thereby discharges steam that remains in the low-temperature CO-shift catalyst layer, or the part of the $O_2$-less gas flows through the low-temperature CO-shift catalyst layer and then through the CO-removing catalyst layer, and thereby discharges the steam that remains in the low-temperature CO-shift catalyst layer and in the CO-removing catalyst layer, and the rest of the $O_2$-less gas flows out via the circulation hole formed in the cylindrical pipe, and then flows through the reforming-catalyst layer and thereby discharges steam that remains in the reforming-catalyst layer.

19. The reforming apparatus according to claim 1, characterized in that the low-temperature CO-shift catalyst layer is cylindrically disposed between a first cylindrical pipe disposed at an inner side of the second vaporizer and a second cylindrical pipe disposed inside the first cylindrical pipe, a cylindrical gap left between the first cylindrical pipe and the second vaporizer serves as a first reformed-gas flow passage, the inside of the second cylindrical pipe serves as a second reformed-gas flow passage, and while the reformed gas that has flowed out of the reforming-catalyst layer flows through the first reformed-gas flow passage from a first-end side to a second-end side of the low-temperature CO-shift catalyst layer, the temperature of the reformed gas is lowered by heat exchange with any one of the mixture and the water that flows through the second flow passage of the second vaporizer; the reformed gas then turns around at a reformed-gas turning portion located at the second-end side of the low-temperature CO-shift catalyst layer; while the reformed gas flows through the second reformed-gas flow passage from the second-end side to the first-end side of the low-temperature CO-shift catalyst layer, the temperature of the reformed gas is raised by heat exchange with the low-temperature CO-shift catalyst layer; after that, the reformed gas flows into an interstice between the first cylindrical pipe and the second cylindrical pipe via a circulation hole formed in the second cylindrical pipe, and then flows through the low-temperature CO-shift catalyst layer.

20. The reforming apparatus according to claim 1, characterized in that the low-temperature CO-shift catalyst layer is cylindrically disposed between a first cylindrical pipe disposed at an inner side of the second vaporizer and a second cylindrical pipe disposed inside the first cylindrical pipe, a high-temperature CO-shift catalyst layer is cylindrically disposed between the first cylindrical pipe and the second cylindrical pipe, and above the low-temperature CO-shift catalyst layer, a cylindrical gap left between the first cylindrical pipe and the second vaporizer serves as a first reformed-gas flow passage, the inside of the second cylindrical pipe serves as a second reformed-gas flow passage, and while the reformed gas that has flowed out of the reforming-catalyst layer flows downwards through the first reformed-gas flow passage from an upper-end side of the high-temperature CO-shift catalyst layer to an lower-end side of the low-temperature CO-shift catalyst layer, the temperature of the reformed gas is lowered by heat exchange with any one of the mixture and the water that flows through the second flow passage of the second vaporizer; the reformed gas then turns around at a reformed-gas turning portion located at the lower-end side of the low-temperature CO-shift catalyst layer; while the reformed gas flows upwards through the second reformed-gas flow passage from the lower-end side of the low-temperature CO-shift catalyst layer to the upper-end side of the high-temperature CO-shift catalyst layer, the temperature of the reformed gas is raised by heat exchange with the low-temperature CO-shift catalyst layer and the high-temperature CO-shift layer; after that, the reformed gas turns around at a reformed-gas turning portion located at an upper end of the second reformed-gas flow passage; the reformed gas flows into an interstice between the first cylindrical pipe and the second cylindrical pipe, and flows downwards through the high-temperature CO-shift catalyst layer and then through the low-temperature CO-shift catalyst layer.

21. The reforming apparatus according to claim 15, characterized by comprising:

a first $O_2$-adsorption catalyst layer and a second $O_2$-adsorption catalyst layer both of which are cylindrically disposed between the first cylindrical pipe and the second cylindrical pipe, and both of which are disposed between the low-temperature CO-shift catalyst layer and the high-temperature CO-shift catalyst layer with the first $O_2$-adsorption catalyst layer being positioned on a side closer to the low-temperature CO-shift catalyst layer and with the second $O_2$-adsorption catalyst layer being positioned on a side closer to the high-temperature CO-shift catalyst layer;

a heating-gas induction pipe that penetrates the low-temperature CO-shift catalyst layer and the first $O_2$-adsorption catalyst layer;

a condenser that removes moisture from the heating gas; and a pump that sucks the heating gas, the reforming apparatus characterized in that, when the reforming apparatus is stopped, the heating gas is sucked by the pump; the condenser removes the moisture; the heating gas is introduced to a portion located between the first $O_2$-adsorption catalyst layer and the second $O_2$-adsorption catalyst layer by way of the heating-gas induction pipe, after that, part of the heating gas introduced into this portion located between the first $O_2$-adsorption catalyst layer and the second $O_2$-adsorption catalyst layer turns around and flows through the first $O_2$-adsorption catalyst layer, so that $O_2$ is removed from the heating gas and thereby $O_2$-less gas is produced; the $O_2$-less gas flows through the low-temperature CO-shift catalyst layer and thereby discharges steam that remains in the low-temperature CO-shift catalyst layer, or the $O_2$-less gas flows through the low-temperature CO-shift catalyst layer and then through the CO-removing catalyst layer, and thereby discharges steam that remains in the low-temperature CO-shift catalyst layer and in the CO-removing catalyst layer, and the rest of the heating gas introduced into the portion located between the first $O_2$-adsorption catalyst layer and the second $O_2$-adsorption catalyst layer flows through the second $O_2$-adsorption catalyst layer, so that $O_2$ is removed from the heating gas and thereby $O_2$-less gas is produced; the $O_2$-less gas flows through the high-temperature CO-shift catalyst layer and then flows out via the reformed-gas turning portion located at the end of the second reformed-gas flow passage; after that, the heating gas flows through the reforming-catalyst layer and thereby discharges steam that remains in the high-temperature CO-shift catalyst layer and in the reforming-catalyst layer.

22. The reforming apparatus according to claim 1, characterized by comprising:
   a duct for cleaning that connects the outlet of the second flow passage of the second vaporizer to the inlet of the reforming-catalyst layer, or connects the outlet of the first flow passage of the first vaporizer to the inlet of the reforming-catalyst layer; and
   a removable portion for cleaning that is detachably attached to a certain point of the duct for cleaning, the reforming apparatus characterized in that,
   when the removable portion for cleaning is removed and a chemical liquid is poured in through a fill port of the duct for cleaning, the chemical liquid flows through the second flow passage of the second vaporizer and then through the first flow passage of the first vaporizer, or the chemical liquid flows through the first flow passage of the first vaporizer and then the second flow passage of the second vaporizer.

23. The reforming apparatus according to claim 1, characterized in that
   the raw-material mixing portion has a double-nozzle structure including an external nozzle and an internal nozzle disposed inside the external nozzle, and
   any one of the steam that has flowed out of the first flow passage of the first vaporizer and the steam that has flowed out of the second flow passage of the second vaporizer flows through an interstice between the external nozzle and the internal nozzle, and the raw material flows through the internal nozzle, or
   the raw material flows through the interstice between the external nozzle and the internal nozzle, and any one of the steam that has flowed out of the first flow passage of the first vaporizer and the steam that has flowed out of the second flow passage of the second vaporizer flows through the internal nozzle.

* * * * *